United States Patent
Choi et al.

(10) Patent No.: US 10,061,715 B2
(45) Date of Patent: Aug. 28, 2018

(54) STRUCTURE-PRESERVING SUBGRAPH QUERIES

(71) Applicant: Hong Kong Baptist University, Hong Kong (HK)

(72) Inventors: Koon Kau Choi, Hong Kong (HK); Zhe Fan, Hong Kong (HK)

(73) Assignee: Hong Kong Baptist University, Hong Kong (HK)

(*) Notice: Subject to any disclaimer, the term of this patent is extended or adjusted under 35 U.S.C. 154(b) by 456 days.

(21) Appl. No.: 14/835,747

(22) Filed: Aug. 26, 2015

(65) Prior Publication Data
US 2016/0357799 A1 Dec. 8, 2016

Related U.S. Application Data

(60) Provisional application No. 62/170,122, filed on Jun. 2, 2015.

(51) Int. Cl.
*G06F 17/30* (2006.01)
*G06F 12/14* (2006.01)

(52) U.S. Cl.
CPC .... *G06F 12/1408* (2013.01); *G06F 17/30442* (2013.01); *G06F 2212/1052* (2013.01)

(58) Field of Classification Search
None
See application file for complete search history.

(56) References Cited

U.S. PATENT DOCUMENTS

| | | | | |
|---|---|---|---|---|
| 7,287,023 B2* | 10/2007 | Fan | ............ | G06F 17/30911 |
| 7,620,632 B2* | 11/2009 | Andrews | .......... | G06F 17/30961 |
| 8,433,701 B2* | 4/2013 | Sargeant | .......... | G06F 17/30451 |
| | | | | 707/714 |
| 9,477,694 B2* | 10/2016 | Gkoulalas-Divanis | ................... | |
| | | | | G06F 17/30289 |
| 9,646,107 B2* | 5/2017 | LeTourneau | ...... | G06F 17/30961 |
| 9,703,834 B2* | 7/2017 | Sityon | ............ | G06F 17/30507 |
| 2007/0239694 A1* | 10/2007 | Singh | ............ | G06F 17/30958 |
| 2009/0303237 A1* | 12/2009 | Liu | .............. | H04L 3/0414 |
| | | | | 345/440 |
| 2010/0014657 A1* | 1/2010 | Kerschbaum | ...... | G06F 21/6245 |
| | | | | 380/28 |
| 2011/0173189 A1* | 7/2011 | Singh | ............ | G06F 17/30958 |
| | | | | 707/722 |
| 2012/0254251 A1* | 10/2012 | Barbosa | .......... | G06F 17/3061 |
| | | | | 707/797 |
| 2014/0215045 A1* | 7/2014 | Wang | .............. | H04L 41/0816 |
| | | | | 709/223 |
| 2015/0278396 A1* | 10/2015 | Vasilyeva | ........ | G06F 17/30958 |
| | | | | 707/769 |

OTHER PUBLICATIONS

Cao et al., Privacy Preserving Query over Encrypted Graph-Structured Data in Cloud Computing, 31st International Conference on Distributed Computing Systems (Year: 2011).*

(Continued)

*Primary Examiner* — Jeff A Burke
(74) *Attorney, Agent, or Firm* — Spruson & Ferguson (Hong Kong) Limited

(57) ABSTRACT

The present invention relates to solving the issues related to subgraph query services with tunable preservation of privacy of structural information. More particularly, it relates to a novel cyclic group based encryption (CGBE) method for private matrix operations.

18 Claims, 33 Drawing Sheets

Overview of techniques.

(56) References Cited

OTHER PUBLICATIONS

Lee at al., An In-depth Comparison of Subgraph Isomorphism Algorithms in Graph Dataabases, Proceedings of the VLDB Endowment, vol. 6, No. 2 (Year: 2013).*
Fan et al., Structure-Preserving Subgraph Query Services, IEEE Transactions on Knowledge and Data Engineering, vol. 27, No. 8, Aug. 2015. (Year: 2015).*
Fan et al., Toawards Efficient Authenticed Subgraph Query Service on Outsourced Graph Databases, IEEE Transactions on Services Computing, vol. 7, No. 4, Dec. 2014 (Year: 2015).*

* cited by examiner

Figure 1. Overview of the system model
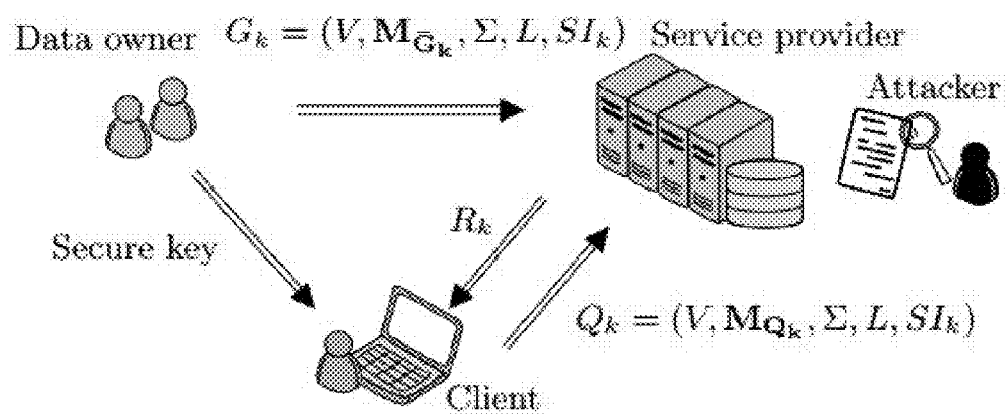

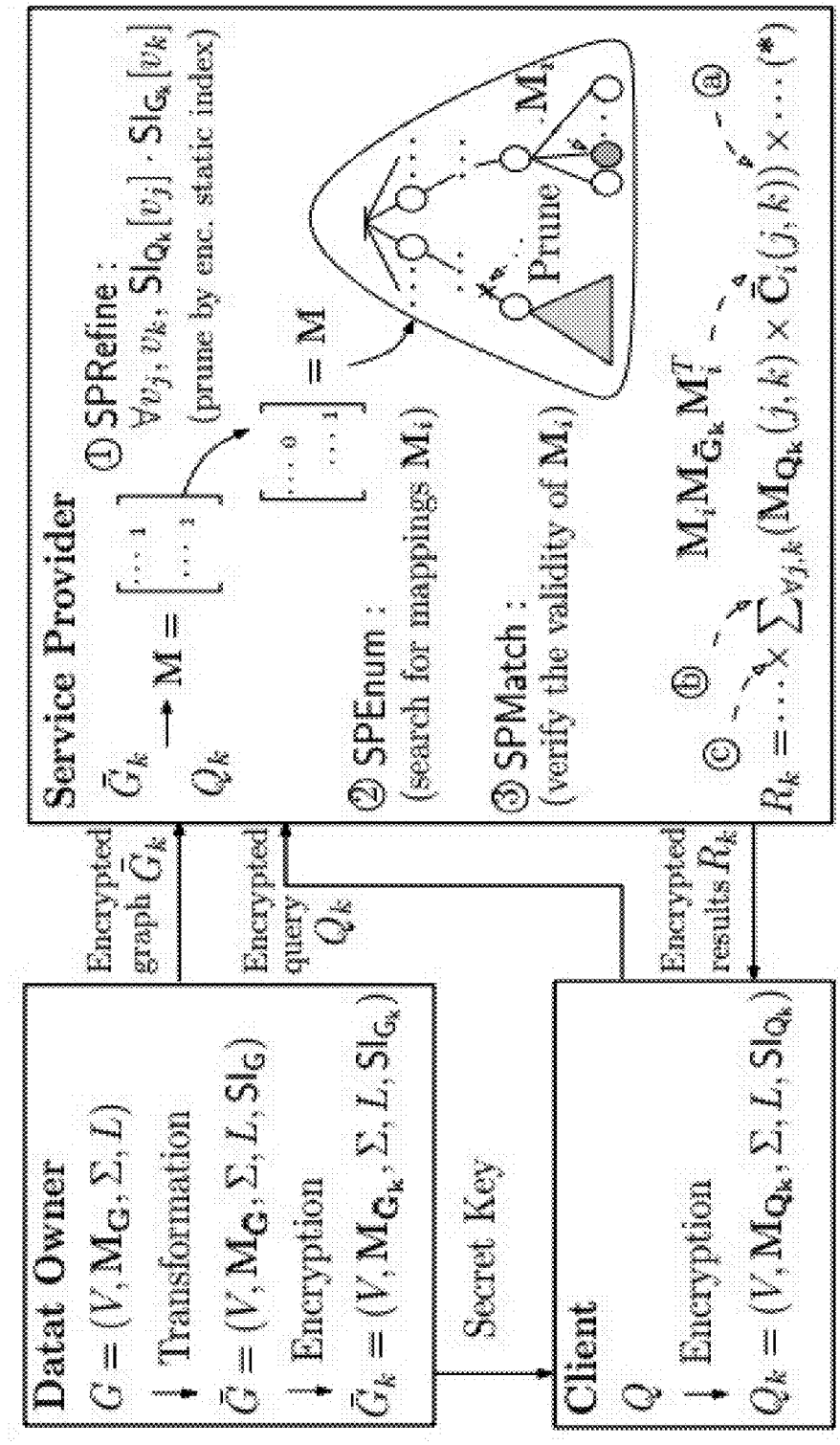
Figure 2. Overview of techniques.

Figure 3. Adjacency matrices of Q and G; Two possible mappings ($M_1$ and $M_2$) and a violation in $C_2$
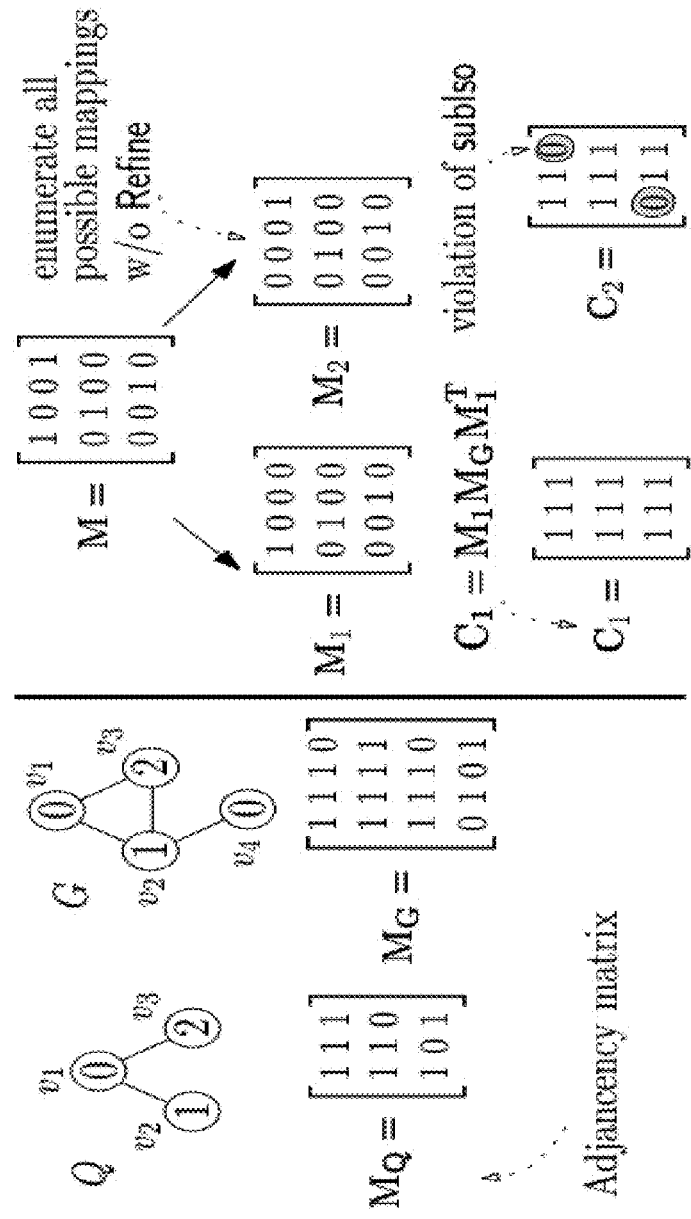

Figure 4. (a) The truth table of $M_Q\bar{C_i}$; (b) Illustration of $M_Q$ and $M_{\bar{G}}$; and (c) TMatch.

| $M_Q$ | $C_i$ | $\bar{C_i}$ | $M_Q\bar{C_i}$ |
|---|---|---|---|
| 0 | 0 | 1 | 0 |
| 0 | 1 | 0 | 0 |
| 1 | 0 | 1 | 1 |
| 1 | 1 | 0 | 0 | violation of subIso a)

$$M_Q = \begin{bmatrix} 1 & 1 & 1 \\ 1 & 1 & 0 \\ 1 & 0 & 1 \end{bmatrix}$$

$$M_{\bar{G}} = \begin{bmatrix} 0 & 0 & 0 & 1 \\ 0 & 0 & 0 & 0 \\ 0 & 0 & 0 & 1 \\ 1 & 0 & 1 & 0 \end{bmatrix}$$

b)

$$\bar{C_4} \cdots \bar{C_3} \quad \bar{C_3} = M_1 M_{\bar{G}} M_1^T$$

M — enumerate all possible mappings w/o TRefine → $M_2$ violation of subIso $M_1$ $\bar{C_3} = \begin{bmatrix} 0 & 0 & 0 \\ 0 & 0 & 0 \\ 0 & 0 & 0 \end{bmatrix}$  $\bar{C_2} = \begin{bmatrix} 0 & 0 & 1 \\ 0 & 0 & 0 \\ 1 & 0 & 0 \end{bmatrix}$ $R_1 = 0$  $R_2 = 2$ c)

Figure 5. (a) The encoding of the truth table shown in Fig. 5(a); (b) Encryption by CGBE; and (c) Illustration of SPMatch with $M_1$ and $M_2$.

a)

| $M_Q$ | $\bar{C_i}$ | $M_Q\bar{C_i}$ |
|---|---|---|
| $q$ | 1 | 0 |
| $q$ | $q$ | 0 |
| 1 | 1 | 1 |
| 1 | $q$ | 0 | violation of sublso b)

| $M_{Q_k}$ | $\bar{C_i}$ | $M_{Q_k}\bar{C_i}$ |
|---|---|---|
| $rqg^x$ | $rg^x$ | $rqg^{2x}$ |
| $rqg^x$ | $rqg^x$ | $rq^2g^{2x}$ |
| $rg^x$ | $rg^x$ | $rg^{2x}$ |
| $rg^x$ | $rqg^x$ | $rqg^{2x}$ | c)

$$R_1 = \sum_{\forall j,k} MC_1(j,k) \pmod{p}$$
$$\equiv g^{2x}(rq + \cdots + rq^2)$$

$$R_2 = \sum_{\forall j,k} MC_2(j,k)$$
$$\equiv g^{2x}(rq + \cdots + rq^2)$$

violation of sublso $$R_k = R_1 \times R_2$$
$$\equiv g^{4x}(rq + \cdots)$$

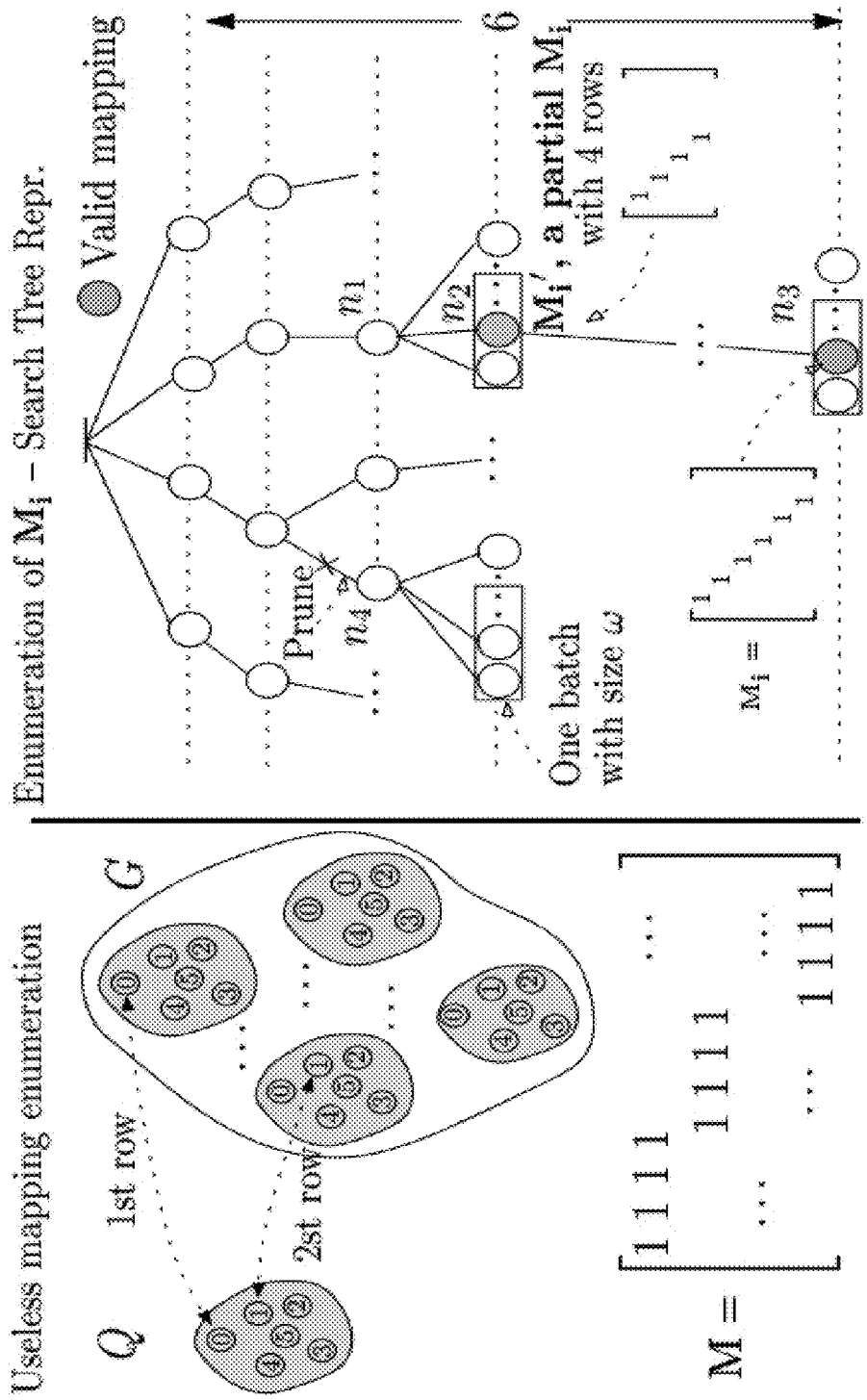
Figure 6. Illustration of mapping enumerations and SPEnum.

Figure 7. (a) Illustration of the h-hop vertices and static index; and (b) a refinement by the index
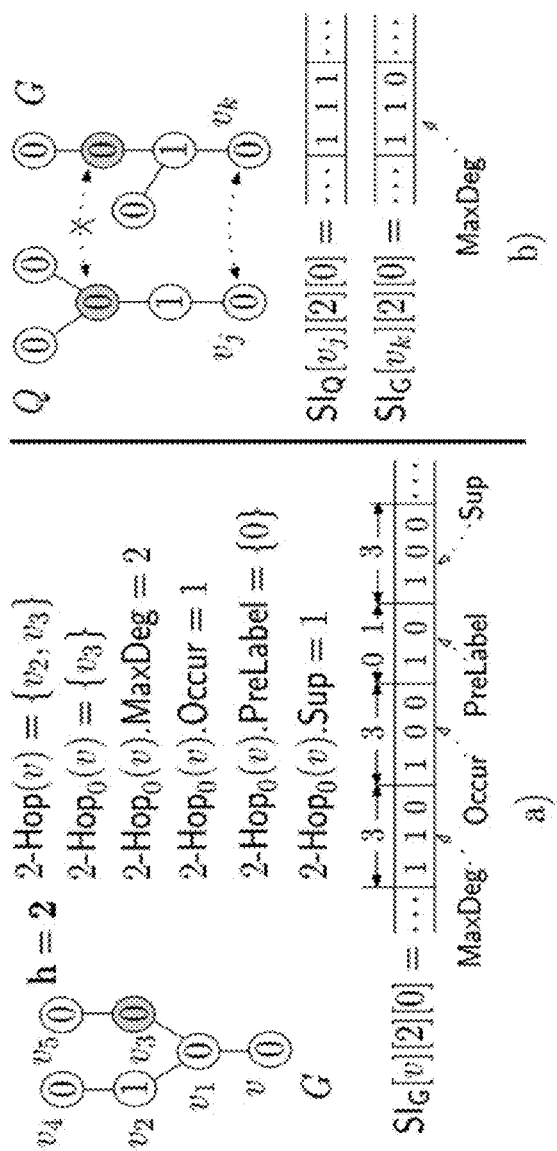

Figure 8. Performance on varying query sizes on real and synthetic datasets.
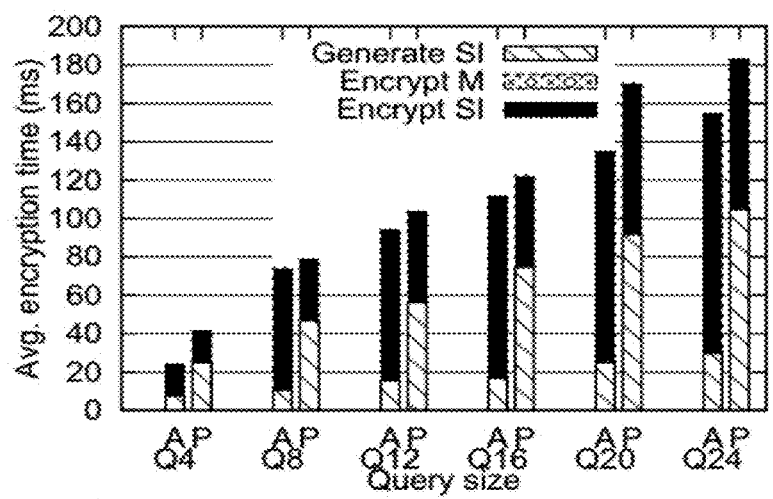
(a) Avg. encryption time of $Q$
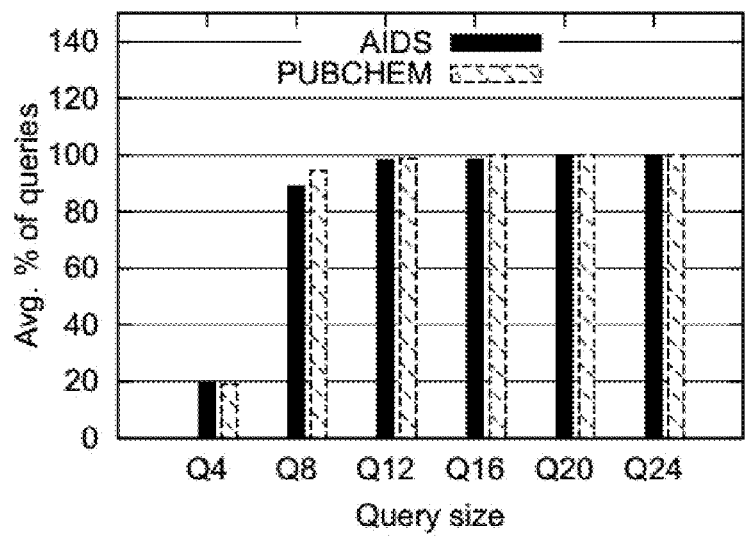
(b) Avg. % of $Qn$s pruned by SPRefine

Figure 8. (Cont)
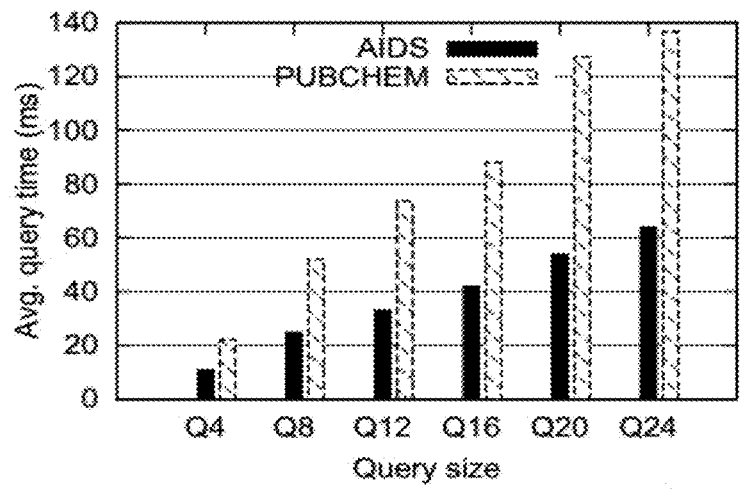
(c) AQT on $Q_n$s pruned by SPRefine
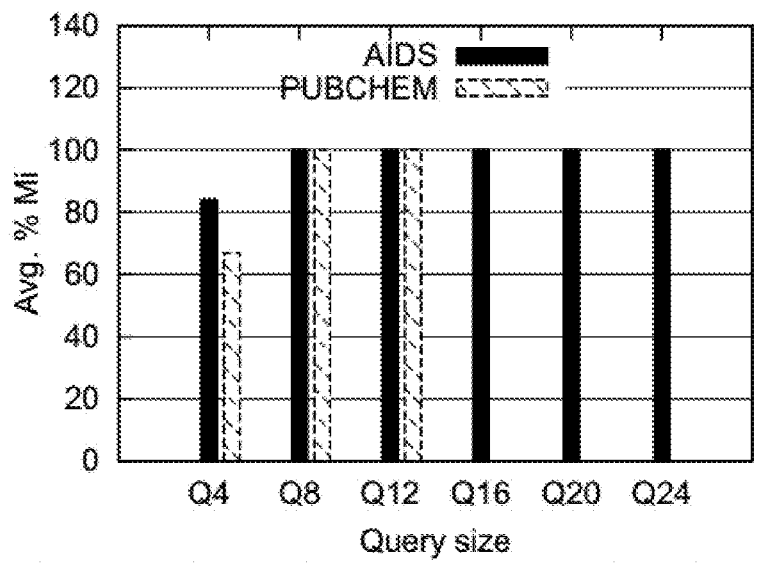
(d) Avg. % of $M_i$s pruned by SPRefine

Figure 8. (Cont)
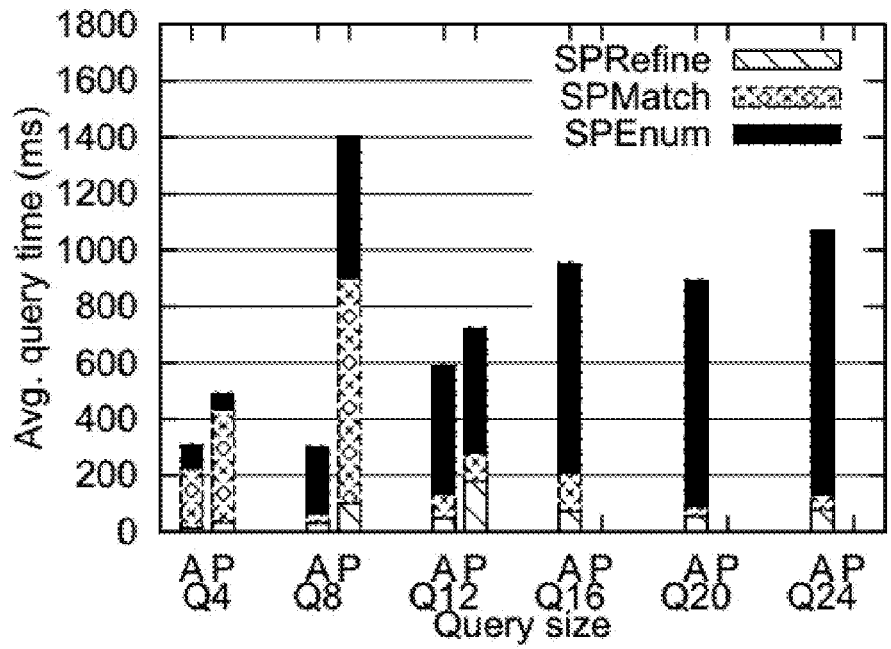
(e) AQT on non-pruned $Qn$s
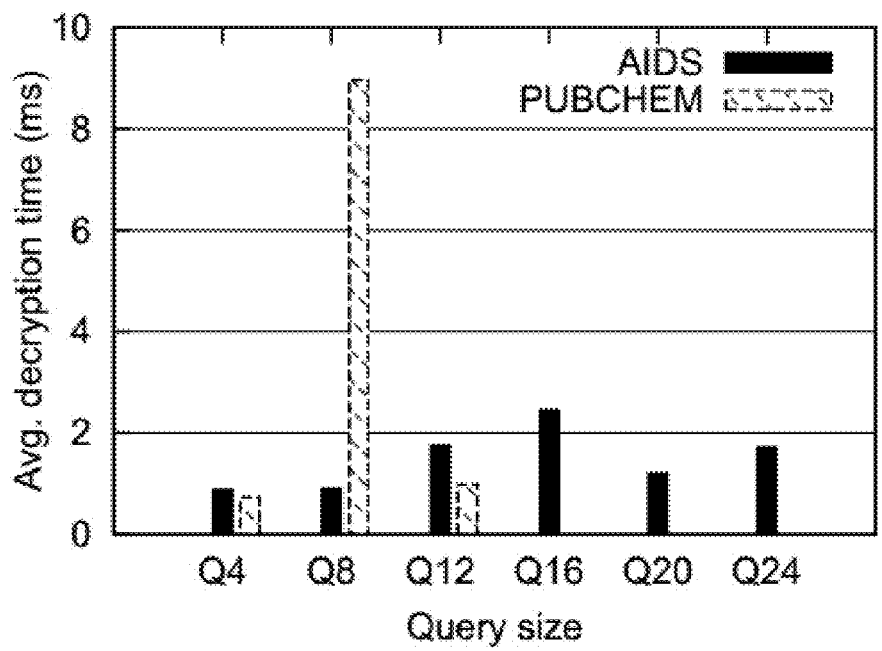
(f) Avg. decryption time

Figure 8. (Cont)
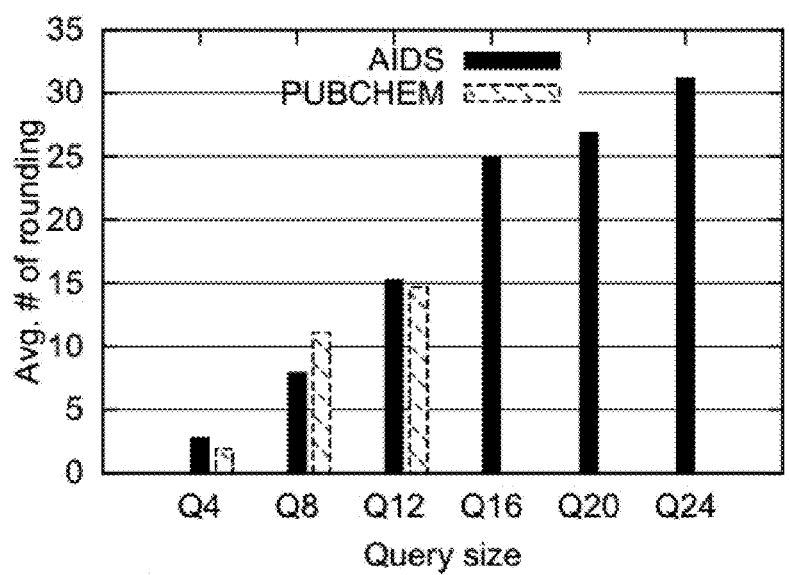
(g) Avg. # of roundings
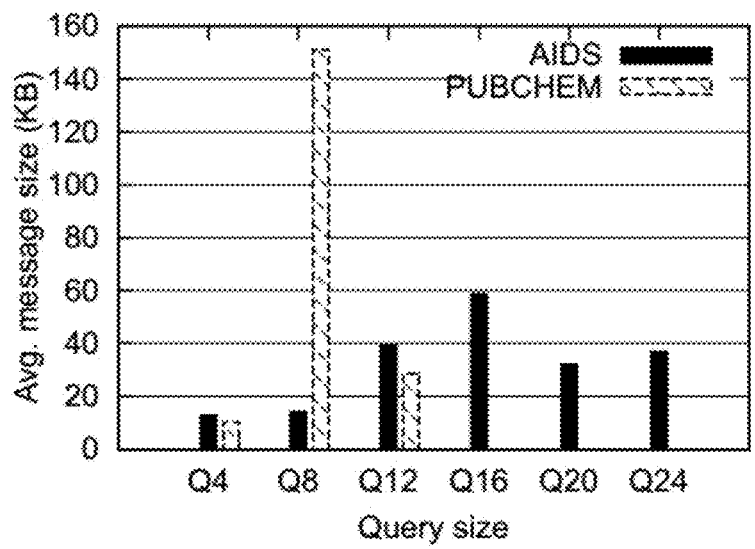
(h) Avg. message size the client received

Figure 8. (Cont)
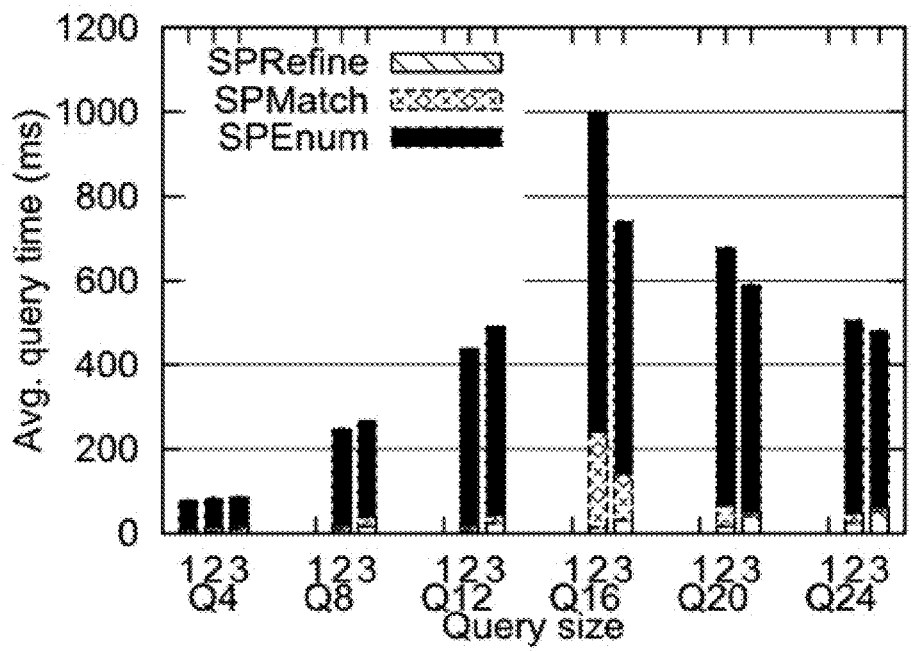
(i) AQT on non-pruned $Qns$
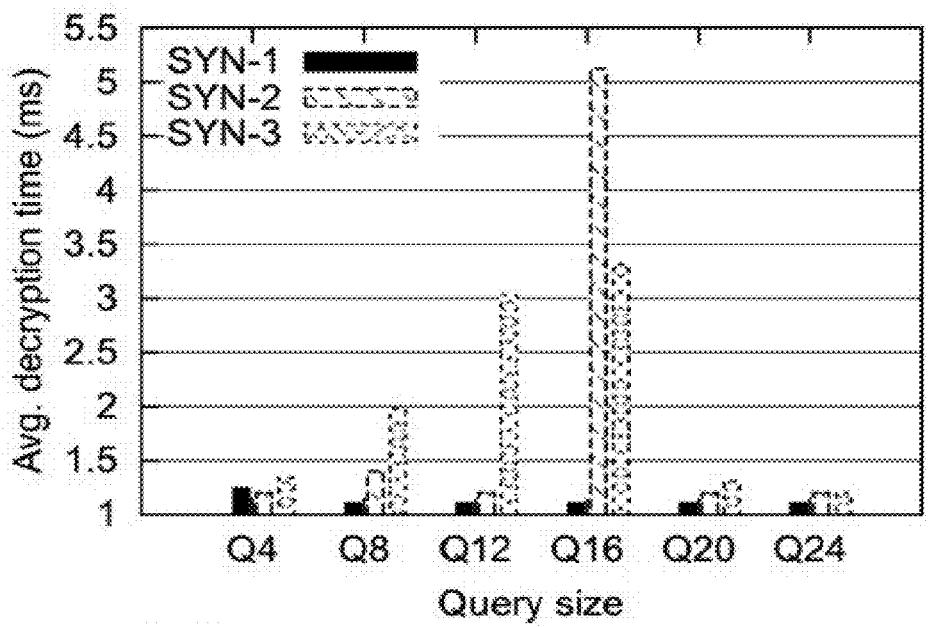
(j) Avg. decryption time Figure 9. Effectiveness of the starting pruning depth d.
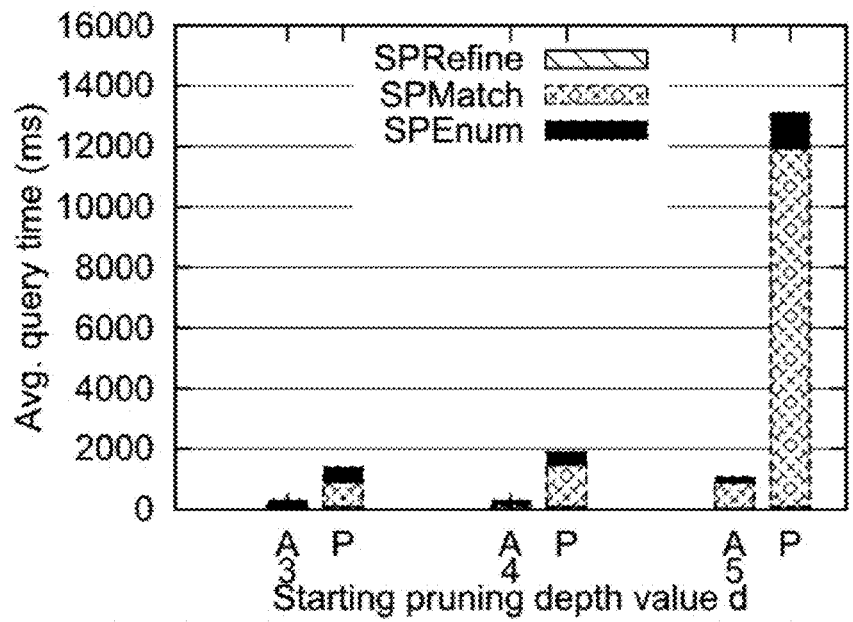
(a) AQT on non-pruned $Q_ns$
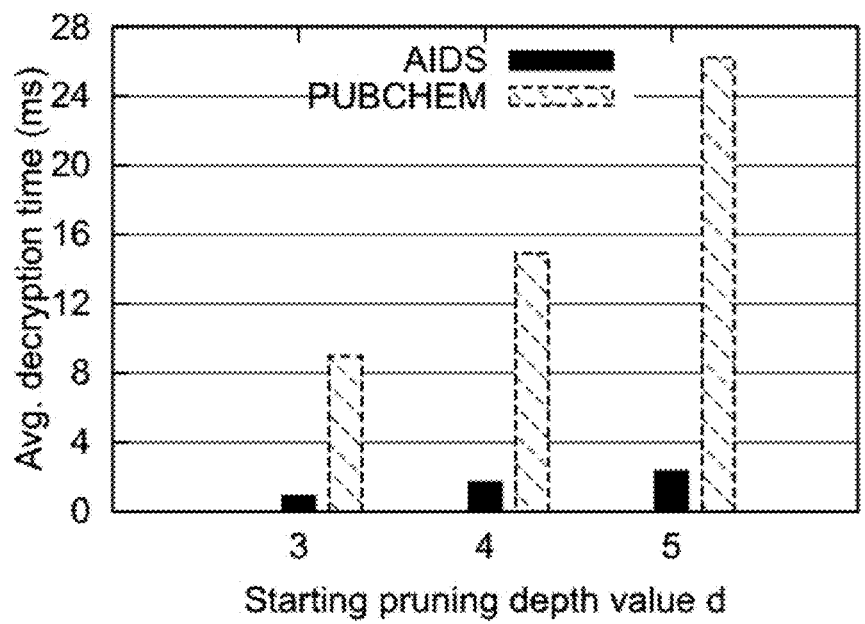
(b) Avg. decryption time

Figure 9. (Cont)
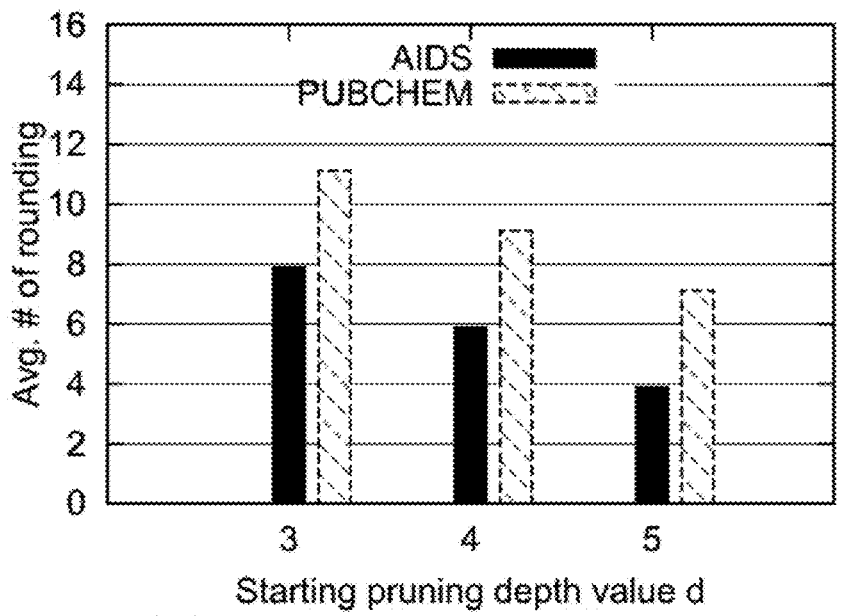
(c) Avg. # of roundings
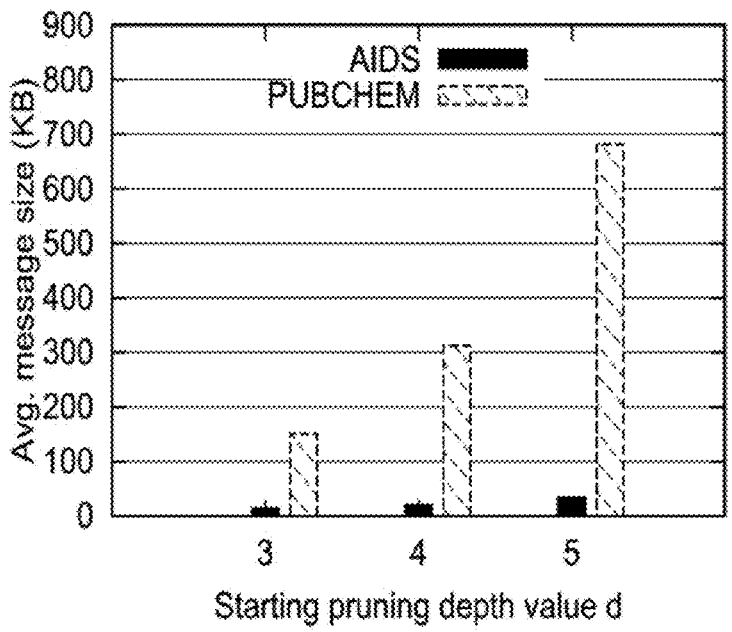
(d) Avg. message size the client received Figure 10. Effectiveness of SI.
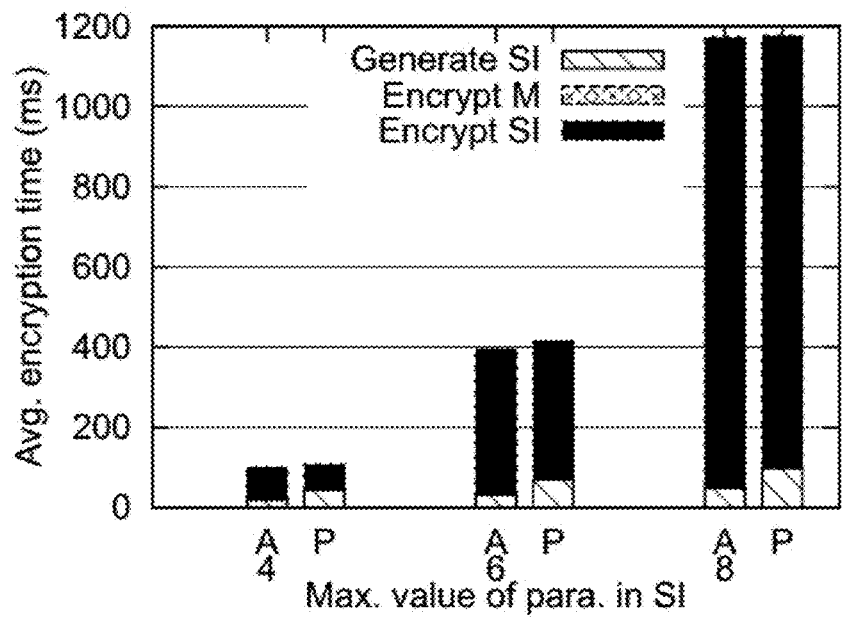
(a) Avg. encryption time of $G$
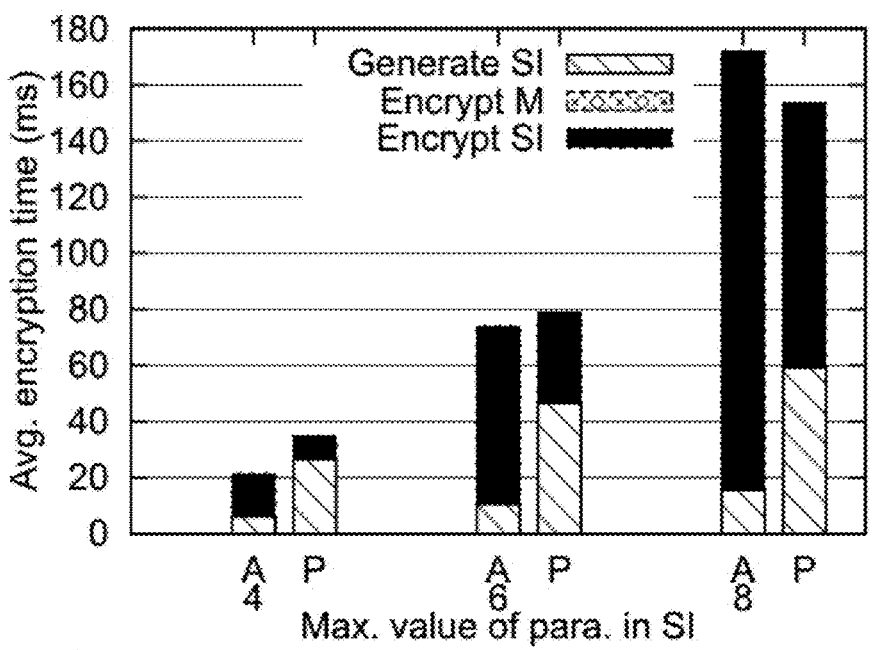
(b) Avg. encryption time of $Q$

Figure 10. (Cont)
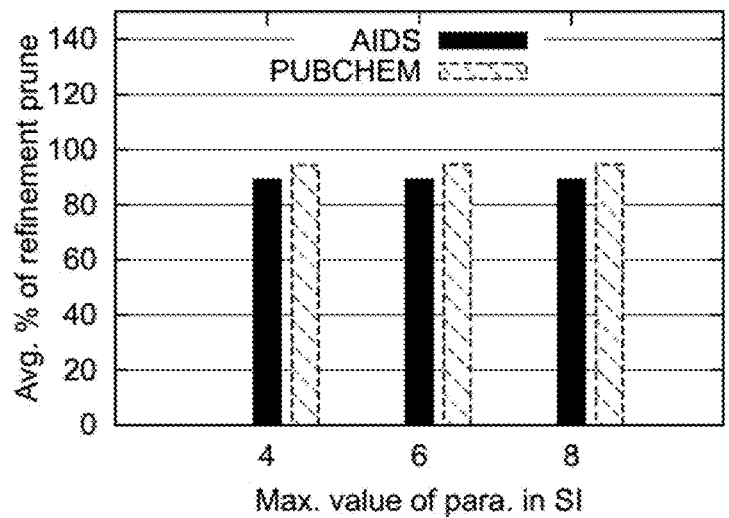
(c) Avg. % of $Qn$s pruned by SPRefine
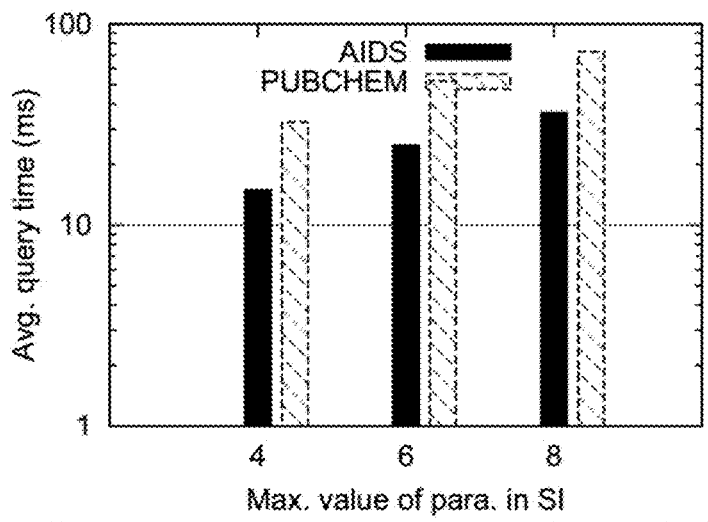
(d) AQT on $Qn$s pruned by SPRefine

Figure 10. (Cont)
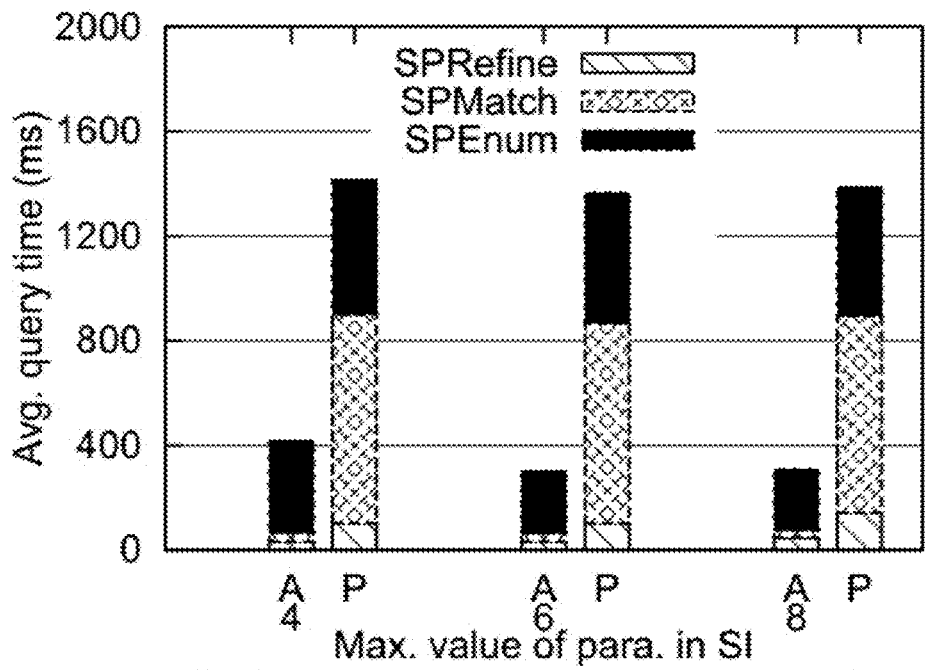
(e) AQT on non-pruned $Qns$
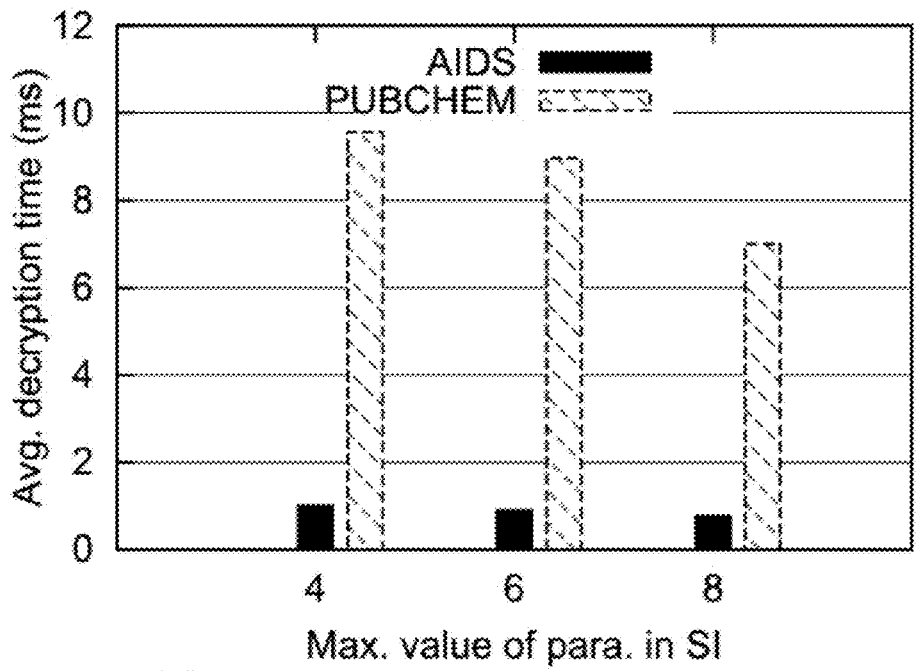
(f) Avg. decryption time

Figure 10. (Cont)
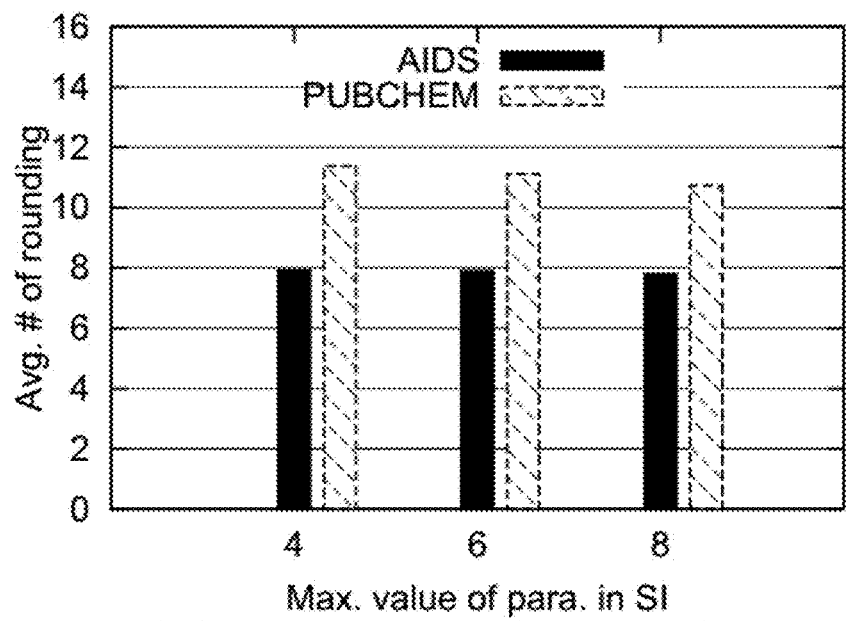
(g) Avg. # of roundings
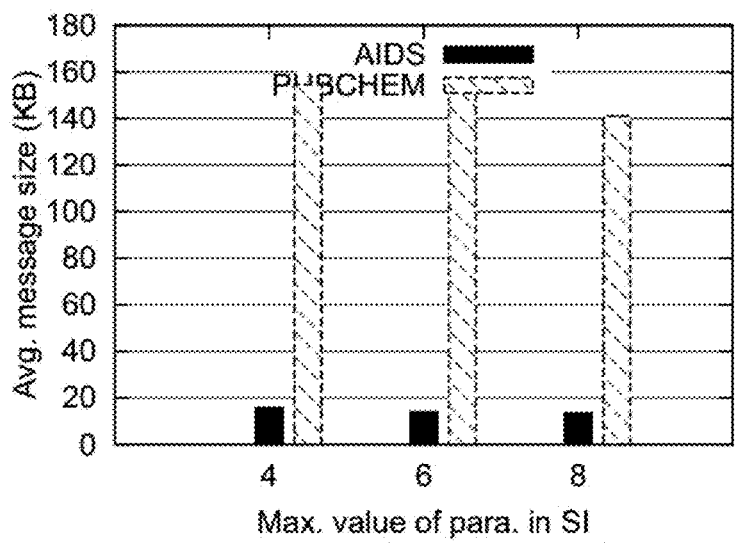
(h) Avg. message size the client received

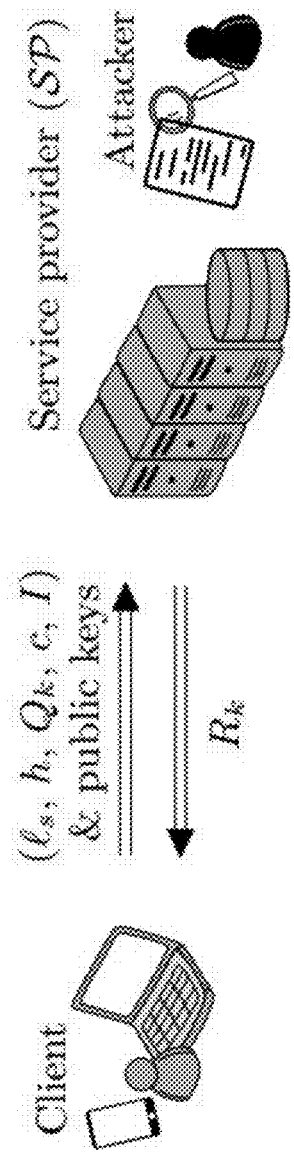
Figure 11. Overview of the system model.

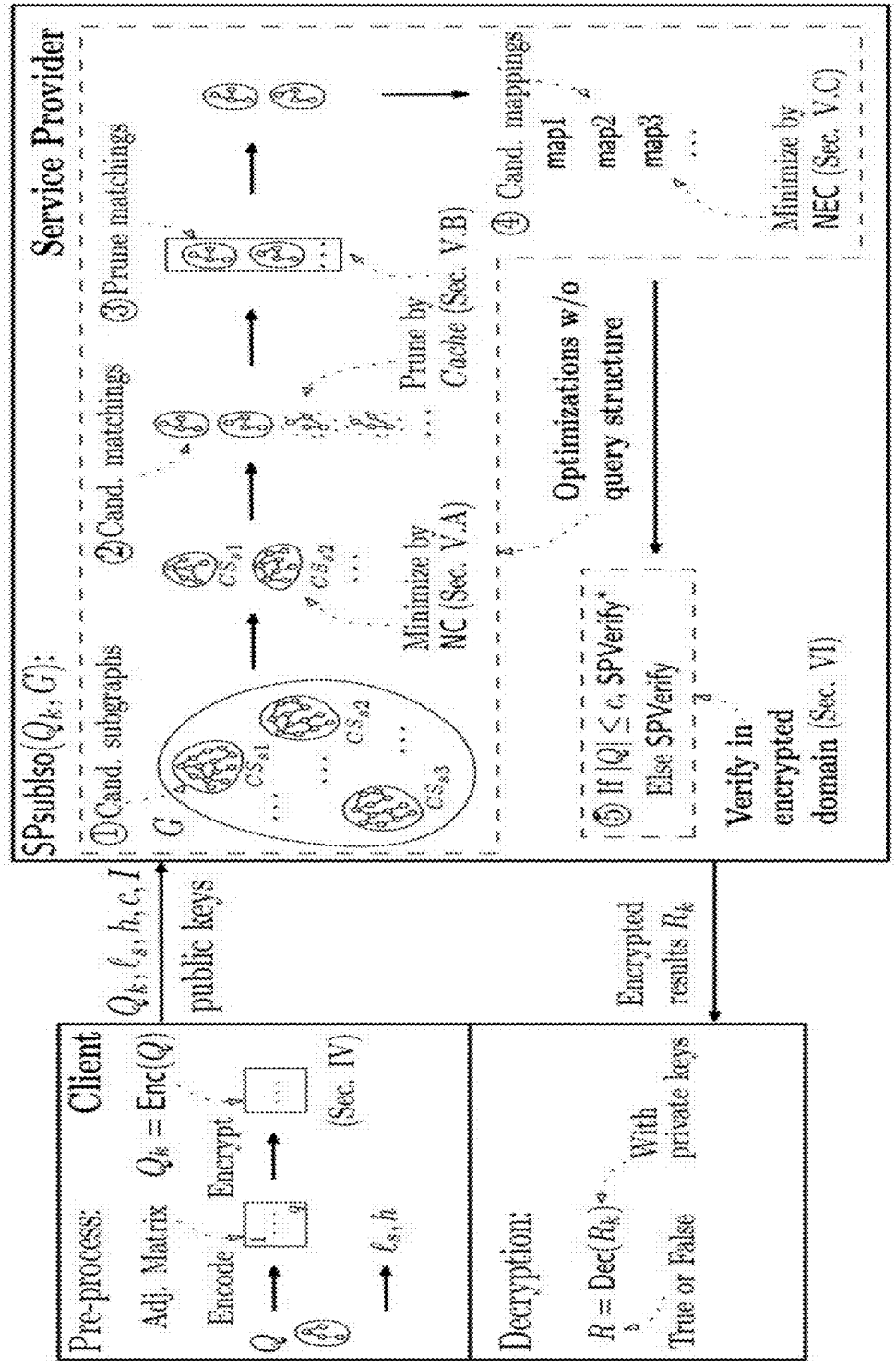
Figure 12. Overview of approach

Figure 13. (a) Illustration of the preprocessing at the client; (b) Construction of candidate subgraphs; and (c) Minimization of CSs by NC
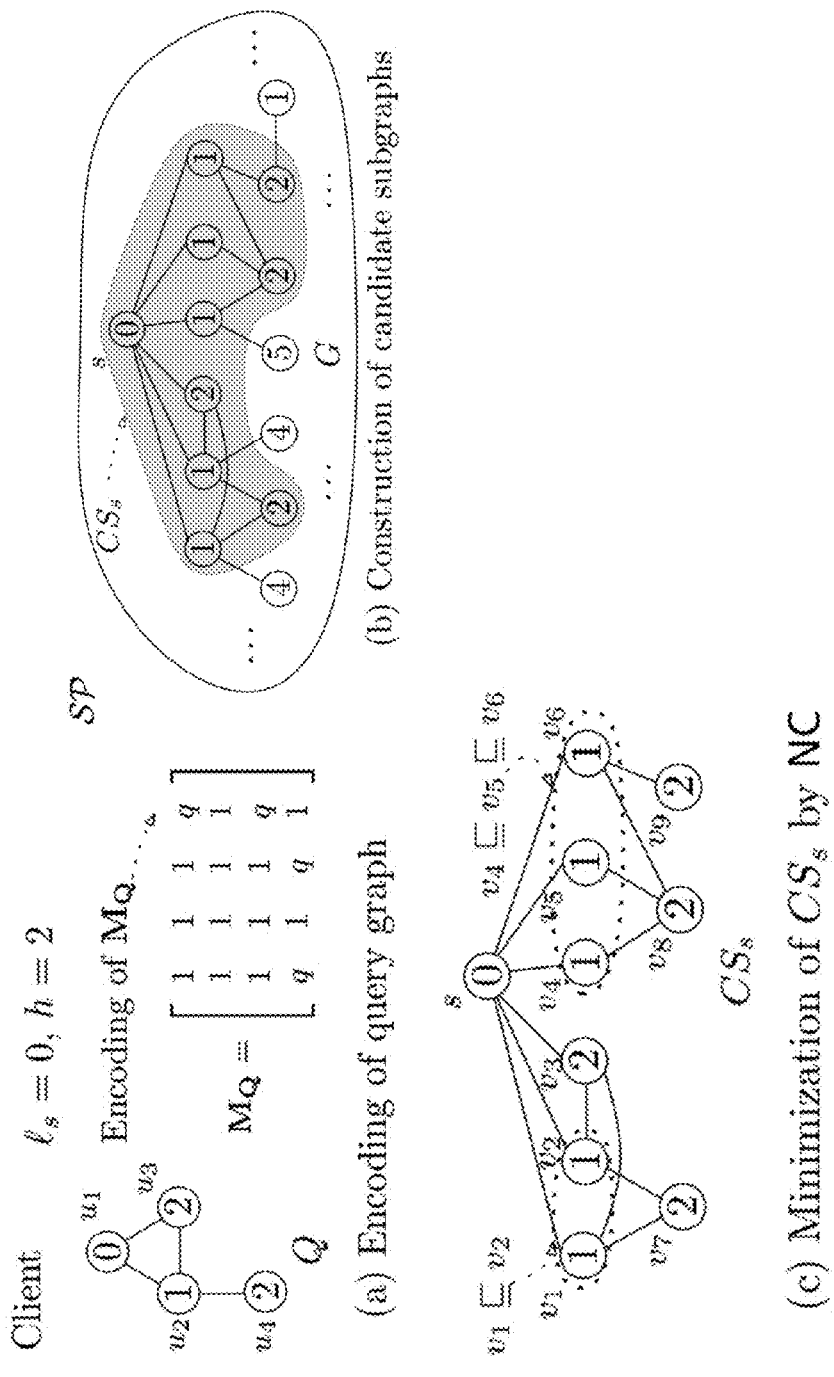

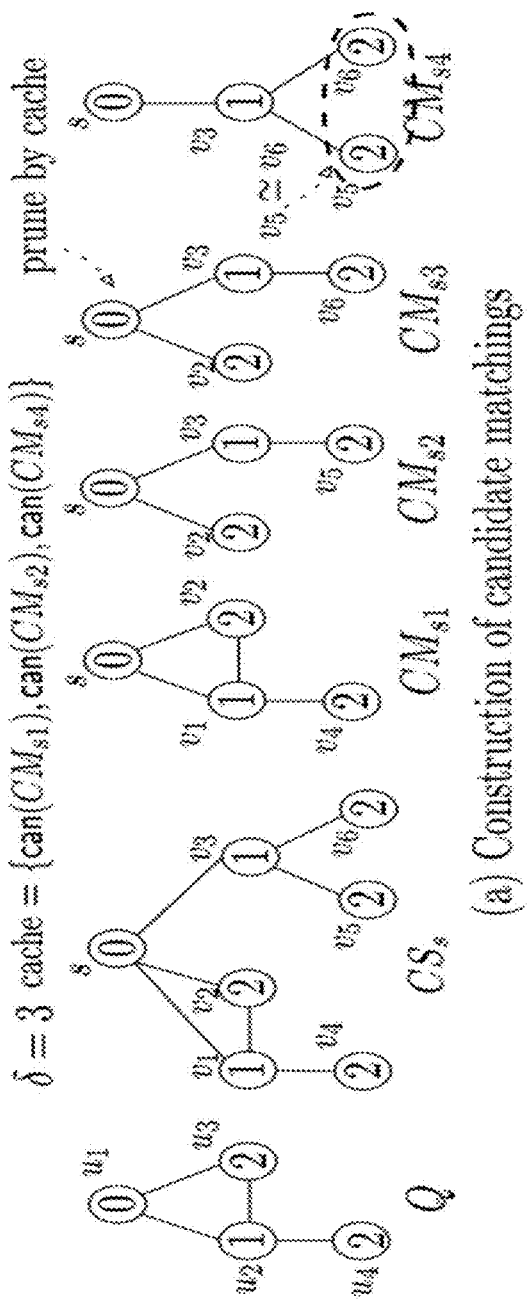
Figure 14. (a) Construction of candidate matchings; and (b) Enumeration of possible mappings.

Figure 14. (Cont)

| Mapping for $CM_{s1}$ | | Mapping for $CM_{s2}$ | | Mapping for $CM_{s4}$ |
|---|---|---|---|---|
| map1 | map2 | map3 | map4 | map5 |
| $u_1 \uparrow s$ | $u_1 \uparrow s$ | $u_1 \uparrow s$ | $u_1 \uparrow s$ | $u_1 \uparrow s$ |
| $u_2 \uparrow v_3$ | $u_2 \uparrow v_1$ | $u_2 \uparrow v_3$ | $u_2 \uparrow v_3$ | $u_2 \uparrow v_3$ |
| $u_3 \uparrow v_2$ | $u_3 \uparrow v_4$ | $u_3 \uparrow v_2$ | $u_3 \uparrow v_5$ | $u_3 \uparrow v_5$ |
| $u_4 \uparrow v_4$ | $u_4 \uparrow v_2$ | $u_4 \uparrow v_5$ | $u_4 \uparrow v_2$ | $u_4 \uparrow v_6$ |

(b) Enumeration of possible mappings

**Figure 15. SPVerify (and SPVerify\*) between $Q_k$ and $CM_{s1}$.**

map1: $R_1 = g^x(rq + \cdots + rq) \pmod{p}$ map2: $R_2 = g^x(rq + \cdots + rq)$ ⟵ violation by (2)

$R_k = R_1 \times R_2$
$\quad = g^{2x}(rq + \cdots)(rq + \cdots)$ (a). SPVerify between $Q_k$ and $CM_{s1}$ $R_1 = g^x(r \times \cdots \times r) \pmod{p}$ $R_2 = g^x(r \times \mathbf{rq} \times \cdots \times r)$ ⟵ violation by (6)

$R_k = R_1 + R_2$
$\quad = g^x((r \times \cdots) + (r \times \mathbf{rq} \times \cdots))$ (b). SPVerify\* between $Q_k$ and $CM_{s1}$ Figure 16. Average preprocessing time at the client
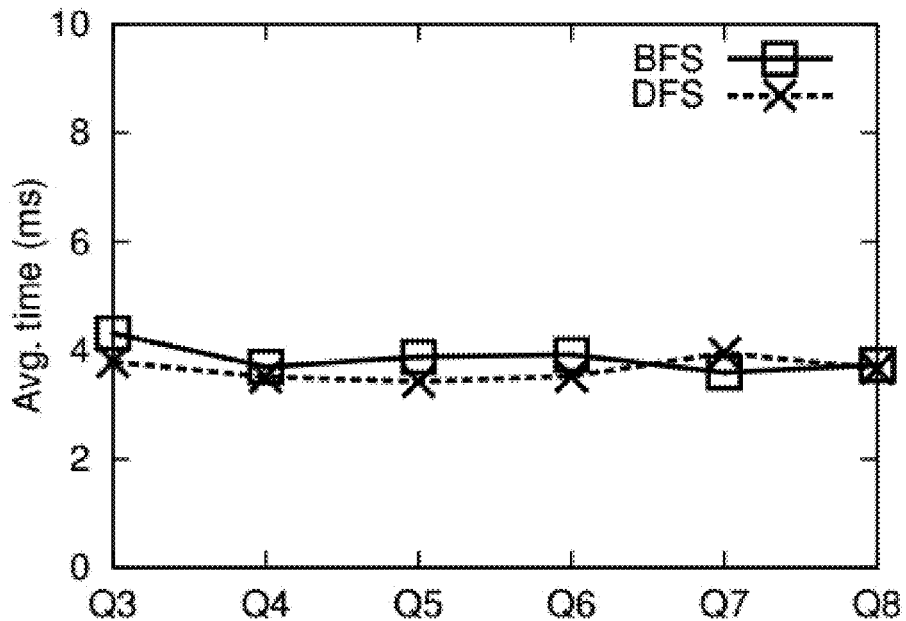
(a) DBLP
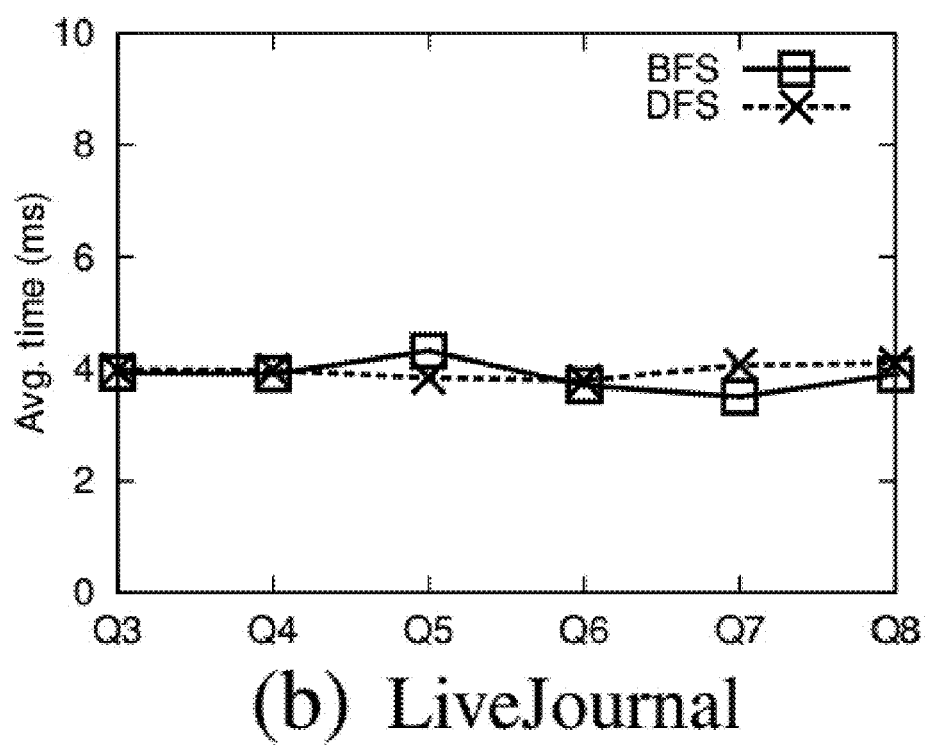
(b) LiveJournal Figure 17. Average received encrypted message size at the client
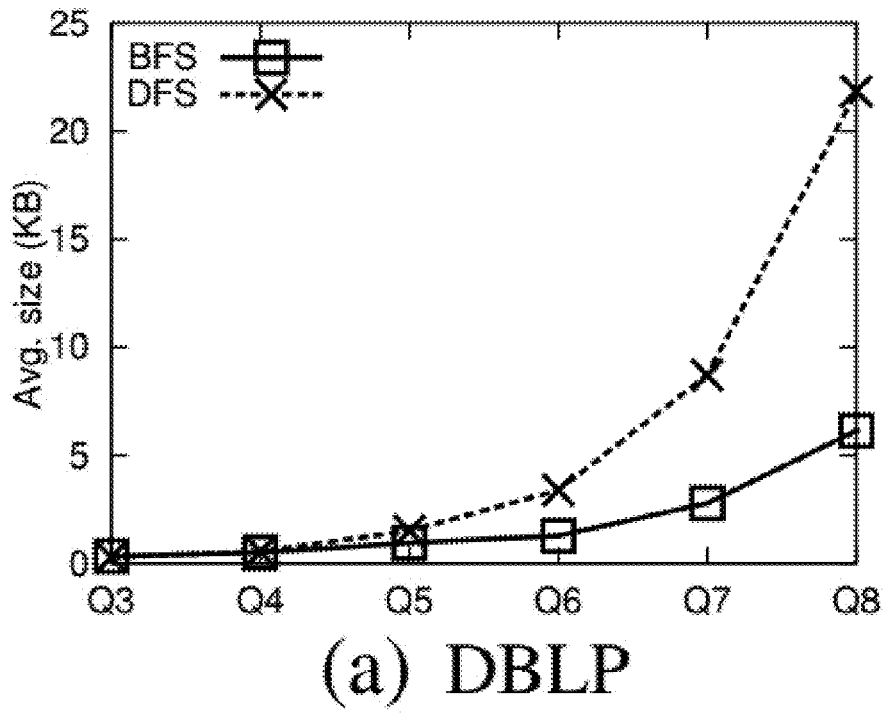
(a) DBLP
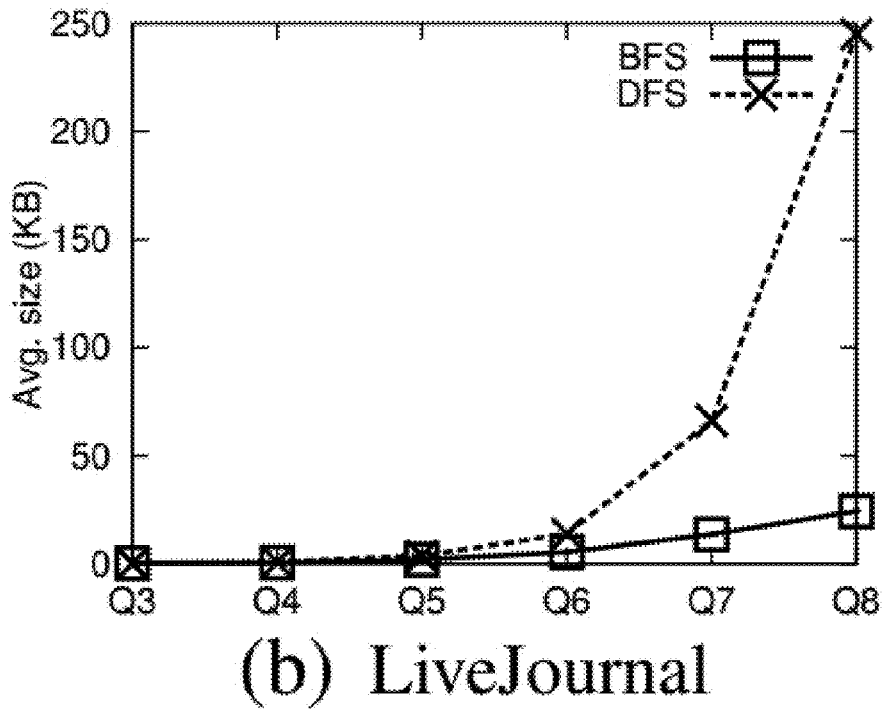
(b) LiveJournal Figure 18. Average decryption time at the client.
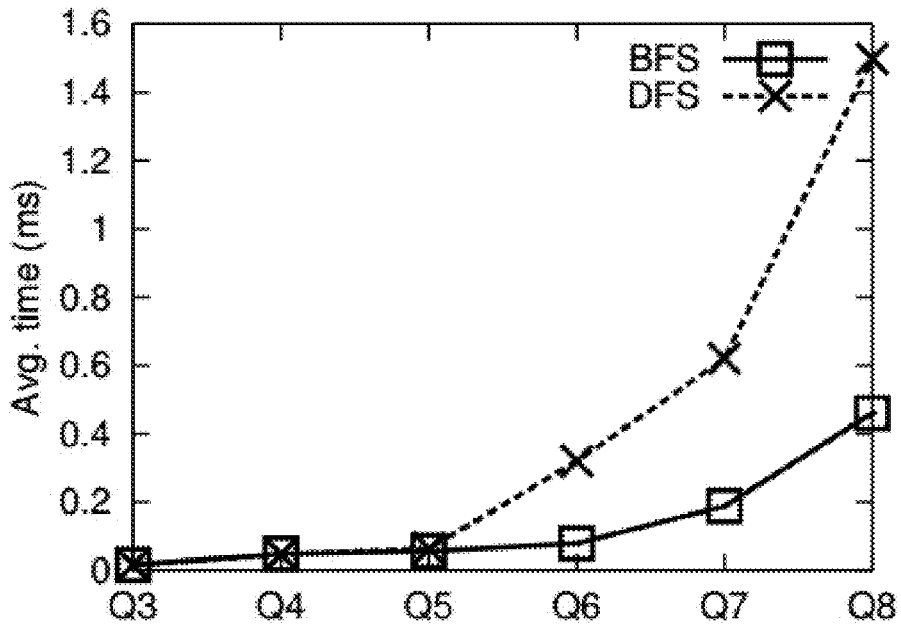
(a) DBLP
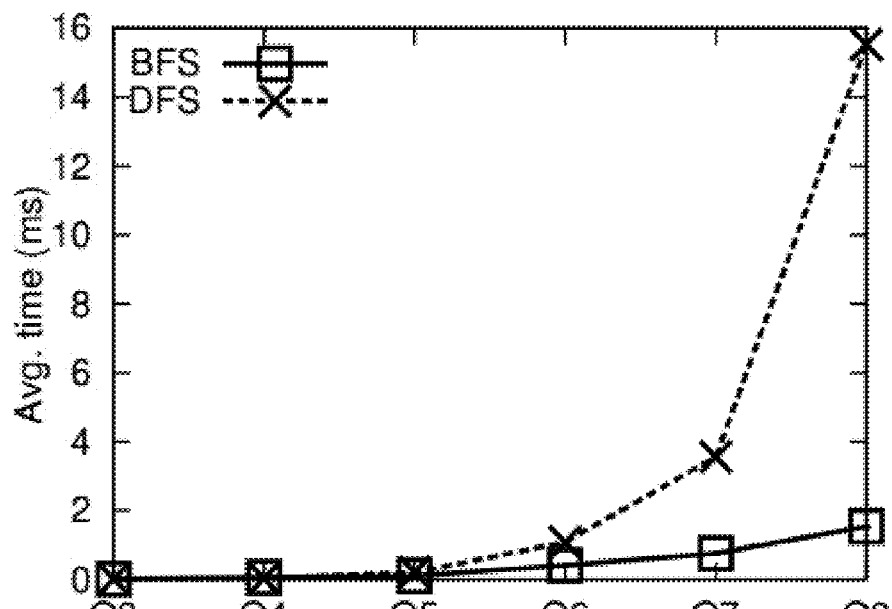
(b) LiveJournal Figure 19. Average total running time at the SP
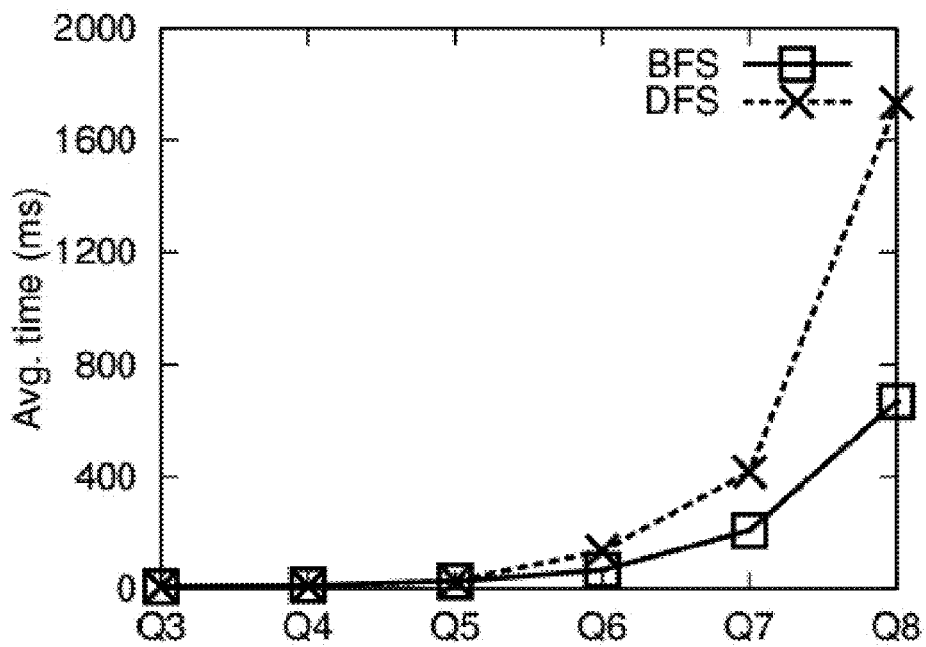
(a) DBLP
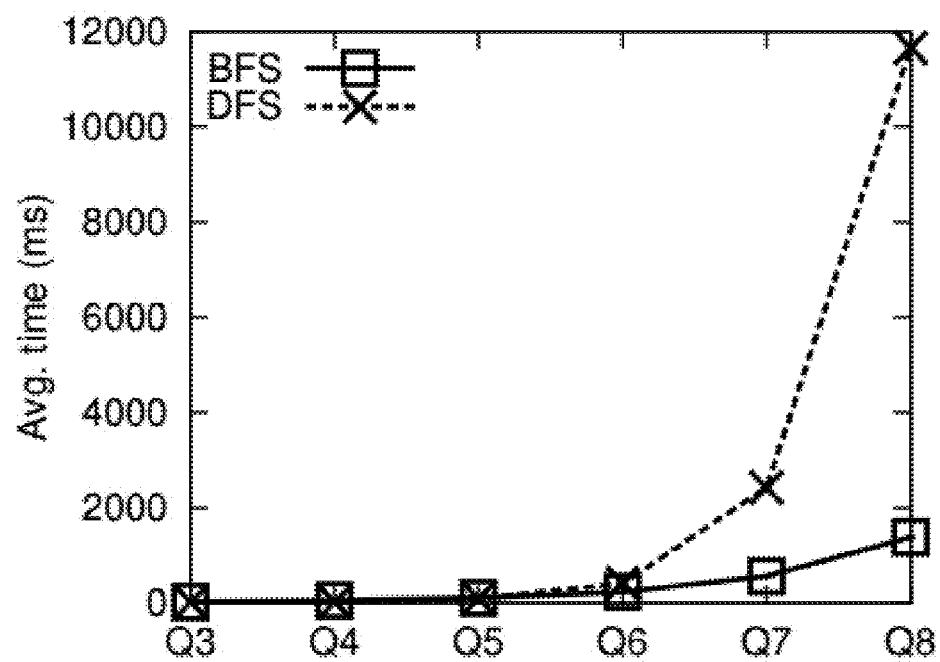
(b) LiveJournal Figure 20. Average % of reduced vertices in CSs by NC
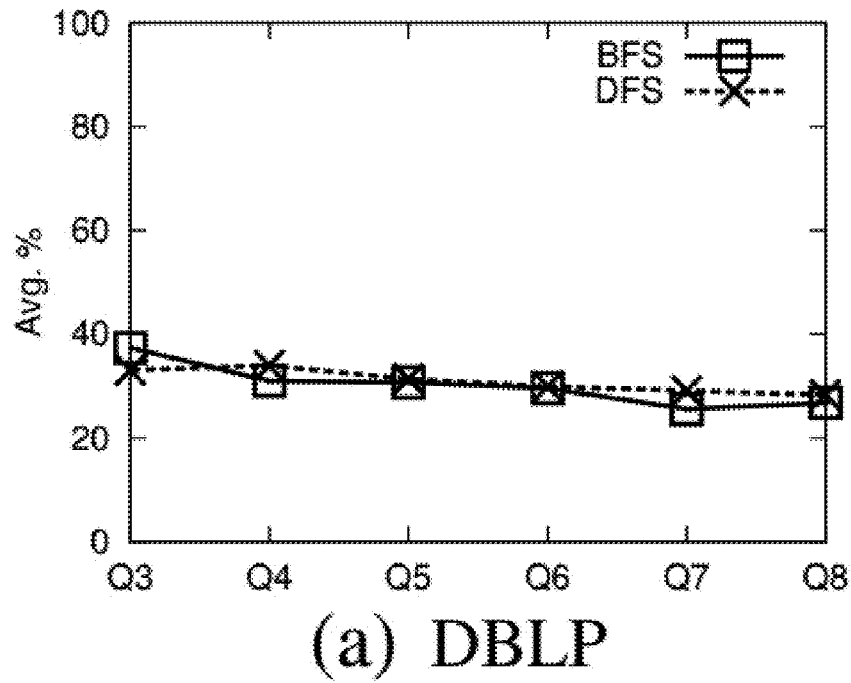
(a) DBLP
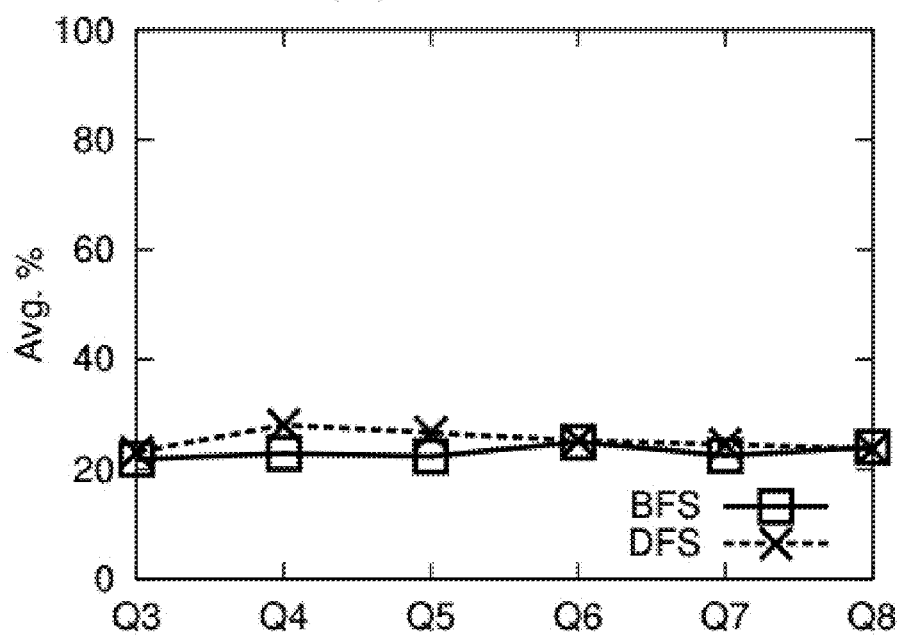
(b) LiveJournal Figure 21. Average % of the pruned redundant CMs by Cache.
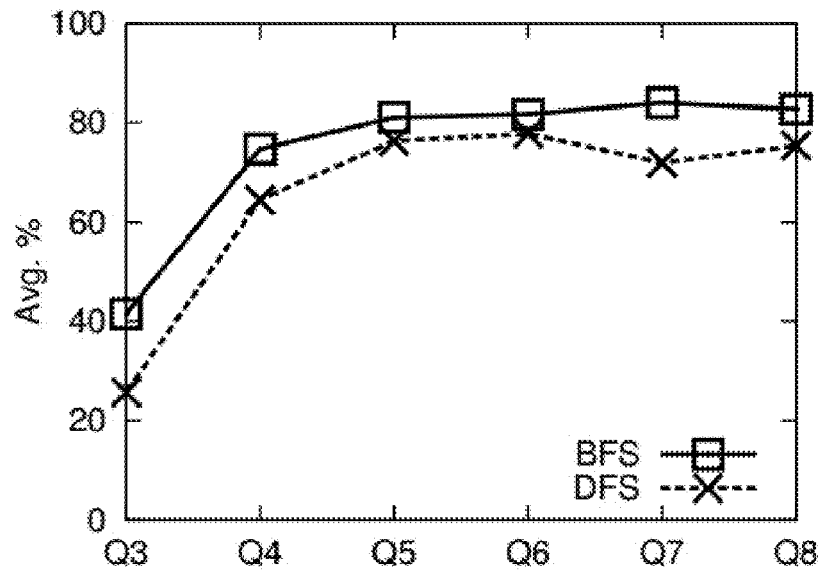
(a) DBLP
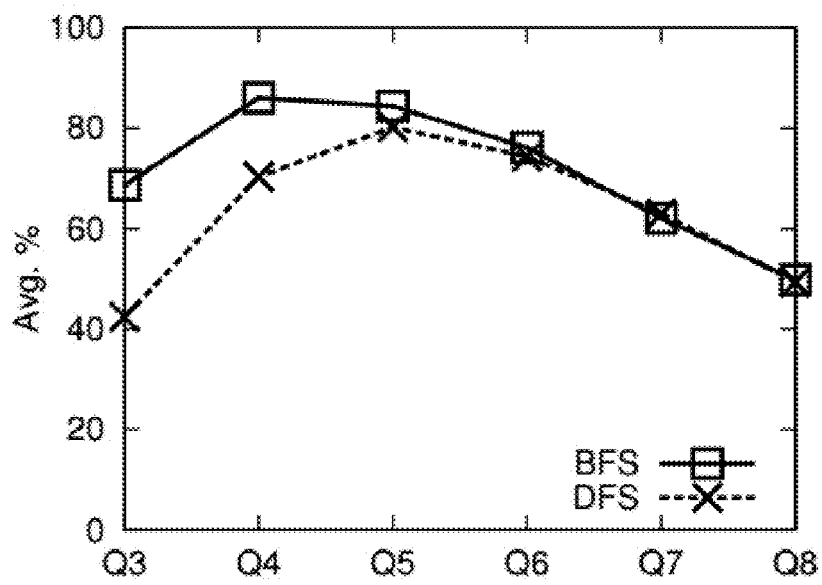
(b) LiveJournal Figure 22. Average Cache size at the SP
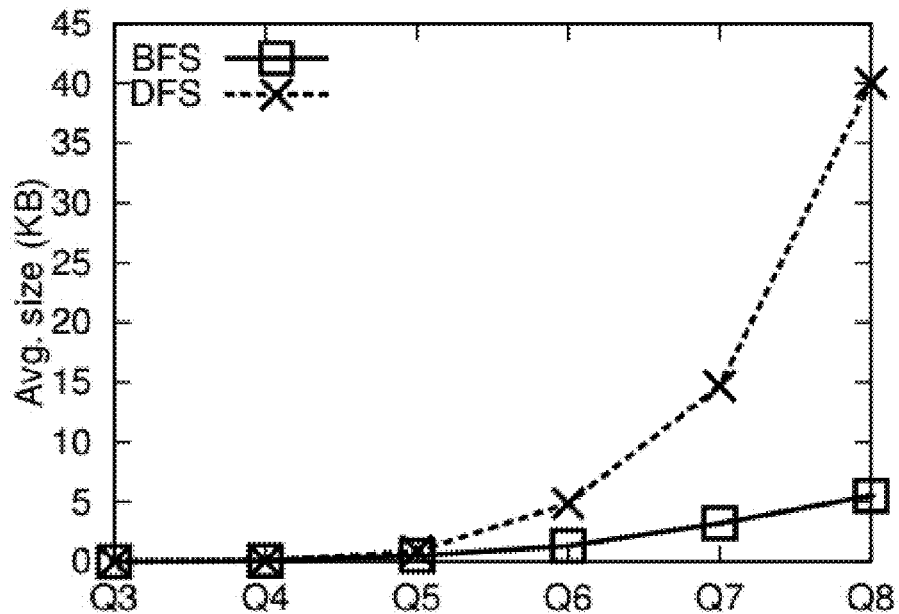
(a) DBLP
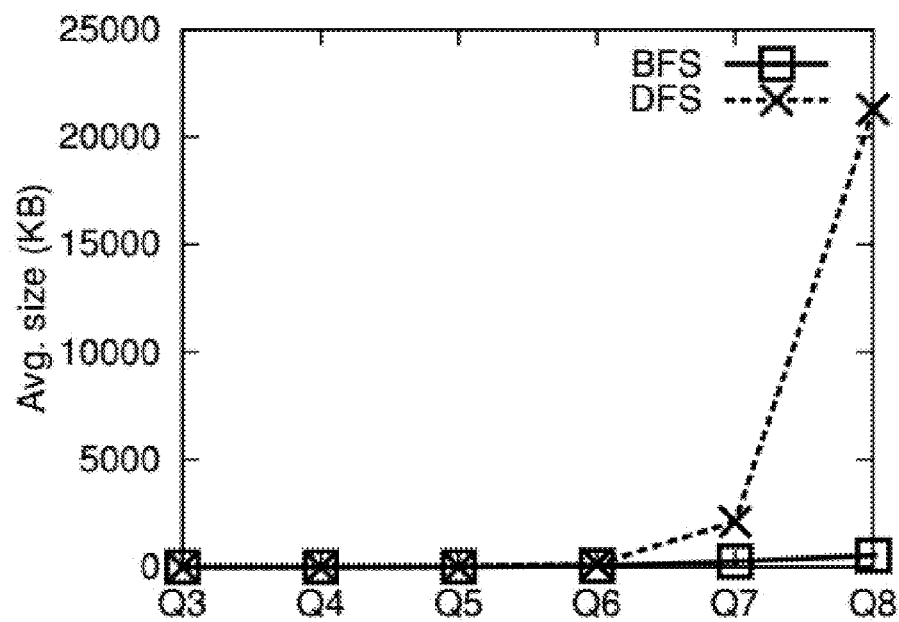
(b) LiveJournal Figure 23. Average % of the pruned redundant mappings by NEC.
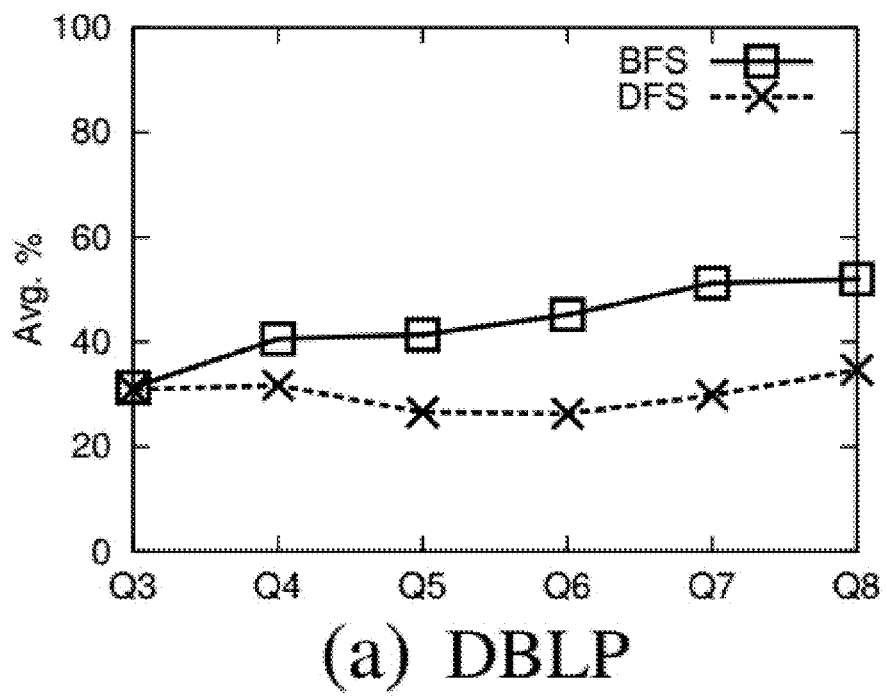
(a) DBLP
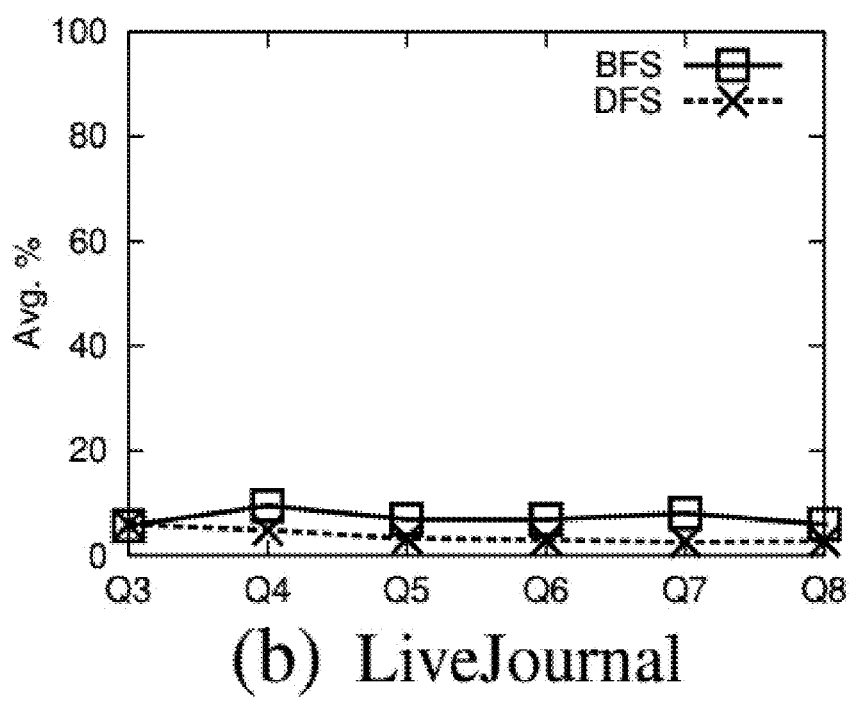
(b) LiveJournal Figure 24. Average size of messages $R_kS$ when c =11
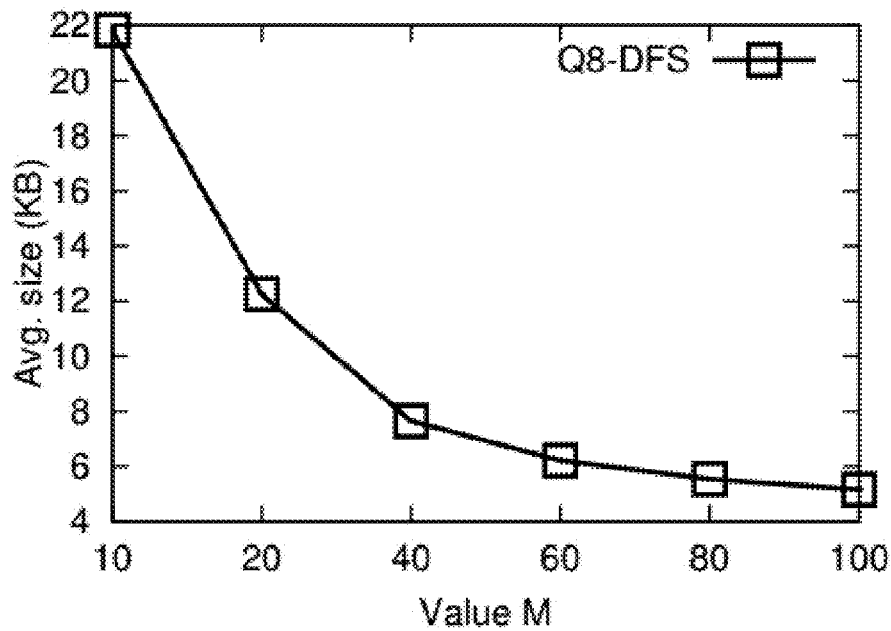
(a) DBLP
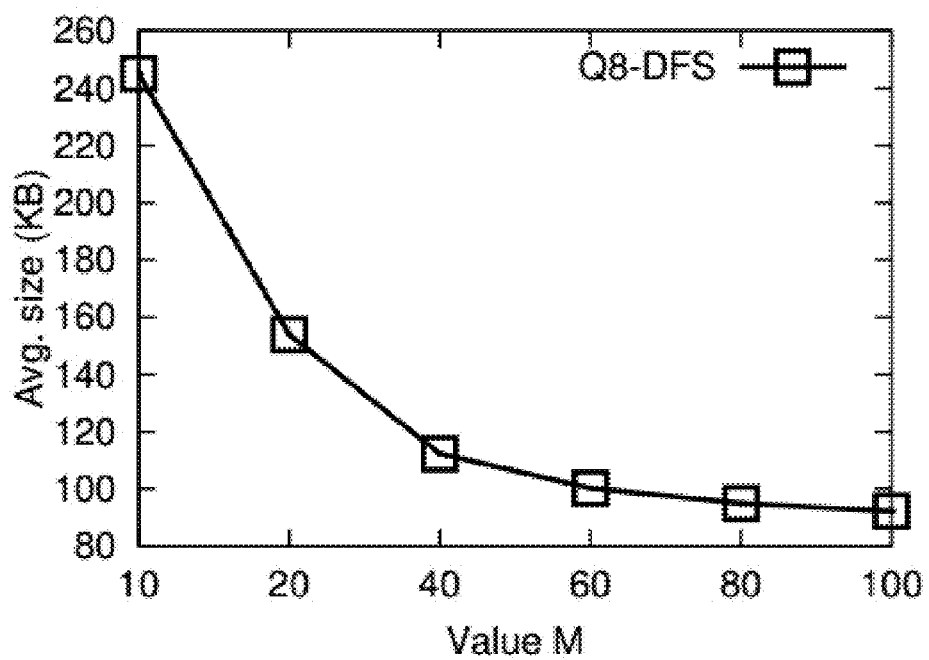
(b) LiveJournal

STRUCTURE-PRESERVING SUBGRAPH QUERIES

CROSS REFERENCE

This application claims the benefit of U.S. 62/170,122 filed Jun. 2, 2015. The entire disclosure of the preceding application is hereby incorporated by reference into this application.

FIELD OF INVENTION

The present invention relates to solving the issues related to subgraph query services with tunable preservation of privacy of structural information. More particularly, it relates to a novel cyclic group based encryption (CGBE) method for private matrix operations.

BACKGROUND OF INVENTION

Graphs are powerful tools for a wide range of real applications, from biological and chemical databases, social networks, citation networks to information networks. Large graph data repositories have been consistently found in recent applications. For example, PubChem is a real database of chemical molecules, which can be freely accessed via its web interface, for its clients to query chemical compounds. Another example, namely Daylight, delivers chemistry and chemical informatics technologies to life science companies and recently, it has provided web services to allow clients to access its technologies via a network. Subgraph query (via subgraph isomorphism), which is a fundamental and powerful query in various real graph applications, has actively been investigated for performance enhancements recently. However, due to the high complexity of subgraph query, hosting efficient subgraph query services has been a technically challenging task, because the owners of graph data may not always possess the information technology (IT) expertise to offer such services and hence may outsource to query service providers (SP). SPs are often equipped with high performance computing utilities (e.g., a cloud) that offer better scalability, elasticity and IT management. Unfortunately, as SPs may not always be trusted, security (such as the confidentiality of messages exchanged) has been recognized as one of the critical attributes of Quality of Services (QoS). This directly influences the willingness of both data owners and query clients to use SP's services. In the past decade, there is a bloom on the research on query processing with privacy preservation, for example, in the context of relational databases, spatial databases and graph databases. However, up to date, the problem of efficient private subgraph query has not yet been solved.

Therefore, it is an objective of the present invention is to provide solution to structure-preserving subgraph queries that is both efficient and private. The present invention solves structure preservations at two levels. The first level is termed structure-preserving subgraph query processing (SPQP) which preserves the structures of both subgraph queries and data graphs. The second level is termed asymmetric structure-preserving subgraph query processing (ASPQP) which preserves only the structure of subgraph queries. For ease of exposition, one shall present the present invention for SPQP and that for ASPQP separately.

Citation or identification of any reference in this section or any other section of this application shall not be construed as an admission that such reference is available as prior art for the present application.

SUMMARY OF INVENTION

Accordingly, it is an object of the present invention to provide in a first aspect of the present invention a method for structure-preserving subgraph query processing comprising operations of providing for a modified Ullmann's algorithm to create a structure-preserving structure;

facilitating structure-preserving structure computations;

providing private computations in encrypted domains for the structure-preserving structure computations; and optimizing mapping enumerations to correctly determine the subgraph structures.

The method according to the first aspect of the present invention wherein the modified Ullmann's algorithm comprising steps of enumerating all possible subgraph isomorphism mappings $M_i$s from query graph Q to data graph G;

verifying if the mapping $M_i$ is valid or not; and reducing the search space of $M_i$s by degree and neighborhood constraints.

The method according to the first aspect of the present invention wherein the structure-preserving structure computations comprising steps of transforming the structure-preserving structure into a series of mathematical computations via operations comprising enumerating all $M_i$s;

verifying the validity of $M_i$ by additions and multiplications using adjacency matrices of query $M_Q$ and $M_{\bar{G}}$, where $M_{\bar{G}}$ is the complement of adjacency matrices of graph $M_G$; and reducing the search space of $M_i$s by inner products using static indexes $SI_Q$ and $SI_G$ of Q and G, wherein $SI_Q$ ($SI_G$) is an ensemble of h-hop information of each vertex of Q ($SI_G$) represented by a bit vector.

The method according to the first aspect of the present invention wherein the private computations are provided via steps comprising using a cyclic group based private-key encryption scheme to encrypt $M_Q$ and $M_{\bar{G}}$ as encrypted matrices of query $M_{Qk}$ and encrypted matrices of graph $M_{\bar{G}k}$;

checking the validity of each mapping $M_i$, under the cyclic group based private-key encryption scheme with negligible false positives; and aggregating the computational results under the cyclic group based private-key encryption scheme to reduce communication overheads between client and service provider.

The method according to the first aspect of the present invention wherein the optimized mapping enumerations are provided via steps comprising introducing a protocol that involves the client's participation, who informs service provider useless enumerations;

exploiting private inner products on the static indexes to derive a refinement that reduces the number of possible mappings; and computing and encrypting indexes of the graphs offline, wherein those of the queries are computed once by clients online.

The method according to the first aspect of the present invention wherein the structure-preserving subgraph query processing is applied to asymmetric structure preserving query service via operations comprising a candidate subgraph exploration in the absence of query structure, to reduce a large data graph for query processing;

reducing the size of candidate subgraphs by using neighborhood containment;

a subgraph cache to prune the candidate matchings that are enumerated;

a robust encoding scheme and its verification method; and a model for the client to determine a proper encoding for his/her query.

Accordingly, it is an object of the present invention to provide in a second aspect of the present invention an apparatus for implementing structure-preserving subgraph query processing according to the first aspect of the present invention comprising
modules for a modified Ullmann's algorithm to create a structure-preserving structure;
modules for facilitating structure-preserving structure computations;
modules for providing private computations in encrypted domains for the structure-preserving structure computations; and
modules for optimizing mapping enumerations to correctly determine the subgraph structures.

The apparatus according to the second aspect of the present invention wherein the modified Ullmann's algorithm comprising steps of
enumerating all possible subgraph isomorphism mappings $M_i$s from query graph Q to data graph G;
verifying if the mapping $M_i$ is valid or not; and
reducing the search space of $M_i$s by degree and neighborhood constraints.

The apparatus according to the second aspect of the present invention wherein the structure-preserving structure computations comprising steps of
transforming the structure-preserving structure into a series of mathematical computations via operations comprising enumerating all $M_i$s;
verifying the validity of $M_i$ by additions and multiplications using $M_Q$ and $M_{\bar{G}}$, where $M_{\bar{G}}$ is the complement of $M_G$; and
reducing the search space of $M_i$s by inner products using static indexes $SI_Q$ and $SI_G$ of Q and G, wherein $SI_Q$ ($SI_G$) is an ensemble of h-hop information of each vertex of Q ($SI_G$) represented by a bit vector.

The apparatus according to the second aspect of the present invention wherein the private computations are provided via steps comprising
using a cyclic group based private-key encryption scheme to encrypt $M_Q$ and $M_{\bar{G}}$ as $M_{Qk}$ and $M_{\bar{G}k}$;
checking the validity of each mapping $M_i$, under the cyclic group based private-key encryption scheme with negligible false positives; and
aggregating the computational results under the cyclic group based private-key encryption scheme to reduce communication overheads between client and service provider.

The apparatus according to the second aspect of the present invention wherein the optimized mapping enumerations are provided via steps comprising
introducing a protocol that involves the client's participation, who informs service provider useless enumerations;
exploiting private inner products on the static indexes to derive a refinement that reduces the number of possible mappings; and
computing and encrypting indexes of the graphs offline, wherein those of the queries are computed once by clients online.

The apparatus according to the second aspect of the present invention wherein the structure-preserving subgraph query processing is applied to asymmetric structure preserving query service via operations comprising
a candidate subgraph exploration in the absence of query structure, to reduce a large data graph for query processing;
reducing the size of candidate subgraphs by using neighborhood containment;
a subgraph cache to prune the candidate matchings that are enumerated;
a robust encoding scheme and its verification method; and
a model for the client to determine a proper encoding for his/her query.

The apparatus according to the second aspect of the present invention wherein the modules are implemented in software on one or more general purpose microprocessors.

The apparatus according to the second aspect of the present invention wherein the modules are implemented in hardware computer logics.

The apparatus according to the second aspect of the present invention wherein the modules are implemented in one or more sub-apparatus on the same device.

The apparatus according to the second aspect of the present invention wherein the modules are implemented in one or more sub-apparatus across at least one network.

The apparatus according to the second aspect of the present invention wherein the modules are implemented in mobile devices.

The apparatus according to the second aspect of the present invention wherein the modules are implemented in client-server devices.

The apparatus according to the second aspect of the present invention wherein the modules are implemented in peer-to-peer devices.

The apparatus according to the second aspect of the present invention wherein the modules are implemented in both software and hardware.

Those skilled in the art will appreciate that the invention described herein is susceptible to variations and modifications other than those specifically described.

The invention includes all such variation and modifications. The invention also includes all of the steps and features referred to or indicated in the specification, individually or collectively, and any and all combinations or any two or more of the steps or features.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Other aspects and advantages of the invention will be apparent to those skilled in the art from a review of the ensuing description.

BRIEF DESCRIPTION OF DRAWINGS

The above and other objects and features of the present invention will become apparent from the following description of the invention, when taken in conjunction with the accompanying drawings, in which:

FIG. 1 shows an overview of the system model.

FIG. 2 shows an overview of an embodiment of the present invention.

FIG. 3 shows an adjacency matrices of Q and G; Two possible mappings ($M_1$ and $M_2$) and a violation in $C_2$.

FIG. 4 shows (a) The truth table of $M_Q \overline{C_i}$; (b) Illustration of $M_Q$ and $M_{\overline{G}}$; and (c) TMatch.

FIG. 5 shows (a) The encoding of the truth table shown; (b) Encryption by CGBE; and (c) Illustration of SPMatch with $M_1$ and $M_2$.

FIG. 6 shows illustration of mapping enumerations and SPEnum.

FIG. 7 shows (a) Illustration of the h-hop vertices and static index; and (b) a refinement by the index.

FIG. 8. Performance on varying query sizes on real and synthetic datasets.

FIG. 9 shows the effectiveness of the starting pruning depth d.

FIG. 10 shows the effectiveness of SI.

FIG. 11 shows an overview of the asynchronous system model.

FIG. 12 shows an overview of the approach.

FIG. 13 shows (a) Illustration of the preprocessing at the client; (b) Construction of candidate subgraphs; and (c) Minimization of $CS_s$ by NC.

FIG. 14 shows (a) Construction of candidate matchings; and (b) Enumeration of possible mappings.

FIG. 15 shows SPVerify (and SPVerify*) between $Q_k$ and $CM_{s1}$

FIG. 16 shows the average preprocessing time at the client.

FIG. 17 shows the average received encrypted message size at the client.

FIG. 18 shows the average decryption time at the client.

FIG. 19 shows the average total running time at the SP.

FIG. 20 shows the average % of reduced vertices in $CS_s$ by NC.

FIG. 21 shows the average % of the pruned redundant $CM_s$ by Cache.

FIG. 22 shows the average Cache size at SP.

FIG. 23 shows the average % of the pruned redundant mappings by NEC.

FIG. 24 shows the average size of messages $R_k$s when c=11.

DETAILED DESCRIPTION OF INVENTION

The present invention is not to be limited in scope by any of the specific embodiments described herein. The following embodiments are presented for exemplification only.

Motivating Example

Consider a pharmaceutical company with revenue that depends mostly on the invention of health care products. The company may have discovered new compounds for a new product. To save laboratory work, it may query the compounds from proprietary biological pathway networks to check whether it is possible for the ingredient compounds to form other compounds via certain chemical reactions (a structural pattern from the network). However, on the one hand, the company is reluctant to expose the queries (the ingredients) to the SP, as it may apply for patents for the synthesis. On the other hand, the owner of the pathway networks may not only lack the expertise to host query services but may also be reluctant to release the networks to the public. The owner is willing to release it to paid users only. Hence, it is crucial to protect both the queries and the network from the SP. Such privacy concerns also arise from social networks and biological networks, among many other applications.

In the present invention, one investigates that the query client may prefer not to expose the structure of query graphs to the SP, and meanwhile, the data owner may not want the SP to be able to infer the structure of their graph data. The fundamental problem being studied is to evaluate subgraph query at the SP with a preservation of the structures of both the query graphs and graph data in the paradigm of the query services. In the present invention, in particular, aims to protect the adjacency matrices of the queries and/or data graph from the SP. To the knowledge, such a problem has never been addressed before.

In the recent work, one has addressed the authenticity of the answers of subgraph query, but not their confidentiality. A host of related work is also on privacy-preserving graph query. However, none of these studies can support subgraph query with the structure preservation of the query and graph data. Another category of related research is on the study of privacy-preserving graph publication. As the published data are modified in a non-trivial manner (e.g., by sanitization), it is not clear how subgraph query can be supported.

The intrinsic difficulty of this problem is that the SP cannot optimize query processing by directly using the structures of the queries and/or data graph, since such information cannot be exposed. However, most of the existing subgraph isomorphism algorithms (e.g., VF2, QuickSI and Turbo$_{iso}$) for the query services must traverse the graph, which by definition leaks structural information. A naïve method is to transfer the entire database to the client for query processing. However, it is inefficient when the database is large and can be infeasible due to the ownership restrictions of the databases.

Our techniques for a structure-preserving subIso (denoted as SPsubIso) are derived from the Ullmann's algorithm, a seminal algorithm for subgraph isomorphism. One revises the Ullmann's algorithm into three steps that form the foundation of the techniques. (1) Enum enumerates all possible subgraph isomorphism mappings $M_i$s from query graph Q to data graph G; (2) Match verifies if the mapping $M_i$ is valid or not; and (3) Refine reduces the search space of $M_i$s by degree and neighborhood constraints. The benefits of adopting the Ullmann's algorithm are twofold: (1) the query evaluation between Q and G is mostly a series of matrix operations between their adjacency matrices $M_Q$ and $M_G$. It does not require traversals on structures; and (2) its query evaluation requires simple structures. This makes the privacy analysis simpler.

Specifically, to facilitate structure-preserving computations, one first transforms subIso into a series of mathematical computations, denoted as TsubIso. TsubIso comprises three steps, corresponding to subIso: (1) TEnum enumerates all $M_i$s; (2) TMatch verifies the validity of $M_i$ by additions and multiplications using $M_Q$ and $M_{\overline{G}}$, where $M_{\overline{G}}$ is the complement of $M_G$; and (3) TRefine reduces the search space of $M_i$s by inner products on the present static indexes $SI_Q$ and $SI_G$ of Q and G, where $SI_Q$ ($SI_G$) is an ensemble of h-hop information of each vertex of Q ($SI_G$) represented by a bit vector.

The major benefit of these three steps of TsubIso is that only mathematical operations are involved, which allows an adoption of private computations in encrypted domains. Based on TsubIso, one presents the novel structure-preserving subIso (SPsubIso). In particular, one first describes a new private-key encryption scheme, namely cyclic group based encryption scheme (CGBE), to encrypt $M_Q$ and $M_{\overline{G}}$ as $M_{Qk}$ and $M_{\overline{G}k}$. Then, one introduces SPMatch involving the additions and multiplications under CGBE to check the validity of each mapping $M_i$, with negligible false positives. Further, the computation results under CGBE can be aggregated to reduce communication overheads between the client and the SP. One proves that CGBE is perfectly secure under chosen plaintext attack and the SP cannot learn any structures from SPMatch.

Next, one describes SPEnum which optimizes the mapping enumeration by introducing a protocol that involves the client's participation, who informs the SP useless enumerations. In addition, to optimize SPsubIso, one develops SPRefine which exploits private inner products on the static indexes to derive a refinement that reduces the number of possible mappings. The indexes of the graphs are computed and encrypted offline, whereas those of the queries are computed once by the clients online. One analyzes the effects of these optimizations on the probabilities that the SP may correctly determine graph structures. Therefore, the clients may tune the trade-off between performances and privacy requirements.

To summarize, the contributions of the present invention for structure-preserving subgraph query processing (SPQP) are as follows:

We transform the Ullmann's algorithm subIso as TsubIso. It only involves a constant number of mathematical computations (with respect to the given data and query sizes), such that its private version can be introduced and analyzed;

We present a structure-preserving subIso (SPsubIso) based on TsubIso, consisting of SPMatch, SPEnum and SPRefine. Specifically, one describes CGBE for SPMatch, which supports efficient encryption and decryption, partial additions and multiplications, and aggregation of computation results. One introduces a protocol for SPEnum that involves the client to eliminate useless mappings. One describes SPRefine that exploits private inner products of static indexes to further optimization;

We analyze the privacies of SPMatch, SPEnum and SPRefine; and

We conduct detailed experiments to verify that SPsubIso is efficient and the optimizations are effective.

Problem Formulation

This section presents a formulation of the problem studied in the present invention for SPQP. More specifically, one presents the system model, privacy target, attack model, and problem statement.

System Model.

One follows the system model that has been well received in the literature of database outsourcing (shown in FIGS. 1 and 2), and known to be suitable for many applications. It consists of three parties:

(1) Data owner: The owner owns and encrypts the graph data G. He/she then outsources the encrypted graph to the service provider and delivers the secret keys to clients for encryption of the query graphs and decryption of the encrypted result;

(2) Service provider (SP): The SP may be equipped with powerful computing utilities such as a cloud. The SP evaluates a client's query over the encrypted data, on behalf of the data owner, and returns the encrypted result to the client; and (3) Client: A client encrypts the query graph Q using the secret keys, submits it to the SP, and decrypts the returned encrypted result to obtain the final answer.

Attack Model.

One assumes the dominating semi-honest adversary model from literature, where the attackers are honest-but-curious and the SP may also be the attacker. For presentation simplicity, one often terms the attackers as the SP. One assumes that the attackers are the eavesdroppers and adopt the chosen plaintext attack. One assumes that the SP and clients are not allowed to collude.

Privacy Target.

To facilitate a technical discussion, one assumes that the privacy target is to protect the structures of a query graph Q and a graph data G from the SP under the attack model defined above. The structural information of Q and G considered is the adjacency matrices of Q and G, respectively. More specifically, the probability that the SP correctly determines the values of the adjacency matrix of the graph is guaranteed to be lower than a threshold with reference to that of random guess.

The problem statement of the present invention can be stated as follows: Given the above system and attack model, one seeks an efficient approach to facilitate the subgraph isomorphism query services with preserving the above defined privacy target.

Preliminaries

In this section, one first discusses the background for the subgraph query and revise the classical Ullmann's algorithm.

Subgraph Query

The present invention assumes a graph database is a large collection of graphs of modest sizes. One considers undirected labeled connected graphs. A graph is denoted as $G=(V,E,\Sigma,L)$, where $V(G)$, $E(G)$, $\Sigma(G)$ and $L$ are the set of vertices, edges, vertex labels and the function that maps a vertex to its label, respectively. One uses $Deg(v_i,G)$ to denote the degree of the vertex $v_i$ in graph G. In the present invention, one focuses on the graph with only vertex labels. the present techniques can be extended to support the graph with edge labels with minor modifications.

Definition 1:

Given two graphs $G=(V,E,\Sigma,L)$ and $G'=(V',E',\Sigma',L')$, a subgraph isomorphism mapping from G to G' is an injective function $f:V(G) \to V(G')$ such that $$\forall u \in V(G), f(u) \in V(G'), L(u)=L'(f(u)); \text{ and}$$

$$\forall (u,v) \in E(G), (f(u),f(v)) \in E(G').$$

We say a graph G is a subgraph of another graph G' if and only if there exists a subgraph isomorphism mapping (in short mapping) from G to G', denoted as $G \subseteq G'$ or subIso (G, G')=true. It is known that deciding whether G is the subgraph of G' is NP-hard. Subgraph isomorphism query or simply subgraph query can be described as follows.

Definition 2:

Given a query graph Q and a graph database, the subgraph query is to retrieve the graphs from the database where Q is a subgraph of the graphs.

Revised Ullmann's Algorithm

Subgraph query has been a classical query. As motivated in an earlier section, the Ullmann's algorithm is simple for privacy preservation. In this subsection, one revises the Ullmann's algorithm into three interleaving steps, namely enumeration, matching and refinement. These form a foundation of the discussions.

Prior to the algorithmic details, one presents some notations used in the present invention. One uses subIso to refer to as the Ullmann's algorithm. One denotes a query as $Q=(V,M_Q,\Sigma,L)$ and graph as $G=(V,M_G,\Sigma,L)$, $m=|V(Q)|$ and $n=|V(G)|$, $M_Q$ and $M_G$ are the adjacency matrices of Q and G, respectively. $M_Q(j,k)$ is a binary value, where $M_Q(j,k)=1$ if $(v_j,v_k)\in E(Q)$, and otherwise 0. The symbols j, k here are node ids (aka node index). For presentation simplicity, One may sometimes use the nodes themselves (i.e. $M_Q(v_i,v_j)$) to denote the entries of the adjacency matrix when such a notation makes the presentation clearer. In particular, the former is often used for the description of the invention for SPQP and the latter is often adopted for describing that for ASPQP. The values of the entries of $M_G$ are defined, similarly. Both adjacency matrices $M_Q$ and $M_G$ carry the most fundamental structural information, i.e., the edge information. One uses a m×n binary matrix M to represent the vertex label mapping between Q and G. Specifically, $\forall j,k$, $M(j,k)=1$ if $L(v_j)=L(v_k)$, where $v_j\in V(Q)$ and $v_k\in V(G)$; and otherwise 0.

The revised Ullmann's algorithm (subIso) is detailed in Algo. 1. subIso takes Q and G as input and returns true if Q is the subgraph of G. Initially, it determines the vertex label mapping M (Lines 1-2). Then, subIso checks from M if there is a subgraph isomorphism mapping from Q to G by using three steps: (1) Enum; (2) Match; and (3) Refine. Next, one highlights some details of each step.

Enumeration (Lines 8-17).

Enum enumerates all possible subgraph isomorphism mappings from Q to G by M. Each possible mapping is denoted as $M_i$. Each column of $M_i$ contains at most one 1 and each row of $M_i$ has only one 1 (Lines 12-13). $M_i$ is enumerated from M row by row (Line 14). When an $M_i$ is obtained (Line 8), Match checks if $M_i$ is a subgraph isomorphism mapping (Line 9). It is easy to see that the number of possible $M_i$s enumerated is $O(n^m)$.

---

Algorithm 1 Revised Ullmann's algorithm subIso (Q,G)

Input: The query graph Q and the data graph G
Output: True if Q is a subgraph of G, False otherwise
1:  Initialize $M_i := 0$
2:  Generate M from (V,Σ,L) of Q and G
3:  if!Refine (M,Q,G)        /* Refinement */
4:      return False
5:  if !Enum (0,$M_i$,M,Q,G)     /* Enumeration */
6:      return False
7:  return True
Procedure 1.1 Enum (d,$M_i$,M,Q,G)
8:  if d = m
9:      return Match ($M_i$,Q,G)    /* Matching */
10: if!Refine (M,Q,G)        /* Refinement */
11:     return False
12: for each c, where c < n,M(d,c) = 1, and $\forall d' < d, M_i(d',c) = 0$
13:     $M_i(d,c) := 1$
14:     if Enum (d + 1,$M_i$,M,Q,G)
15:         return True
16:     $M_i(d,c) := 0$
17: return False
Procedure 1.2 Match ($M_i$,Q,G)
18:     $C_i = M_i M_G M_i^T$
                /* violation*/
19:     if $\exists j,k, M_Q(j,k) = 1 \wedge C_i(j,k) = 0$
20:         return False
21:     return True
Procedure 1.3 Refine (M,Q,G)
22:     do $\forall j,k, M(j,k) = 1$
23:         if degree constraint or neighborhood constraint fails
24:             M(j,k) := 0

---

Algorithm 1 Revised Ullmann's algorithm subIso (Q,G)

25:     while M is not changed
26:     if $\exists j, s.t., \forall k, M(j,k) = 0$
27:         return False
28: return True

---

Matching (Lines 18-21).

For each $M_i$ enumerated from M, if there exists a matrix $C_i$, $C_i = M_i M_G M_i^T$, such that $\exists j,k$, $$M_Q(j,k)=1 \wedge C_i(j,k)=0 \quad (1)$$

then such an $M_i$ cannot be an subgraph isomorphism mapping from Q to G. Note that $C_i$ intuitively represents the adjacency matrix of a subgraph of G, that Q may be isomorphic to through $M_i$. Formula 1 states that there is an edge between vertices j and k in Q but no corresponding edge in the subgraph of G, represented by $C_i$. Such an $M_i$ is definitely not a mapping. One terms the case in Formula 1 as a violation of subgraph isomorphism (or simply violation). $M_i$ without violation is called a valid mapping. That is, Q is a subgraph of G through $M_i$.

Refinement (Lines 22-28).

The number of 1's in M significantly increases the number of $M_i$ to be enumerated in worst case. In the Ullmann's algorithm, there are two optimizations, called refinements, to reduce the number of 1's in M. Intuitively, the first refinement exploits the degree constraint, whereas the second refinement relies on the neighborhood constraint: $\forall j,k$, $M(j,k)=1 \Rightarrow$ $$Deg(v_j,Q) \leq Deg(v_k,G); \text{ and} \quad (1)$$

$$\forall x, M_Q(j,x)=1 \Rightarrow \exists y, M(x,y) M_G(k,y)=1. \quad (2)$$

Refinement is performed when (1) M is determined (Line 3) and (2) $M_i$s are enumerated (Line 10). For any pair of j and k, $M(j,k)=1$, if either one of the constraints is not satisfied, the algorithm then flips $M(j,k)$, i.e., sets $M(j,k)=0$ (Lines 22-24). If any row of M contains only 0s, it reports there is no valid mapping (Lines 26-27).

Example 1

FIG. 3 Shows an Example for Algo. 1

The LHS shows the query graph Q and the data graph G and their adjacency matrices (below the graphs). The RHS shows the enumeration of $M_i$s. $C_1$ is computed by $M_1$, which is a valid mapping from Q to G. Suppose one does not perform Refine, $M_2$ will be enumerated. Match determines that $M_2$ contains violations, as shown. However, when Refine is performed, $M(1,4)$ is flipped to 0 as $v_4$ of G does not connect to $v_2$ and $Deg(v_1,Q) > Deg(v_4,G)$. $M_2$ is not enumerated at all.

subIso with Matrix Operations

From subIso in Algo. 1, it can be noted that the violation defined by Formula 1 in Match (Line 19) is determined by processing of the entries between $M_Q$ and $C_i$, and the neighborhood constraint (Line 23) precisely exploits edge information. Hence, as motivated in an earlier section, one casts subIso into an algorithm that uses a series of mathematical computations, denoted as TsubIso. This enables us to derive private versions of such operations in later sections.

Foremost, one extends the definition of the query and data graph (Q and G), defined in [0066]. This extended definition only differs from the one presented previously that the entries in the adjacency matrix $M_G$ are flipped, i.e., 0s (resp. 1s) are set to 1s (resp. 0s), for the transformed subIso (to be detailed soon). Moreover, Q and G are extended with precomputed indexes, called static indexes, to enhance performances. Since the subsequent discussions always assume the extended queries/graphs, one omits the term "extended" for brevity.

Definition 3:

The extended data graph of G is denoted as $\overline{G}=(V,M_{\overline{G}},\Sigma,L,SI_G)$ and the query graph is extended as $Q=(V,M_Q,\Sigma,L,SI_Q)$, where $M_{\overline{G}}$ are flipped, i.e., $\forall j,k$, $$M_{\overline{G}}(j,k) = {}^{-}M_G(j,k)$$

and $SI_G$ and $SI_Q$ (called static indexes) are sets of bit vectors, for optimization purposes.

Based on Def. 3, one rewrites subIso into transformed subIso called TsubIso in Algo. 2. The inputs are the query graph Q and data graph $\overline{G}$. It returns 0 if Q is a subgraph of G, and non zero otherwise. The corresponding three main steps of Algo. 1 in Algo. 2 are highlighted below.

Transformed Enumeration.

The main difference in TEnum is that Refine (Lines 10-11 of Algo. 1) is removed. The reason is that Refine exploits structural information, which is required to keep private. Another difference is that TEnum is invoked with an input message R that aggregates the subgraph isomorphism information from Q to G during the enumeration of $M_i$s.

---

Algorithm 2 TsubIso $(Q,\overline{G})$

Input: The query graph Q and the transformed data graph $\overline{G}$
Output: R = 0 if Q is a subgraph of G, R = 1 otherwise
1:   Initialize R := 1, $M_i$ := 0
2:   Generate M from (V,Σ,L) of Q and $\overline{G}$
3:   if!Refine (M,Q,$\overline{G}$)       /* TRefinement */
4:       return R
5:   TEnum (0,$M_i$,M,Q,$\overline{G}$,R)   /* TEnumeration */
6:   return R
Procedure 2.1 TEnum (d,$M_i$,M,Q,$\overline{G}$,R)
7:   if d = m
8:       TMatch ($M_i$,Q,$\overline{G}$,R)     /* TMatching */
9:   for each c, where c < n, M(d,c) = 1, and $\forall d' < d, M_i(d',c) = 0$
10:      $M_i$(d,c) := 1
11:      TEnum (d + 1,$M_i$,M,Q,$\overline{G}$,R)
12:      $M_i$(d,c) := 0
Procedure 2.2 TMatch ($M_i$,Q,$\overline{G}$,R)
13:      Initialize $R_i$ := 0, $MC_i$ := 0
14:      $\overline{C}_i = M_i M_{\overline{G}} M_i^T$
15:      $\forall j,k, MC_i(j,k) := M_Q(j,k) \times \overline{C}_i(j,k)$   /* Multiplication */
16:      $R_i := \Sigma_{\forall j,k} MC_i(j,k)$    /* Addition */
17:      R ×= $R_i$   /* Multiplication */
Procedure 2.3 TRefine (M,Q,G)
18:      for each j,k,M(j,k) = 1
19:          if $SI_Q[v_i] \cdot SI_Q[v_j] \neq SI_Q[v_j] \cdot SI_G[v_k]$
20:              M(j,k) = 0
21:          if $\exists j, s.t., \forall k, M(j,k) = 0$
22:              return False
23:      return True

---

Transformed Matching.

In Match, the violation of Formula 1 (Line 19 of Algo 1) is checked by a condition defined on each entry of $M_Q$ and $C_i$, which leaks structural information. In comparison, with Def. 3, the presence of a violation is detected from the product of the matrices $M_Q$ and $\overline{C}_i$ (Lines 14-15 of Algo 2) in TMatch. Further, the violation due to $M_i$ is preserved under aggregations, i.e., the result of $M_i$ (denoted as $R_i$) is aggregated into one message R (Lines 16-17). The detection of a violation in TMatch is illustrated with FIG. 4. Similar to Match, TMatch computes the "subgraph" $\overline{C}_i$ that Q may be isomorphic to. With the data graph, $\overline{C}_i$ is computed in Line 14. There are four possible cases of the entries of $M_Q$ and $\overline{C}_i$ and FIG. 4 a) highlights the case of the violation of Formula 1. That is, $\exists j, k, M_Q(j,k)=1$ and $C_i(j,k)=0$ (thus, $\overline{C}_i(j,k)=1$), then $$M_Q(j,k)\overline{C}_i(j,k)=1 \qquad (2)$$

For the other three cases, the product is 0. Therefore, by Formula 2, TMatch detects the violation and aggregates the results as follows:

1. Multiplication (Line 15). For each pair of (j,k), TMatch computes $MC_i(j,k)=M_Q(j,k)\times {}^{-}C_i(j,k)$;
2. Addition (Line 16). TMatch sums up the entries of the product $MC_i$, i.e., $R_i=\Sigma_{\forall j,k} MC_i(j,k)$. Note that $R_i$ intuitively represents the validity of the mapping $M_i$, i.e., if $M_i$ is valid, no violation is found and the value of $R_i$ is 0, by Formula 2; and
3. Multiplication (Line 17). TMatch then aggregates $R_i$ into R by a multiplication, i.e., $R=R\times R_i$. If there is at least a valid $M_i$, the value of R equals 0, and non zero otherwise.

It is worth highlighting that if there exists a subgraph isomorphism mapping $M_i$ from Q to G, then $M_i$ contains no violation, $R_i=0$ and R=0. Thus, R=0 implies that Q is a subgraph of G. Otherwise, R is non zero, which implies all $R_i$s are not zero and there must be some 1's in the entries of $MC_i$, for all i. By Formula 2, there is a violation in each $M_i$ and thus, Q is not a subgraph of G.

Example 2

One illustrates TMatch with the example shown in FIGS. 4 b) and c). The query and graph are those shown in FIG. 4. FIG. 4 b) presents $M_Q$ and $M_{\overline{G}}$. FIG. 4 c) reports the intermediate results of TMatch of two possible mappings $M_1$ and $M_2$ (FIG. 3). $M_1$ is a valid mapping as $R_1$ computed using $M_Q$ and $\overline{C}_1$ (in Lines 15-16) is 0. In comparison, $R_2$ computed using $M_Q$ and $\overline{C}_2$ is 2. Hence, $M_2$ is an invalid mapping. $R=R_1\times R_2=0$ indicates that there is a valid mapping and thus Q is a subgraph of G.

Transformed Refinement.

As the neighborhood constraint of Refine precisely exploits the edge information, it cannot be directly adopted. One transforms Refine as TRefine that inner products (Line 19) between the present static index (SI, in the form of bit vector) are used for refinements. The index is called static as the indexes of the data graphs are precomputed and those of query graphs are computed by the client prior to TsubIso.

It is worth noting that TsubIso is mainly a series of mathematical operations, i.e., additions, multiplications and inner products. This enables us to establish a connection to private query processing.

Structure-Preserving subIso

In this section, one describes structure-preserving subIso, denoted as SPsubIso (recall in FIG. 2). SPsubIso contains three steps: (1) structure-preserving Match (SPMatch); (2) structure-preserving Enum (SPEnum); and (3) structure-preserving Refine (SPRefine).

Before presenting the details, one first gives the definition of the encrypted query graph $Q_k$ and the transformed graph $\overline{G}_k$, which are shared by SPMatch, SPEnum and SPRefine.

Definition 4:

The encrypted Q and $\overline{G}$ are denoted as $Q_k$ and $\overline{G}_k$, respectively, where $Q_k=(V,M_{Q_k},\Sigma,L,SI_{Q_k})$ and $\overline{G}_k=(V,M_{\overline{G}_k},\Sigma,L,SI_{G_k})$. $M_{Q_k}$ ($M_{\overline{G}_k}$) and $SI_{Q_k}(SI_{G_k})$ are the encrypted $M_Q$ ($M_{\overline{G}}$) and $SI_Q$ ($SI_G$), respectively.

It is worth remarking that one only protects $M_Q$ (resp. $M_{\overline{G}}$) and $SI_Q$ (resp. $SI_G$) in Q (resp. $\overline{G}$), by using encryption, since (V,Σ,L) does not expose the structural information.

Structure-Preserving Matching

In this subsection, one adopts cyclic group and describe a novel private-key encryption scheme to encrypt $M_Q$ and $M_{\bar{G}}$. One then presents SPMatch to compute the operations of TMatch in encrypted domain, where the mapping ($M_i$) has been enumerated by SPEnum.

Cyclic Group Based Encryption

Recall that TMatch involves both additions and multiplications. Hence, the state-of-the-art partially homomorphic encryption schemes (e.g., Paillier and ElGamal) cannot be adopted to the problem. On the other hand, due to the known performance concerns of fully homomorphic encryption scheme (FHE), one may not directly adopt FHE either.

Therefore, one presents a private-key encryption scheme, namely cyclic graph based encryption scheme (CGBE). CGBE not only supports both partial additions and multiplications, but also allows efficient encryption and decryption. Importantly, it is secure against CPA. However, the trade-off of using CGBE in SPMatch is that (1) it introduces negligible false positives; and (2) it requires multiple encrypted messages for aggregating a query result, which are sent to the client.

Before the detailed discussion, one first present the preliminary about cyclic group. Let G be a group. $p=|G|$ is denoted as the order of G. In particular, $\forall g \in G$, the order of G is the smallest positive integer p such that $g^p=1$. Let $(g)=\{g^i : i \in Z_p, g^i \in Z_n\}=\{g^0, g^1, \ldots, g^{p-1}\}$ denote the set of group elements generated by g. The group G is called cyclic if there exists an element $g \in G$ such that $<g>=G$. In this case, the order of G is $p=|G|$ and g is called a generator of G. Next one presents the cyclic group based encryption scheme as follows.

Definition 5:

The cyclic group based encryption scheme is a private-key encryption scheme, denoted as CGBE=(Gen, Enc, Dec), where Gen is a key generation function, which generates a secrete key $x \in [0, p-1]$ uniformly at random, a cyclic group $<g>=\{g^i : i \in Z_p, g^i \in Z_n\}$. It outputs the private keys as (x, g) and the value p which is known to the public.

Enc is an encryption function, which takes as input a message m and the secrete key (x, g). It chooses a random value r, and outputs the ciphertext $$c=mrg^x \pmod{p}$$

Dec is a decryption function, which takes as input a ciphertext c, and the secrete key (x, g).

It outputs $$mr=cg^{-x} \pmod{p}$$

Note that the Dec function of CGBE only decrypts the ciphertext c as the product of the message m and random value r. This is because SPMatch does not require the exact value of m.

Encryption of MQ and $M\overline{G}$

To encrypt $M_Q$ and $M_{\bar{G}}$, one first presents an encoding for each entry of $M_Q$ and $M_{\bar{G}}$.

Definition 6:

The encoding of the entries of $M_Q$ and $M_{\bar{G}}$ are: $\forall j,k$, if $M_Q(j,k)=0$, set $M_Q(j,k)$ as q; and if $M_{\bar{G}}(j,k)=0$, set $M_{\bar{G}}(j,k)$ as q, where q is a large prime number.

In relation to Def. 6, one has the following Formula 3 that is similar to Formula 2 to detect the violation. One notes that only in case of $M_Q(j,k)=1$ and $^-C_i(j,k)=1$, $$M_Q(j,k) \times {}^-C_i(j,k) = 1 \pmod{q}, \quad (3)$$

where $^-C_i = M_i M_{\bar{G}} M_i^T$. the product will be 0 otherwise. FIG. 5 a) shows the encoding of four possible combinations between entries, one can see that only if $M_Q(j,k)=1$ and $^-C_i(j,k)=1$, the product becomes 1. Otherwise it is 0.

Under the encryption scheme CGBE in Def. 5 and the encoding in Def. 6, one is ready to define the encryption of the encoding of $M_Q$ and $M_{\bar{G}}$ (in short, the encryption of $M_Q$ and $M_{\bar{G}}$) as follows.

Definition 7:

The encryption of $M_Q$ and $M_{\bar{G}}$ are denoted as $M_{Qk}$ and $M_{\bar{G}k}$, respectively, where $\forall j,k$, $$M_{Qk}(j,k)=Enc(M_Q(j,k),x,g)$$

$$M_{\bar{G}k}(j,k)=Enc(M_{\bar{G}}(j,k),x,g) \quad (4)$$

Example 3

One uses FIG. 5 b) to illustrate an example of the encryption of $M_Q$ by CGBE. $\forall j,k$, if $M_Q(j,k)=1$, $M_{Qk}(j,k)=Enc(1,x,g)=rg^x \pmod{p}$; and if $M_Q(j,k)=q$, $M_{Qk}(j,k)=Enc(q,x,g)=qrg^x \pmod{p}$.

Finally, one remarks that the large prime number q for the encoding (Def. 6) must be kept secret. Since CGBE is a symmetric encryption scheme, both the DO and the client hold the same keys (x,g,p), whereas SP keeps p only.

SPMatching

Based on Def. 7, one presents a cyclic group based matching (in short, SPMatch) derived from TMatch (in Algo. 2), shown in Algo. 3. In particular, the input value $R_k$ is the encrypted message that aggregates the violation. SPMatch first generates $\overline{C}_i$ (Line 1), which is computed from $M_i$ and $M_{\bar{G}k}$. Then the following three steps are invoked.

---

Algorithm 3 SPMatch ($M_i, Q_k, \overline{G}_k, R_k$)

1:    $\overline{C}_i := M_i M_{\overline{G}k} M_i^T$
     /* Multiplication */
2:    $\forall j,k, MC_i(j,k) := M_{Qk}(j,k) \times \overline{C}_i(j,k) \pmod{p}$
     /* Addition */
3:    $R_i := \Sigma_{\forall j,k} MC_i(j,k) \pmod{p}$
4: if $i \neq 0, i \bmod \omega \neq 0$
     /* Multiplication */
5:      $R_k \times= R_i \pmod{p}$
6: else Send $R_k$ to client, $R_k := R_i$

---

1. Multiplication (Line 2). For each pair of (j,k), SPMatch computes $MC_i(j,k)=M_{Qk}(j,k) \times {}^-C_i(j,k) \pmod{p}$;
2. Addition (Line 3). SPMatch sums up the entries in the product, i.e., $R_i = \Sigma_{\forall j,k} MC_i(j,k) \pmod{p}$. If $M_i$ is valid, i.e., no violation is found, the decryption of the sum is exactly 0, by Formula 3; and
3. Multiplication (Lines 4-6). SPMatch then aggregates $R_i$ into $R_k$ by multiplication (Line 5). If there is at least one valid mapping from Q to G, the decryption of a $R_k$ equals 0. Otherwise, the decryption value is non zero. One remarks that CGBE leads to errors if the number of $R_i$s in $R_k$ is larger than a predetermined value w. One thereby presents a decomposition scheme (discussed later) that sends to the client a sequence of $R_k$s, where each $R_k$ aggregates $\omega$ $R_i$ (Line 4).

Example 4

FIG. 5 b) shows an example to illustrate the multiplication of the four possible cases of combinations between $M_{Qk}$ and $\overline{C}_i$. One observes that only under the violation (shown in grey shadow), the product of $M_{Q_k}$ and $\overline{C_i}$ does not contain q. FIG. 5 c) illustrates an example of SPMatch following FIG. 4 c). $R_1$ and $R_2$ are computed by the summations of $MC_1$ and $MC_2$, respectively. Note that $R_2$ contains violation as $M_2$ is not a valid mapping. $R_k$ is produced.

Decryption at the Client.

After receiving all the encrypted results $R_k$, the client performs the decryption, which mainly contains two steps as below.

1. For each message $R_k$ aggregated with $\omega$ $R_i$s, the client computes the message encoded in $R_k$ as $R_k'=Dec(R_k,x,g)^{2\omega}$); and
2. For each encoded message $R_k'$, the client computes the final result by $R=R_k'$ mod q.

If any of R equals to 0, there is at least one valid isomorphic mapping $M_i$ that contributes a 0 (Line 3) to the product $R_k$ (Lines 4-5). Thus subIso(Q,G)=true.

Example 5

One shows the decryption at client following FIG. 5 c). The encrypted message $R_k$ client receives aggregates two $R_i$s. The client first generates $(g^{-x})^{2\times 2}$, computes $R_k' = R_k \times g^{-4x}$ (mod p), and finally computes $R=R_k'$ mod q. The result is 0 that indicates Q is a subgraph of G.

Decomposition Scheme.

Once the number of $R_i$ aggregated by $R_k$ exceeds a predetermined value, SPMatch will result in incorrect answer. The reason leading to this problem is the multiplications when aggregating $R_i$ into $R_k$ in Line 5 of Algo. 3. Recall that in the decryption, the client needs to compute the encoded message $R_k'$ after receiving $R_k$, once $R_k'$ exceeds p, the client can never recover the final result R by modular q correctly. One can overcome this limitation by determining the maximum number of $R_i$s that can be aggregated in $R_k$, denoted as $\omega$. One has the following formula:

$$Len(R_i') = 2 \times (Len(q) + Len(r)) + \log(m^2) \quad (5)$$

$$Len(p) \geq \omega \times Len(R_i')$$

$$\Leftrightarrow \omega \leq \frac{Len(p)}{Len(R_i')}$$

where m=|V(Q)|, Len(x) is the size of the value x, and $R_i'$ is the message encoded in $R_i$, i.e., $R_i'=Dec(R_i,x,g)^2$. In particular, with reference to Algo. 3, (Len(q)+Len(r)) is the largest size of the message encoded in each entry of $M_{Q_k}$ and $\overline{C_i}$. The size of their product (Line 2) is 2(Len(q)+Len(r)). There are $m^2$ additions of such products (Line 3), hence, Algo. 3 requires at most $\log(m^2)$ carry bits. This gives us the largest size of an $R_i'$. Then, the size of $\omega R_i'$ values must be smaller than that of p, and one obtains the inequality in Formula 5. Having computed w, the SP decomposes $R_k$ into a number of aggregated messages, each of which is a product of at most $\omega$ $R_i$s.

False Positive.

When performing SPMatch, one finds that two operations introduce false positives: (1) additions with computing $R_i$ (Line 3); and (2) multiplications with computing $R_k$ in each decomposition (Line 5). One proves that the probabilities of the above two false positive are negligible. Next, one first analyzes the probability of false positive from the additions with computing $R_i$.

Proposition 1:
The probability of false positive in $R_i$ is negligible.
Proof.
The probability of false positive in $R_i$ is $$Pr(\text{false positive in } R_i) = Pr(r_1 + \ldots + r_{m^2} = 0)(\text{mod} q) \quad (6)$$

$$= \frac{1}{q}.$$

where m=V(Q), and q is a large prime number, e.g., 32 bits. Thus, the probability is negligible in practice.
Proof:
The probability of false positive in $R_i$ is $$Pr(\text{false positive in } R_i) = Pr(r_1 + \ldots + r_{m^2} = 0(\text{mod} q)) \quad (6)$$

$$= \frac{1}{q},$$

where m=V(Q), and q is a large prime number, e.g., 32 bits. Thus, the probability is negligible in practice.
Based on Prop. 1, one is able to analyze the probability of false positive with computing the $R_k$ in each decomposition.
Proposition 2:
The probability of false positive in $R_k$ is negligible in each decomposition.
Proof.
The probability of false positive in each $R_k$ is $$Pr(falsepositive R_k) = Pr(falsepositive in all its R_i) \quad (7)$$

$$= 1 - \left(1 - \frac{1}{q}\right)^{\omega}$$

$$\approx 1 - e^{-\frac{\omega}{q}};$$

where $\omega$ is the size of the decomposition. Since $\omega \ll q$, the probability is negligible in practice.

Structure-Preserving Enumeration

The mappings ($M_i$s) processed by SPMatch are enumerated by SPEnum. Since the worst case number of all possible mappings $M_i$s from M (Lines 7-12, Algo. 2) is $O(n^m)$, it has been a crucial task of SPsubIso to prune the search of useless $M_i$s. For instance, one shows a scenario of useless enumerations by using the LHS of FIG. 6. There are four subgraphs of G in grey, which are disconnected from each other. In the example, only 4 mappings out of $4^6$ are possible and the remaining enumerated mappings are useless. However, since both G and Q are encrypted, the SP can only blindly enumerates those mappings even they may appear "certainly" invalid.

Therefore, one presents SPEnum that consists of a protocol between the SP and the client to prune some useless partial mappings. However, due to the pruned enumerations, a little non-trivial structural information may be leaked. Such information leakage can be well controlled by determining how often the client informs the pruning.

Mapping Enumeration as a Search Tree

To facilitate the discussions on pruning, one views the search of possible subgraph isomorphic mappings from Q to G (in the LHS of FIG. 6) as a search tree, as in the literature of optimizations. A sketch is shown in the RHS of FIG. 6. Each internal node in the d-th level represents a partial mapping $M_i$, denoted as $M_i'$, whose enumeration is only up to the first d rows of M. One denoted Q' as the induced subgraph of Q from the first d vertices of Q and G' as the subgraph that Q' maps to, under $M_i'$. In the example, the query size is 6, thus the height of the search tree is 6. The fanout of each internal node in d-th level equals to the number of 1s in the (d+1)-th row of M. Each leaf node of the search tree represents a complete $M_i$. Without pruning, TEnum enumerates all $4^6$ leaf nodes.

SPEnumeration

We next present SPEnum. It adopts TEnum and SPMatch, and determines if a partial mapping $M_i'$ between $Q_k'$ and $\overline{G}_k'$ is a valid to be expanded or not. The inputs of SPMatch are (1) $M_i'$, which is the current partial mapping in d-th level; (2) $Q_k'$ and $\overline{G}_k'$, which are the induced subgraph of $Q_k$ and $\overline{G}_k$ with the first d vertices, respectively; and (3) $R_k$, which is the same as before. Then, a naive protocol involving the client is described as follows:

1. SP enumerates an $M_i'$ and performs SPMatch. Its result $R_k$ is transmitted to the client for decryption immediately.
2. The client decrypts $R_k$. If it is 0, $Q_k'$ is subgraph isomorphic to $\overline{G}_k'$ and $M_i'$ is valid. The client then notifies the SP to repeat Step 1 to continue the enumeration from $M_i'$. Otherwise, the search subtree at $M_i'$ can be pruned.
3. SP terminates SPEnum when a valid $M_i$ is found or no more $M_i$s can be enumerated.

Protocol with Aggregated Messages.

The naive protocol introduces additional network communications between the client and the SP. To control such communication overhead, one adopts a breath first search (BFS) to TEnum and exploit the aggregation supported by CGBE. Specifically, suppose SPEnum is at the d-th level of the search tree, it conducts two rounds of communications.

1. In the first round, for each internal nodes n with a valid partial mapping at the d-th level (e.g., $n_1$ and $n_4$ at the 3rd level in FIG. 6), the SP processes its child nodes of n in batches of the size ω. For each batch, the SP performs SPMatch at each node and aggregates ω $R_i$s into $R_k$. Recall that ω is the number of messages that CGBE correctly aggregates. The SP sends all the $R_k$s to the client. The client decrypts all $R_k$s. (i) If it is 0, there exists at least one child node n' of n such that its partial mapping is valid (e.g., $n_1$). (ii) Otherwise, there is no valid partial mapping of the n's child nodes. The search subtree of n can be safely pruned (e.g., $n_4$).
2. In the second round, the SP then sends all $R_i$s of the child nodes of each batch that contains valid partial mappings to the client, and determines at which node(s) the search proceeds (e.g., $n_2$). Step 1 is then repeated at the (d+1)-th level (e.g., at the 4th level).
3. SP terminates SPEnum as in the naive protocol.

Remarks.

It is worth noting that CGBE limits ω $R_i$ to be aggregated into $R_k$. If SPMatch utilizes other encryption scheme, such a limitation may not be necessary. For example, FHE does not limit the number of aggregated messages, but its computation cost is significant. Moreover, the number of communication rounds between the SP and the client is O(2|V (Q)|). In practice, most of the partial mappings of internal nodes are invalid, which result in the size of messages for each round small, e.g., 16 KB in worst case for the experiments with default setting.

Vertex Ordering.

Finally, one remarks that vertex ordering (the row ordering of M) significantly affects subgraph query performance, consistent to the literature. However, SPEnum cannot exploit structural information to choose an ordering by heuristics. One thereby orders the rows of M by the number of is in ascending order. Suppose that partial mappings are mostly useless, such an ordering prune useless enumerations with fewer communications in practice.

Structure-Preserving Refinement

In order to further optimize the search, i.e., to reduce the number of possible mappings, in this subsection, one presents a static index $SI_Q$ ($SI_G$) of a Q (G) that indexes h-hop information. One modifies Refine into inner products between $SI_G$ and $SI_Q$ as TRefine. SPRefine achieves privacies by using asymmetric scalar product preserving encryption ASPE.

Static Index SI

The classical refinement reduces the number of 1s in M (a.k.a flips the is to 0s) to minimize the large search space of subgraph isomorphism mappings. Further to reducing the number of is in M, SPRefine cannot expose structural information. To address these, one presents to index vertices with their h-hop information. The design requirements of such index are that they can be computed before a query is run and hence, no knowledge is gained by executing the query algorithm. Moreover, they should be efficiently computed, as the client may not have powerful machines. Since the index flips the 1s in M by information of the vertices that are h hop away. The SP cannot precisely determine the cause of the flips. Next, one defines the h-hop vertices of a vertex v as follows:

Definition 8:

The h-hop vertices of v (h-Hop(v)) is the set of vertices that are reachable from v by exactly h hops. The h-hop l-labeled vertices of v (h-$Hop_l$(v)) is {v'|L(v')=l, and v'∈h-Hop(v)}. FIG. 7 a) illustrates the notations of h-hop vertices and h-hop l-labeled vertices of v. One assumes a canonical ordering of possible labels and hence, present labels as integers. Given a graph G, suppose h=2, 2-Hop(v)={$v_2,v_3$} and, 2-$Hop_0$(v)={$v_3$}. For illustration purposes, one chooses four structural information for indexing used in SPRefine. One can determine if two vertices can be mapped or not from them. It is worth remarking that one can further extend other information for indexing. One defines such information as an attribute of the set h-$Hop_l$(v) as follows:

h-$Hop_l$(v).MaxDeg is the maximum degree of v', v'∈h-$Hop_l$(v);

h-$Hop_l$(v).Occur is |h-$Hop_l$(v)|;

h-$Hop_l$(v).PreLabel is a set of labels of the parents of occurred h-$Hop_l$(v); and h-$Hop_l$(v).Sup is the number of different paths that can reach from v to v', where v'∈ h-$Hop_l$(v).

Example 6

One continues to discuss the example in FIG. 7 a). Suppose h=2. Recall that 2-$Hop_0$(v)={$v_3$}. One lists some 2-hop information as follows:
(1) 2-$Hop_0$(v).MaxDeg=2, since Deg($v_3$,G)=2; (2) 2-$Hop_0$(v).Occur=1, since only one label with 0 in 2-$Hop_0$(v); (3) 2-$Hop_0$(v). PreLabel={0} as 0 is the only label of the parents of {$v_3$}; and (4) 2-$Hop_0$(v).Sup=1 because there is only one path that can reach from v to $v_3$.

Encoding h-Hop Information in Static Index.

The static index of G is denoted as $SI_G$. For all v, h, and l, h≤maxH, maxH is a user-specified maximum hop size, $SI_G$[v][h][l] is a bit vector. In the four h-hop information defined above, one identifies two types. They are encoded in $SI_G$ as follows:

(1) Label set (e.g., PreLabel): for each l'∈h-$Hop_l$(v).PreLabel ⇒ $SI_G$[v][h][l]. PreLabel[l']=1, otherwise 0; and (2) Numerical data (e.g. MaxDeg, Occur and Sup): One presents the encoding of MaxDeg for illustration. Those of Occur and Sup are similar. One denotes the maximum value for MaxDeg as $MaxDeg_{max}$. For each $i \leq MaxDeg_{max}$ and $i \leq h\text{-}Hop_l(v).MaxDeg \Rightarrow SI_G[v][h][l].MaxDeg[i]=1$, otherwise 0.

The bit vector $SI_G[v][h][l]$ is then simply a concatenation of $SI_G[v][h][l].MaxDeg$, $SI_G[v][h][l].Occur$, $SI_G[v][h][l].PreLabel$ and $SI_G[v][h][l].Sup$. The bit vector $SI_G[v]$ is accordingly a concatenation of all $SI_G[v][h][l]$s for all v, $h \leq maxH$ and l.

Example 7

FIG. 7 a) shows a simple example of the partial $SI_G[v][h][l]$ for v in G, where h=2, l=0. One presets the default maximum value for MaxDeg, Occur and Sup to 3. One assumes that the possible labels are 0 and 1. (1) For PreLabel, since $2\text{-}Hop_0(v).PreLabel=\{0\}$, then $SI_G[v][2][0].PreLabel[0]=1$, and $SI_G[v][2][0].PreLabel[1]=0$; and (2) For MaxDeg, as $2\text{-}Hop_0(v).MaxDeg=2$, thereby $SI_G[v][2][0].MaxDeg[1]=SI_G[v][2][0].MaxDeg[2]=1$.

The h-hop information abovementioned can be generated by a simple depth first traversal starting at each vertex on the data graph offline and on the query by the client on the fly. Due to space restrictions, one omits the verbose algorithm.

Inner Products of Static Indexes

With the static index SI, one establishes the refinement of possible subgraph isomorphism mappings by the following proposition:

Proposition 3:

Given a user-specified maxH, $\forall v_j \in V(Q)$ and $v_k \in V(G)$, $M(j,k)=1$, if the following of the h-hop information of $v_j$ and $v_k$ hold: $\forall l \in \Sigma(G)$, $h \leq maxH$,
  $h\text{-}Hop_l(v_j).MaxDeg \leq h\text{-}Hop_l(v_k).MaxDeg$;
  $h\text{-}Hop_l(v_j).Occur \leq h\text{-}Hop_l(v_k).Occur$;
  $h\text{-}Hop_l(v_j).PreLabel \subseteq h\text{-}Hop_l(v_k).PreLabel$; and
  $h\text{-}Hop_l(v_j).Sup \leq h\text{-}Hop_l(v_k).Sup$.

Prop. 3 can be obtained from a proof by contradiction.

Example 8

One uses FIG. 7 b) to illustrate the underlying idea of Prop. 3

For simplicity, one only shows the effect of MaxDeg. Before the refinement, $M(j,k)=1$ since $L(v_j)=L(v_k)$. Since $2\text{-}Hop_0(v).MaxDeg$ of Q and G are 3 and 2, respectively. Hence, $2\text{-}Hop_0(v_j).MaxDeg$ $1 \leq 2\text{-}Hop_0(v_k).MaxDeg$. By Prop. 3, $v_j$ cannot be mapped to $v_k$ and $M(j,k)$ is flipped to 0.

Therefore, TRefine further transforms Prop. 3 into the inner product as follows.

Proposition 4:

Given a user-specified maxH, $M(j,k)=1$, $v_j \in V(Q)$ and $v_k \in V(G)$, if the following of SI of $v_j$ and $v_k$ hold: $\forall l \in \Sigma(G)$, $h \leq maxH$, $SI_Q[v_j][h][l] \cdot SI_Q[v][h][l] = SI_Q[v][h][l] \cdot SI_G[v_k][h][l]$.

Example 9

One illustrates the Prop. 4 with the Example in FIG. 7 b), the partial SI of both Q and G are shown. Since $SI_Q[v_j][2][0] \cdot SI_Q[v_j][2][0] \# SI_Q[v_j][2][0] \cdot SI_G[v_k][2][0]$, then $M(j,k)$ is flipped to 0.

Note that one can further simplify the inner product in Prop 4 to $SI_Q[v_j]a??SI_Q[v_j]=SI_Q[M;]a??SI_G[v_k]$, where $SI_Q[v_j]$ is the concatenation for all $SI_Q[v_j][h][l]$ s. Therefore, Line 19 of TRefine is mainly one inner product between $SI_Q[v_j]$ and $SI_G[v_k]$, using Prop. 4 for pruning the 1s in M.

For SPRefine, one encrypts SIs as: $\forall v_j \in V(Q)$ and $\forall v_k \in V(G)$, $SI_{Q_k}[v_j]=ASPE(SI_Q[v_j])$ and $SI_{Gk}[v_k]=ASPE(SI_G[v_k])$. The secret keys held by SP and the client are the same. Finally, SPRefine is TRefine after replacing Line 19 with a private inner product between encrypted bit vectors ($SI_{Q_k}$ and $SI_G$), supported by ASPE.

We remark that SPEnum and SPRefine may expose little non-trivial information in the sense that the probability of guessing the structure of a graph is not that of a random guess anymore.

Privacy Analysis

In this section, one proves the privacy of the encryption method and then the query algorithm SPsubIso. The attack model is defined previously that one assumes the attackers or SPs are the eavesdroppers and can adopt the chosen plaintext attack (CPA).

Privacy of the Encryption Method

Two encryption methods are used in the present invention. (1) CGBE scheme is present to encrypt $M_Q$ and $M_G$, and (2) ASPE is adopted to encrypt $SI_Q$ and $SI_G$. One first states that both the CGBE and ASPE schemes are secure against CPA and then established that the structures of the query and the graph are protected against the attack model. Denote $\hat{g}$ to be an arbitrary chosen from G.

Lemma 1:

Let G be a finite group, and let $m \in G$ be arbitrary. Then, choosing random $g \in G$ and setting $g'=m \cdot g$ gives the same distribution for g' as choosing random $g' \in G$. I.e., for any $\hat{g} \in G$ $$Pr[m \cdot g = \hat{g}] = 1/|G|,$$

where the probability is taken over random choice of g.

Lemma 2:

Let G be a finite group, and let $g \in G$ be arbitrary. Then choosing random $r \in [0, |G|]$ and setting $g'=g^r$ gives the same distribution for g' as choosing g' from G. I.e., for any $\hat{g} \in G$ $$Pr[g^r = \hat{g}] = 1/|G|,$$

where the probability is taken over random choice of r.

Proof.

One proves the lemma in a similar style of the proof of Lemma 1. Let $\hat{g} \in G$ be arbitrary. Then $$Pr[g^r = \hat{g}] = Pr[r = \log_g \hat{g}]$$

Since r is chosen uniformly at random, the probability that r is equal to the fixed element $\log_g \hat{g}$ is exactly $1/|G|$.

Proof: We prove the lemma in a similar style of the proof [21] of Lemma 6.1. Let $\hat{g} \in G$ be arbitrary. Then $$Pr[g^r = \hat{g}] = Pr[r = \log_g \hat{g}]$$

Since r is chosen uniformly at random, the probability that r is equal to the fixed element $\log_g \hat{g}$ is exactly $1/|G|$ Lemma 3:

CGBE is secure against CPA.

We prove that the present CGBE scheme has indistinguishable encryptions in the presence of the eavesdroppers, which is implied by the definition of CPA secure.

Specifically, choosing a random value r, and letting $r' \in G$ such that $g^{r'}=r$, one has $Enc(m,g,x)=mrg^x=mg^{x+r'}$. First, by Lemma 2, $Pr[g^{x+r'}=g]=1/|G|$, where $\hat{g}$ is arbitrary chosen from G. Then, by Lemma 1, $Pr[mg^{x+r'}=\hat{g}]=1/|G|$. Therefore, the ciphertext in the CGBE scheme is a uniformly distributed group element and, in particular, is independent of the message m being encrypted, i.e., $Pr[mrg^x=\hat{g}]=1/|G|$. That means the entire ciphertext contains no information about m. Given the above, CGBE is secure against chosen plaintext attack.

Since CGBE is a secure encryption scheme against CPA, SP can never attack the $M_{Qk}$ and $M_{\bar{G}k}$ without possessing the secret key against the attack model.

Lemma 4:

$M_{Qk}$ and $M_{\bar{G}k}$ are preserved from SP against the attack model under CGBE.

Proof.

The proof is a direct application of Lemma. 3. Since CGBE is secure against CPA, $M_{Qk}$ and $M_{\bar{G}k}$ are secure against the attack model under CGBE.

Next, one states that $SI_{Q_k}$ and $SI_{G_k}$ are preserved from SP.

Lemma 5:

$SI_{Q_k}$ and $SI_{G_k}$ are preserved from SP against the attack model under ASPE. $SI_Q[v_j]$ and $SI_G[v_k]$ are encrypted by ASPE, where $v_j \in V(Q)$ and $v_k \in V(G)$. Since ASPE is secure against CPA, it is immediate that Lemma 5 is true.

Theorem 1:

The structure of both Q and G are preserved from SP against the attack model under CGBE and ASPE.

Proof.

The proof can be deduced from Lemmas 4 and 5. Recall that $Q_k = (V, M_{Qk}, \Sigma, L, SI_{Q_k})$ and $\bar{G}_k = (V, M_{\bar{G}k}, \Sigma, L, SI_G)$. By Lemmas 4 and 5, the SP cannot break $Q_k$ and $\bar{G}_k$ since the structures of $Q_k$ and $\bar{G}_k$ (i.e., $M_{Qk}$, $SI_{Q_k}$, $M_{\bar{G}k}$ and $SI_{G_k}$) are secure against CPA.

Privacy of SPsubIso

As presented in previously, SPsubIso contains three main steps. One analyzes the privacy of each of these steps in this subsection. Before one presents the analysis, one clarifies some notations. Given Q and G, $m=|V(Q)|$ and $n=|V(G)|$. The function P(n) returns the number of all possible graphs generated by n vertices, i.e., $P(n)=2^{n^2}$. The function A(G) returns 1 if SP can determine the exact structure of G, and 0 otherwise. The probability that the SP can determine the structure of the graph G is denoted as $Pr[A(G)=1]$. Given a graph G with n vertices, the probability to determine the graph structure by a random guess is $$Pr[A(G) = 1] = \frac{1}{P(n)}.$$

Proposition 5:
Under SPMatch, $$Pr[A(Q) = 1] = \frac{1}{P(m)}, \text{ and } Pr[A(G) = 1] = \frac{1}{P(n)},$$

which are equivalent to random guess.

Proof.

(1) First one proves that the SP can never determine any structural information from the computations in each step of SPMatch. Recall that each SPMatch comprises a constant number of mathematical operations in the encrypted domain in Algo. 3:

Line 2 invokes a constant number $m^2$ of multiplications of $M_{Qk}$ and $C_i$;

Line 3 requires a constant number $m^2$ of additions in $MC_i$; and

Line 4 conducts one multiplication $R_i$ and $R_k$.

Further, by Lemma 3, all the intermediate computation results are securely protected against the attack model. Thus, SP cannot learn any structural information from these steps.

(2) Next, given any two SPMatchs, the SP only knows that each SPMatch aggregates its $R_i$ into $R_k$ by one multiplication. Similarly, by Lemma 3, no other information can be learned from the $R_i$ or $R_k$ by the SP.

Putting the above together, the SP does not learn the structures of Q or G by invoking SPMatchs and the probability of determining a structure is equivalent to that of random guess.

Proposition 6:

Under SPEnum, the following holds:

If $Q_d$ is subgraph isomorphic to $G_d$, there is no information leakage, i.e., $$Pr[A(Q_d) = 1] = Pr[A(G_d) = 1] = \frac{1}{P(d)};$$

and

Otherwise, $$Pr[A(Q_d) = 1] = Pr[A(G_d) = 1] = \frac{1}{(P(d) - P(d-1))},$$

where $Q_d$ (resp., $G_d$) is the induced subgraph of Q (resp., G) that contains the mapped d vertices specified by the partial mapping $M_i'$ enumerated up to the level d.

Proof.

Recall that $M_{Qk}$ and $M_{\bar{G}k}$ are preserved, by Lemma 4 and Prop. 5. Hence, one only considers the information that the SP can gain from the protocol in SPEnum. Only $Q_d$ and $G_d$ are analyzed as the remaining subgraphs ($Q-Q_d$ and $G-G_d$) are not yet processed by the SP. By the protocol of SPEnum, the client informs the SP at the d-th level of the search tree, the SP knows that the nodes at the d-th level, say $v_j$ and $v_k$ in Q and G, cause a violation is detected or not. One thereby considers these two exhaustive cases as follows:

Case 1: If $Q_d$ is subgraph isomorphic to $G_d$, there is no violation between $Q_d$ and $G_d$. Recall Formula 1, a violation occurs when $v_j$ is connected to some vertices (under $M_Q$) but $v_k$ does not have corresponding edges (under $C_i$). When there is no violation, $v_j$ may or may not be connected to other vertices in $Q_d$. The SP cannot distinguish this because the edges of $v_j$ (in $M_{Qk}$) is preserved. Similarly, the SP does not learn any information about the edges of $v_k$ of $G_d$ neither. Hence, there is no information leakage; and Case 2:

If $Q_d$ is not subgraph isomorphic to $G_d$, there is a violation between $Q_d$ and $G_d$. Hence, the SP knows $Q_d$ and $G_d$ do not falsify Formula 1. However, if $v_j$ is isolated in $Q_d$, the first predicate of Formula 1 is always false; and if $v_k$ is connected to all other vertices in $G_d$, the second predicate of Formula 1 is always false. Contrarily, other than the above two scenarios, the SP cannot be certain the cause of the violation, as both $M_{Qk}$ and $M_{\bar{G}k}$ are protected. The above scenarios affect the probabilities as follows.

$v_j$ is isolated in $Q_d$, i.e., $\forall v_j' \in V(Q_d)$, $v_j' \neq v_j$, $(v_j, v_j')$a?? $E(Q_d)$. Then, the possible number of $Q_d$ with isolated $v_j$ is $P(d-1)$. Thus, the probability that the SP determines $Q_d$ is $$Pr[A(Q_d) = 1] = \frac{1}{(P(d) - P(d-1))};$$

and $v_k$ is connected to all other vertices in $G_d$, i.e., $\forall v_k' \in V(G_d)$, $v_k' \neq v_k$, $(v_k, v_k') \in E(G_d)$.

Then, the possible number of $G_d$ with $v_k$ connecting to all other vertices is $P(d-1)$. Therefore, the probability that SP determines $$G_d \text{ is } Pr[A(G_d) = 1] = \frac{1}{(P(d) - P(d-1))}.$$

Consider multiple SPEnum calls. Case 1 does not leak information, whereas the enumerations beyond Case 2 are pruned. In either case, an SPEnum call will not affect another.

Proposition 7:

Under SPRefine, the following holds:

If M(j,k) is not flipped, there is no information leakage; and

Otherwise, $$Pr[A(Q) = 1] = \frac{P(a+1)}{P(m)(P(a+1)-1)}; \text{ and} \quad (6)$$

$$Pr[A(G) = 1] = \frac{P(b+1)}{P(n)(P(b+1)-1)};$$

where $a = |MaxDeg(Q)|^{maxH}$, $b = |MaxDeg(G)|^{maxH}$, and MaxDeg(G) is the maximum degree of the vertices of G.

Proof.

Recall that for any $v_j \in V(Q), v_k \in V(G)$, $SI_{Q_k}[v_j]$ or $SI_{G_k}[v_k]$ themselves do not leak any structural information against CPA by Lemma 5. Therefore, one only considers the private inner product between $SI_{Q_k}[v_j]$ and $SI_{G_k}[v_k]$. For each M(j, k)=1, one divides it into two exhaustive cases as follows:

Case 1:

If M(j,k) is not flipped, $SI_Q[v_j] \cdot SI_G[v_k] = SI_Q[v_j] \cdot SI_Q[v_j]$ by Prop.4. By Lemma 5, SP cannot learn any structural information from $SI_{Q_k}[v_j]$ and $SI_{G_k}[v_k]$. The only information the SP can deduce is that the (four) conditions listed in Prop. 3 hold.

Since all the values of MaxDeg, Occur, PreLabel and Sup are encrypted, the SP does not learn any structural information (i.e., Q and G) of $v_j$ and $v_k$. Hence, there is no information leakage; and Case 2: If M(j,k) is flipped, $SI_Q[v_j] \cdot SI_G[v_k]$ $SI_Q[v_j] \cdot SI_Q[v_j]$. Similar to Case 1, the SP cannot deduce structural information from this, due to the encrypted operations. However, the flip of M(j,k) implies that there is a violation caused by $v_j$ and $v_k$ between the subgraphs $Q_a$ and $G_b$, where $Q_a$ (resp., $G_b$) is the induced subgraph of Q (resp., G), containing at most a (resp., b) vertices that are reachable from $v_j$ (resp., $v_k$) within maxH hops. This affects the probabilities similar to that in the proof of Prop. 6 as follows:

Vertices in $V(Q_a)$ are all isolated. The number of the possible Q containing such a $Q_a$ is $2^{m^2-(a+1)^2} = P(m)/P(a+1)$; and Vertices in $V(G_b)$ are connected to all other vertices. The number of the possible G containing such $G_b$ is $2^{n^2-(b+1)^2} = P(n)/P(b+1)$.

We obtain the probabilities as follows (similar to the derivations of Prop. 6's proof):

$$Pr[A(Q) = 1] = \frac{1}{P(m) - P(m)/P(a+1)} = \frac{P(a+1)}{P(m)(P(a+1)-1)}, \text{ and}$$

$$Pr[A(G) = 1] = \frac{1}{P(n) - P(n)/P(b+1)} = \frac{P(b+1)}{P(n)(P(b+1)-1)},$$

respectively.

Finally, each flip is independent because the subgraph of $Q_a$ and $G_b$ of each SPRefine can be arbitrarily different.

Finally, one remarks that Props. 6 and 7 state that the client may tune the privacy offered by SPsubIso by varying the variables maxH and d of SPEnum and SPRefine. Further, the values of MaxDeg and maxH (and therefore a and b) are not known to the SP. One uses these values in Prop. 6 to simply quantify the privacy. In the experiment, one confirmed that SPEnum and SPRefine are effective optimizations and one may set these variables to balance privacy and performances.

Experimental Evaluation

In this section, one presents a detailed experimental evaluation to investigate the performance of the techniques on both real world and synthetic datasets.

Experimental Setup

The platform. One sets up the SP as a server at Amazon EC2, equipped with a 2.8 GHz CPU and 16 GB memory running Ubuntu 14.04 OS. The client is a local machine with a 3.4 GHz CPU and 16 GB memory running Win 7 OS. For ease of exposition, one assumes the DO has a machine with the same setting, to encrypt data graphs. The client is connected to an Ethernet. All techniques were implemented on the GMP library (C++). By default, the CGBE uses 2048 bits; the sizes of the prime number q and the random number r are both set to 32 bits. The decomposition size ω is 15. The ASPE implementation is set accordingly. One has implemented a FHE-based solution. Its performance is always at least one order of magnitude slower than CGBE's. Thus, one does not report their numbers here.

Datasets.

One used two real-world benchmark datasets namely Aids (A) and PubChem(P), which are widely used. As the discussions focused on vertex labels, without loss of generality, one removes the edge labels. Aids consists of 10,000 graphs, which are drawn from a real antiviral dataset. On average, each graph in Aids has 25.42 vertices and 27.40 edges. The number of distinct vertex labels is 51. PubChem consists of 1 million graphs, which are drawn from a real chemical database. Each graph in PubChem has 23.98 vertices and 25.76 edges, on average. The number of distinct vertex labels is 81.

Query Sets.

For each of the aforementioned datasets, one used its existing query sets Q4, Q8, Q12, Q16, Q20 and Q24, which can be downloaded from Internet. Each Qn contains 1,000 query graphs, where n is the number of edges for each query.

Test Runs.

The queries were generated from random sampling of the above datasets and their associated query sets. For each dataset and query set Qn, one randomly sampled 1,000 graphs and 10 query graphs, i.e., for each Qn, one performed 10,000 subgraph isomorphism testings. In addition, the average densities of the sample graphs and queries are the same as those of the original data and query sets, respectively. One reports the average of the test runs by default. One uses the abbreviation AQT for average query time.

Default Values of Parameters.

The parameters used in SPRefine and SPEnum are set as follows. One sets the default maxH, and maximum values for MaxDeg, Occur, and Sup to 6. One sets the starting pruning depth d of the protocol of SPEnum to 3.

Experiments on Real Datasets

Performance by Varying Query Sizes

We first show the performance of various query sizes in FIG. 8.

Encryption Time by Varying Query Sizes.

One reports the average encryption times in FIG. 8(a). The encryption time of a query Q involves (1) the time for generating $SI_Q$; (2) the time of encryption of $M_Q$ by CGBE; and (3) the time of encryption of $SI_Q$ by ASPE. One observes that the average encryption times are around 100 ms and 150 ms for Aids and PubChem, respectively. The encryption of $M_Q$ by the present CGBE is efficient, which only costs several milliseconds on a commodity machine. Further, the query is encrypted only once.

Performance at the SP.

There are two types of queries in the processing of SPsubIso. The first type of the queries are those pruned by SPRefine. FIG. 8(b) reports the percentage of such queries. In particular, one notes that the PubChem queries Q16-24 are completely pruned. FIG. 8(c) shows the average query time of those pruned queries, which is largely occupied by the private inner product. It is unsurprising that the time increases with the query size. They are smaller than 65 ms and 140 ms on Aids and PubChem, respectively.

The second type is the non-pruned queries that pass SPRefine. For these queries, one reports the percentage of pruned possible mappings in FIG. 8(d), which can be calculated by the number of flipped is by SPRefine. The average query times are shown in FIG. 8(e). For most queries, the query times are smaller than 1s. The query time of Q8 is the longest but it is still smaller than 1.4s.

Performance at the Client Side.

One reports the performance at the client side in FIG. 8(f). The times required are tiny, for instance, about 9 ms from Q8 of PubChem and clearly smaller than 2 ms for other queries. The average number of rounds between SP and client is usually small (FIG. 8(g)). Since many invalid partial mappings are pruned, the total message size sent to the client (FIG. 8(h)) is small (around 150 KB in worst case). In each round, at most 16 KB of messages are sent.

Comparison with the Naïve Method.

Assume that the whole database was transferred to the client. One runs one of the most popular non-indexing subgraph isomorphism algorithms VF2. The total AQT for all query sets on Aids and PubChem at the client side are up to 20 ms and 30 ms, respectively. In comparison, after the encryption for each query, the computation of the techniques at the client side requires only a few milliseconds on average (FIG. 8(f)). That is, one saves most of the computations at the client.

Effectiveness of SPEnum

In FIG. 9, one verifies the effectiveness of SPEnum by varying the starting pruning depth d to (3, 4, 5). The query set is Q8.

Performance at the SP.

FIG. 9(a) shows the query time at SP. It is obvious that as the value d increases, the search space increases, the query time increases.

Performance at the Client Side.

FIG. 9(b) shows the decryption time at the client side increases with d and its trend closely follows that of the query times. The average number of rounds between SP and client (FIG. 9(c)) decreases as the value d increases because the protocol in SPEnum is a BFS. The message size increases according to d, as shown in FIG. 9(d). However, importantly, by Prop. 6, the probabilities that SP can determine the structures decrease with d increases.

Effectiveness of SPRefine

We verify the effectiveness of SPRefine by varying SI. One ranged maxH, and the maximum values for MaxDeg, Occur and Sup from 4 to 8. In this experiment, the query set is Q8, and the starting pruning depth d of SPEnum is 3.

Encryption Time.

FIGS. 10 (a) and (b) show the encryption times of G and Q, respectively. As the maximum values increase, the encryption times of both G and Q increase.

Effectiveness of SPRefine.

FIG. 10(c) shows the average percentage of queries that are pruned by SPRefine with different maximum values in SI. One notes that the pruning effectiveness on different maximum values are similar to each other, which are almost 96% for queries on both Aids and PubChem. That means for each $v_j \in V(Q)$, $v_k \in V(G)$, h-$Hop_j(v)$ may differ with each other within 4 hops with very high probabilities if M(j,k) is flipped to 0. However, the SP has no precise knowledge about the encrypted SIs. Further, by Prop. 7, the probability that the SP can determine the structures decreases as maxH increases.

Performance at the SP.

FIG. 10(d) shows the average query time of queries pruned by SPRefine, which mainly involves the time for private inner products. As expected, the times are small. Since the pruning of SI is very similar under different maximum values (by FIG. 10(c)), the query times for those non-pruned queries (the queries pass SPRefine) are similar, shown in FIG. 10(e). The times are around 400 ms and 1.4s for Aids and PubChem, respectively.

Performance at the Client Side.

Since the query times are similar to different maximum values on SI, the decryption times at the client side shown in FIG. 10(f) are also very similar. The average number of rounds between the SP and the client are shown in FIG. 10(g), which are around 8 and 11 for Aids and PubChem respectively. The size of the received messages at client is shown in FIG. 10(h), which are around 17 KB and 145 KB, respectively.

The present invention presents the first work on query services for structure-preserving subgraph isomorphism (SPsubIso). SPsubIso comprises three major steps: (1) Structure-preserving matching (SPMatch) involves a novel cyclic group based encryption (CGBE) scheme to compute whether a mapping between Q and G is valid, in an encrypted domain. (2) Structure-preserving enumeration (SPEnum) comprises a protocol that involves the client for further pruning. (3) Structure-preserving refinement (SPRefine) exploits a static index for pruning the search space of possible mappings. The analysis shows that the structural information is preserved under SPMatch and presents the privacy preservation due to optimizations. The experiments on both real and synthetic datasets confirm that SPsubIso is efficient. In future work, one will investigate relaxations of privacy requirements.

Further Embodiments of Present Invention

The present invention is applicable to large networks, not limited to large graph respositories. See the motivating example below. Other examples can be found in network medicine and patterns in communication networks.

Motivating Example

Law enforcement agencies are increasingly using social media to solve crimes. According to a recent survey of 1,221 federal, state and local law enforcement who use social media, four out of five officials used social media to solve crimes. Suppose a law enforcement agency is investigating a set of suspicious individuals over a public social network (e.g., Cloob, which is a Persian-language social networking website, mainly popular in Iran) held in a third party SP. In order to monitor the online activities of these individuals with one another, the agency wishes to glean information related to interactions between them on the network by issuing a subgraph query representing the relationships between the individuals. Unfortunately, it is possible that the SP may have been infiltrated by friends or sympathisers of these individuals. Hence, in order to protect the privacy of the intent of the agency from the SP, the agency cannot expose the subgraph query directly, especially the query structure (i.e., specific relationship pattern between the individuals). How can the agency glean relevant information using a subgraph query while preserving its topological privacy?

Unfortunately, previous work on privacy-preserving graph queries cannot support subgraph queries while preserving their structure. Some works keep both query and data graphs private. In contrast, as query clients may often have data access privileges, the privacy requirement of this work is on queries only. As a result, querying significantly larger graphs becomes possible. Other work has studied privacy-preserving graph publication. Since the published data are sanitized (i.e., modified), it is not clear how subgraph queries can be supported. Recent studies have addressed the authenticity of the query answers, but not their confidentiality.

The problem setting on large graphs is different from that of large number of modest graphs (graph repositories). Specifically, the graph data is public and hence can be exploited by optimization. However, the queries remain private. This is what one called asymmetric structure preserving query service.

The first challenge of this invention is "how to reduce a large data graph and subsequently the number of candidate mappings for verification, without exposing the query structure?". The first idea is to determine the minimized candidate subgraphs that contain at least a candidate mapping. Then candidate mappings are enumerated from those subgraphs instead of the original graph. In particular, optimizations use novel neighborhood containment of data vertices to minimize the subgraphs. Second, subgraphs (called candidate matchings) from a candidate subgraph are determined, where candidate mappings are enumerated. In comparison, in previous work where privacy is not a concern, the matching (i.e., the query graph) is known. One presents a subgraph cache and use neighborhood equivalent classes to further minimize the number of matchings and mappings.

The second challenge is "how to verify if a candidate mapping is a subgraph isomorphism mapping without leaking the query structure?". One presents a new query encoding scheme and adopt an encryption scheme for query graphs. With these, one derives a basic structure-preserving verification method that consists of a series of private matrix operations. Moreover, to minimize communication overheads, one presents to use the complement of the encoding for an enhanced verification method for queries of bounded sizes.

In summary, the contributions of the present invention for asymmetric structure-preserving query processing (ASPQP) are as follows:

At query time, one first presents a new candidate subgraph exploration in the absence of query structure, to reduce a large data graph for query processing. One presents further reducing the size of candidate subgraphs by using neighborhood containment.

Since candidate matchings are determined from candidate subgraphs, one presents a subgraph cache to prune the candidate matchings that are enumerated.

We present a robust encoding scheme and its verification method. One presents a model for the client to determine a proper encoding for his/her query.

We conduct extensive experiments with real datasets to investigate the effectiveness and efficiency of the present methods.

Problem Formulation

This section formulates the technical problem in the present invention for ASPQP. More specifically, it presents the system model, attack model, privacy target, and problem statement.

System Model.

The system model resembles the classical server-client model, which contains two parties (illustrated in FIG. 11): (1) A Service Provider (SP) and (2) the query client (or simply client). The SP is equipped with powerful computing utilities such as a cloud and hosts a subgraph query service for publicly known graph data G. The client encrypts his/her query Q using a secret key (generated by himself/herself) as $Q_k$ and submits $Q_k$ to the SP. The SP then processes the client's encrypted query $Q_k$ over the data G, and returns an encrypted result to the client. The client decrypts the result to obtain the query answer.

The main differences between SPQP and ASPQP are summarized below.

|  | Structure-preserving subgraph query processing (SPQP) | Asymetric structure-preserving subgraph query processing (ASPQP) |
| --- | --- | --- |
| The parties in the system model | Client, data owner, and service provider (SP) | Client, and SP |
| Adversary | SP | SP |
| Security concerns | Query and graph topologies | Query topology |

Attack models of SPQP and ASPQP are identical.

To sum up, the problem statement of this present invention for ASPQP can be stated as follows: Given the above system and attack model, one seeks an efficient approach to complete the subgraph query service while preserving the privacy target.

Overview of One Embodiment of the Present Invention

An overview of the solution is sketched in FIG. 12. The solution essentially consists of the algorithms at the client side and those at the SP side.

Client-Side Algorithms.

For the algorithms at the client side, one presents performing lightweight optimization and encryption on the query graph Q. (1) One first analyzes the query to determine the starting label $l_s$ and the minimum height h of Q, which are useful for minimizing the number and the sizes of candidate subgraphs of G. A candidate subgraph is a subgraph in G that may contain a candidate matching, whereas a candidate matching is a subgraph of the candidate subgraph that may generate a candidate mapping between Q and G. (2) One then presents a robust encoding scheme for Q (of any size). (3) One adopts the private-key encryption scheme CGBE to encrypt the encoded Q to encrypted query $Q_k$, which is issued to the SP for query processing. (4) The client decrypts the encrypted answer returned by the SP.

Server-Side Algorithms.

The main ideas of the algorithms at the SP side are to localize and minimize the enumeration of candidate mappings between Q and G in candidate subgraphs. (1) The SP first efficiently determines the candidate subgraphs $CS_s$s (subgraphs) starting from each starting vertex s of the label $l_s$ with the traversal depth h. One presents neighborhood containment (NC) to minimize each $CS_s$ in the absence of the structure of Q. Subsequently, it minimizes the number of candidate mappings to be enumerated by the SP. (2) In each $CS_s$, the SP enumerates all candidate matchings ($CM_s$) and candidate mappings. One presents a canonical labeling-based subgraph cache and apply neighborhood equivalent class (NEC) to further avoid redundant $CM_s$ and candidate mappings, respectively. (3) One derives structure-preserving verification SPVerify, where multiple encrypted messages $R_k$ (with negligible false positives) are returned to the client for decryption of the result.

SPVerify is derived from the seminal subgraph isomorphism algorithm: the Ullmann's algorithm. The major benefit is that its computation flow is simple; hence, one can cast the algorithm into a series of matrix operations (additions and multiplications). Since the encryption of SPVerify supports such matrix operations, privacy is preserved.

We also note that SPVerify may send multiple messages to the client for decryption, which may result in high decryption and network communication costs. Thus one presents SPVerify*. The major difference between SPVerify* and SPVerify is that SPVerify* uses different query encodings according to different query sizes and significantly fewer encrypted messages are returned for decryption, and the query size is smaller than a system-related constant.

Query Preprocessing at the Client

In this section, one introduces a preprocessing method of the query graph. It comprises three steps: (1) retrieving optimization parameters; (2) encoding the query; and (3) encrypting the encoded query. The encrypted query is sent to the SP.

Retrieving Parameters for Optimization

In order to minimize (1) the size of each candidate subgraph $CS_s$ and (2) the total number of $CS_s$s, the SP requires the minimum height h of Q and, in the meantime, the starting label $l_s$ of $CS_s$s that is infrequent in G. These parameters (h and $l_s$) are efficiently retrieved by the client.

Given a starting label $l_s$, the SP generates $CS_s$s by a breadth first search bounded by the depth h starting at each vertex of G having the label $l_s$. On the one hand, to minimize the size of each $CS_s$, one simply finds the spanning tree of Q with a minimum height h rooted from a vertex u, where $u \in V(Q)$ and $l_s = L(u)$. Intuitively, the smaller the value h, the smaller the size of each $CS_s$. Note that one cannot choose the vertex u with h=1 since it trivially leaks the structure of Q. When there is a tie (i.e., when vertices u and v of Q have the same h) the client selects the vertex of the label that is less frequent in G, simply because the number of $CS_s$s is bounded by the occurrence of the label in G.

Example 10

FIG. 13 (a) shows an example of the selection of the starting label of query Q. The heights of the spanning trees rooted from $u_1$, $u_3$, and $u_4$ are 2. $u_1$ is finally chosen as the starting label as $occ(0,G) < occ(2,G)$, where $L(u_1)=0$, and $L(u_3)=L(u_4)=2$. $u_2$ is not considered because the height of its spanning tree is 1.

Query Encoding

For presentation brevity, one reuses the encoding scheme for the query Q presented in [0066] to facilitate the discussion of the subsequent encryption scheme. This encoding is extended for further optimization for ASPQP. One recalls the encrypted query by CGBE with Example 11.

Example 11

For example, $\forall u_i, u_j$, if $M_Q(u_i,u_j)=1$, then $M_{Qk}(u_i,u_j)=\text{Enc}(1)=rg^x \pmod{p}$; and if $M_Q(u_i,u_j)=q$, then $M_{Qk}(u_i,u_j)=\text{Enc}(q)=rqg^x \pmod{p}$.

Discussion

One remarks that the client holds the secret keys (x,g) for decryption and moreover, determines the constant c and an encrypted value I for encrypting verification results. At last, $l_s$, h, $Q_k$, c, I and p are sent to the SP for structure-preserving query processing.

Minimized SP Mapping Generation

The query preprocessing at the client side generates ($l_s$, h, $Q_k$, c, I, p) for the SP. Upon receiving these, the SP performs structure preserving subIso (termed SPsubIso), presented in Algo. 1.

As outlined, the SP first minimizes the number of candidate mappings to-be-verified. For brevity, one focuses on the most crucial procedures: candidate subgraph generation, candidate matching generation, and candidate mapping enumeration

---

Algorithm 2 GenAllMap ($Q_k$,$CM_s$,$R_k$)

Input: The encrypted query $Q_k$, candidate matching $CM_s$ and encrypted result $R_k$
1: Generate M from $Q_k$ and $CM_s$
2: Initialize vector used as $\vec{0}$
3: Initialize vector map as $\vec{0}$
4: Construct NEC of $CM_s$
5: EnumMap($u_0$,used,map,M,$Q_k$,$CM_s$,$R_k$)     /* Enumeration */
Procedure 2.1 EnumMap ($u_i$,used,map,M,$Q_k$,$CM_s$,$R_k$)
6:     if i = |V($Q_k$)|
7:         if |V($Q_k$)| ≤ c, SPVerify* (map,$Q_k$,$CM_s$,$R_k$)     /* Sec. VI-B */
8:         else SPVerify(map,$Q_k$,$CM_s$,$R_k$)     /* Sec. VI-A */
9:     for each j < |V($CM_s$)|,M($u_i$,$v_i$) = 1 ∧ used[$v_j$] = 0
            /* Eliminate redundant mappings by Lemma 5.2 */
10:         if $\exists v_{j'}, v_{j'} \simeq v_j, j' < j$, used[$v_{j'}$] = 0     /* Lexi.Order */
11:             continue
12:         used[$v_j$] = 1, map[$u_i$] = $v_j$
13:         EnumMap ($u_{i+1}$,used,map,$Q_k$,$CM_s$,$R_s$)
14:         used[$v_j$] = map[$u_i$] = 0

---

Minor details are skipped from this document.

Candidate Subgraph Generation

To avoid enumerating mappings on a possibly large graph, the SP first generates candidate subgraphs (FIG. 13(b)), where possible mappings can only be embedded in those subgraphs. A candidate subgraph is formally described in Def. 10.

Definition 10:

A candidate subgraph started from $s \in V(G)$, denoted as $CS_s$, is an induced subgraph of G, s.t.
1. $L(s)=l_s$;
2. $\forall v \in V(CS_s)$, v is reachable from s within h hops;
3. $\forall l, l \in \Sigma(CS_s) \leftrightarrow l \in \Sigma(Q)$; and
4. $\forall l \in \Sigma(CS_s), occ(l,CS_s) \geq occ(l,Q)$.

Example 12

Suppose $L(s)=l_s=0$ and h=2. FIG. 13(b) sketches an example of a candidate subgraph $CS_s$ (the grey-colored shadow) rooted from s of G. For each vertex v in $CS_s$, v is reachable from s within 2 hops. The set of labels of Q is the same as that of $CS_s$ (i.e., $\Sigma(CS_s)=E(Q)$). For each label l in $CS_s$, $occ(l,CS_s) \geq occ(l,Q)$.

Initial Generation.

GenCandSubGraph (Procedure 1.1, Lines 8-17) shows the generation of candidate subgraphs. Algo. 1 (cf Page 68) first initializes the $CS_s$ as ø (Line 1). For each vertex $s \in V(G)$, where $L(s)=l_s$, it invokes GenCandSubGraph (Line 1). GenCandSubGraph simply generates $CS_s$ by a breadth first search method started from s on G within h hops (Lines 10-15). $V_{CS_s}$ is to record the vertices of $CS_s$ determined so far. For each vertex $v \in V_{CS_s}$, v must be reachable from s within h hops (Lines 13-15), and $L(v) \in \Sigma(Q)$ (Line 13). If $\forall l \in \Sigma(CS_s)$, $occ(l,CS_s) > occ(l,Q)$ (Line 16), $CS_s$ is set to the induced subgraph of $V_{CS_s}$ in G (Line 17).

Minimization by Neighborhood Information.

Since the sizes of candidate subgraphs have a significant impact on performance, one presents MinCandSubGraph (Procedure 1.2) to minimize the size of each $CS_s$. MinCandSubGraph is derived based on the notion of neighborhood containment class (NC) of $CS_s$, defined as follows.

Definition 11:

nb(v, G) is the set of neighbors of v in the graph G.

Definition 12:

Given $N=\{v_1, v_2, \ldots, v_n\}$ of $V(CS_s)$, N is a neighborhood containment class (NC), denoted as $v_1 \sqsubseteq v_2 \sqsubseteq \ldots \sqsubseteq v_n$, iff $\forall v_i, v_j \in N$, $i < j$, 1. $L(v_i)=L(v_j)$;
2. (a) $nb(v_i, CS_s) \subseteq nb(v_j, CS_s)$, if N is an independent set in $CS_s$; or
(b) $nb(v_i, CS_s) \cup \{v_i\} \subseteq nb(v_j, CS_s) \cup \{v_j\}$, if N is a clique of $CS_s$.

Based on Def. 12, the vertices of a candidate subgraph $CS_s$ exhibit a total ordering with respect to the $\sqsubseteq$ relationships. One has the following lemma for minimizing the size of a candidate subgraph by keeping the "top" vertices in the subgraph. The intuition is that the reduced $CS_s$ preserves all the structures of the original $CS_s$. The proof is established via a simple contradiction.

Lemma 6:

Denote an NC N as $\{v_1, v_2, \ldots, v_n\}$, where $N \subseteq V(CS_s)$ of a graph G. Denote the reduced $V(CS_s)$ (denoted as $CS_s'$) is the induced subgraph of N of $CS_s$, i.e. $N=\{v_{n-k+1}, v_{n-k+2}, \ldots, v_n\}$ contains top-k vertices of N that are kept, where $k=occ(L(v_1),Q)$. Then, the answer of Q on $CS_s'$ is the same as that on $CS_s$.

Example 13

Reconsider Example 12. $\{v_1,v_2\}$ is an NC as $L(v_1)=L(v_2)$, $nb(v_1,CS_s) \subseteq nb(v_2,CS_s)$ and $\{v_1,v_2\}$ forms an independent set of $CS_s$ in FIG. 13(c). Since $occ(1,Q)=1$, by Lemma 6, one keeps the top-1 vertex. It can be seen that the answer of Q remains the same after removing either $v_1$ or $v_2$ from $CS_s$. For another example, let's consider the NC $\{v_4,v_5,v_6\}$ in FIG. 13(c), as the neighborhood of $v_4$ is contained by that of $v_5$. Hence, $v_4 \sqsubseteq v_5$. Similarly, $v_5 \sqsubseteq v_6$. $\{v_4,v_5,v_6\}$ forms an independent set. Again, by Lemma 6, one keeps only the top-1 vertex, i.e., $v_6$. The answer of Q remains the same after removing $v_4$ and $v_5$. All in all, FIG. 14(a) shows $CS_s$, the candidate subgraph after the minimization.

The Minimization Procedure MinCandSubGraph.

Procedure 1.2 shows the minimization of $CS_s$ by NC. For each $l \in \Sigma(CS_s)$, a set N of NC is first initialized as { } (Line 18). For each vertex v of $CS_s$ with the label f, sorted in ascending order of $|nb(v,CS_s)|$ (Line 19) for efficiency, MinCandSubGraph checks if there is an N in N, such that $N \cup \{v\}$ forms an NC by Def. 12 (Line 20). If so, v is then inserted into N (Line 21). Otherwise, the algorithm creates a new $N=\{v\}$ and unions N to N (Line 22). After the generation of NC of $CS_s$ for the label l, $CS_s$ can be minimized by Lemma 6 via keeping the top-k vertices in each N, $N \in N$, $k=occ(l,Q_k)$ (Lines 23-24).

Complexity.

The complexity of the generation of NC in Procedure 1.2 is $O(d_{max}|V(CS_s)|^2)$, where $d_{max}$ is the maximum degree of the vertices in $CS_s$. In practice, $|V(CS_s)|$ is often in the order of hundreds, which is small.

---

Algorithm 1 SPsubIso($Q_k$,G,$l_s$,h)

---

Input: The encrypted query graph $Q_k$, data graph G, starting label $l_s$, and hop h
Output: The encrypted result $R_k$
1: Initialize $CS_s$ = $CM_s$ = ø, Cache = ø, and $R_k$ = 1
2: for each vertex s ∈ V(G) with the starting label $l_s$
3:    GenCandSubGraph($Q_k$,G,s,h,$CS_s$)      /* By Def. 5.1 */
4:    MinCandSubGraph($Q_k$,$CS_s$)      /* Minimize $CS_s$*/
5:    Initialize set $V_{CMs}$ = {s}
6:    GenCandMatch($V_{CMs}$,$Q_k$,$CS_s$,$R_k$,Cache)      /* By Def. 5.3 */
7: return $R_k$
Procedure 1.1 GenCandSubGraph($Q_k$,G,s,h,$CS_s$)
8: Initialize a queue Visit and a set $V_{CS_s}$ as empty
9: Visit.push(s),$V_{CSs}$.insert(s),s.hop( ) = 0
10: while Visit is not empty      /* BFS method */
11:    v = Visit.pop( )
12:    if (v.hop( ) = h) continue      /* By 2. in Def. 5.1 */
13:    for each v' = nb(v,G),v' ∉ $V_{CSs}$ ∧ L(v') ∈ $\Sigma(Q_k)$
14:       Visit.push(v'), $V_{CSs}$.insert(v')
15:       v'.hop( ) = v.hop( ) + 1      /* By 4. in Def. 5.1 */
16: while ∃l ∈ $\Sigma(V_{CSs})$,s.t.,occ(l,$V_{CSs}$) < occ(l,$Q_k$)
       remove all v from $\Sigma(V_{CSs})$, where v ∈ $\Sigma(V_{CSs})$ and
       $\Sigma(v)$ = l
17:    $CS_s$ = GenInducedSub(G,$V_{CSs}$)
Procedure 1.2 MinCandSubGraph($Q_k$,$CS_s$)
18:    for each l ∈ $\Sigma(CS_s)$,N = { }      /* N is a set if NC */
       /* Ascending ordered by |nb(v, $CS_s$)| */
19:       for each v ∈ V($CS_s$),L(v) = l,
20:          if ∃N ∈ N,s.t.,      /* By Def. 5.2 */
          (1) {v} ∪ N forms an independent set (or a clique); and
          (2) nb(v,$CS_s$) (or nb(v,$CS_s$) ∪ {v}) contains those of vertices
          in N.
21:             N.insert(v)      /* Ordered by $\sqsubseteq$*/
22:          else create a new N, N = {v},N = N ∪ {N}
23:       for each N ∈ N, $N_k$ = $\{v_{n-k+1},...,v_n\}$,k = occ(l,$Q_k$)
24:          remove N\$N_k$ from $CS_s$      /* By Lemma. 5.1 */

---

Candidate Matching Generation

A unique challenge in structure-preserving query processing is that, in the absence of query structure, the SP matches $Q_k$ to multiple possible subgraph structures in $CS_s$. One calls such subgraph structures candidate matchings. In contrast, if the query structures were not kept secret, the candidate matching was known to be Q. FIG. 14 (a) shows four candidate matchings, $CM_{s1}$, $CM_{s2}$, $CM_{s3}$, and $CM_{s4}$. For each matching, candidate mappings are enumerated. It is evident that a naive enumeration of all candidate matchings can be inefficient. In this subsection, one presents GenCandMatch to efficiently generate candidate matchings. The main idea is to avoid generating redundant matchings from $CS_s$.

Definition 13:

A candidate matching, denoted as $CM_s$, is a connected induced subgraph of $CS_s$, s. t.
1. $|V(CM_s)|=|V(Q)|$; and
2. $\forall l \in \Sigma(CS_s)$, $occ(l,CM_s)=occ(l,Q)$.

Example 14

FIG. 14 (a) lists all the $CM_s$s enumerated from $CS_s$. $\forall CM_{si}$, $i \in \{1, \ldots, 4\}$, $|V(CM_{si})|=|V(Q)|$, and $\forall l \in \Sigma(CS_s)$, $occ(l,CM_{si})=occ(l,Q)$.

Elimination of Redundant $CM_s$.

One makes two observations from Example 14 and FIG. 14. (1) $CM_{s2}$ is graph-isomorphic to $CM_{s3}$. If candidate mappings are generated from $CM_{s2}$, it is obvious that generating mappings from $CM_{s3}$ is redundant. (2) $CM_{si}$ is a supergraph of $CM_{s2}$. One can simply generate mappings from $CM_{si}$, and skip $CM_{s2}$ and $CM_{s3}$.

To remove the redundancies mentioned above, it is exactly to solve the following problem: "given a graph G and a graph database G:$\{G_1, \ldots\}$, how to efficiently determine if G is a subgraph of G', G'∈G?" Such a problem has been extensively studied before. Existing solutions involve an index computed offline. In the context, candidate matchings are enumerated online. Hence, the existing solutions cannot be directly applied.

Canonical Labeling-Based Subgraph Cache.

Let's recall a crucial property of canonical labeling. In the context of graph query processing, the canonical labeling of a graph G is denoted as can(G), and can(G)=can(G') if and only if G is isomorphic to G'. While the cost for computing the canonical labeling of a graph is not yet known (P or NP), the cost for comparing whether two graphs are isomorphic using the labeling is O(1), once computed. This work adopts the minimum dfs code from the literature.

For each query, one presents Cache to store can($CM_s$), where each $CM_s$ is the checked candidate matching. Once a new $CM_s'$ is generated, one first checks if can($CM_s'$) is already in Cache. If so, $CM_s'$ is discarded. Otherwise, one inserts can($CM_s'$) into Cache. Further, one continues to enumerate subgraphs CM's from $CM_s'$, where for each CM', |V(CM')|=|V($CM_s'$)|, CM'⊆$CM_s'$, and can(CM') is stored in Cache. Putting subgraphs of $CM_s'$ increases the chance of pruning by Cache. However, the trade-off is that as the query size increases, the computational cost for enumerating all subgraphs of a $CM_s'$ increases exponentially. Thereby, for practical purposes, one enumerates all of the subgraphs CM's of $CM_s'$ only if |V(Q)|≤δ, where δ is a user-defined threshold.

Example 15

The top of FIG. 14(a) shows the idea of the canonical labeling-based cache. One assumes that δ is 3, and the sequence of the generation of $CM_s$ is from $CM_{s1}$ to $CM_{s4}$. $CM_{s3}$ is eliminated as can($CM_{s2}$) is in Cache. If one sets δ to 5, then $CM_{s2}$ and $CM_{s3}$ are both eliminated, because $CM_{s2}$ is a subgraph of $CM_{s1}$, and when $CM_{s1}$ is processed, can($CM_{s2}$) is inserted into Cache.

The Ordering in $CM_s$ Generation.

From Example 15, it can be observed that the ordering in $CM_s$ generation affects the performance of the cache, when |V(Q)|≤δ. Suppose δ=5. Assume $CM_{s2}$ is generated before $CM_{s1}$. Then, $CM_{s2}$ is not eliminated. In general, the earlier the larger $CM_s$s are generated, the better the performance is. Therefore, one finds a simple ordering for $CM_s$ generation, by greedily adding vertices to the $CM_s$ by the degree of each vertex.

We skip the pseudo-code for $CM_s$ generation (GenCandMatch), which is essentially an enumeration incorporated with the subgraph cache.

---

Algorithm 2 GenAllMap ($Q_k$,$CM_s$,$R_k$)

Input: The encrypted query $Q_k$, candidate matching $CM_s$ and encrypted result $R_k$
1: Generate M from $Q_k$ and $CM_s$
2: Initialize vector used as $\vec{0}$

---

Algorithm 2 GenAllMap ($Q_k$,$CM_s$,$R_k$)

3: Initialize vector map as $\vec{0}$
4: Construct NEC of $CM_s$
5: EnumMap($u_0$,used,map,M,$Q_k$,$CM_s$,$R_k$)   /* Enumeration */
Procedure 2.1 EnumMap ($u_i$,used,map,M,$Q_k$,$CM_s$,$R_k$)
6:   if i = |V($Q_k$)|
7:     if |V($Q_k$)| ≤ c, SPVerify* (map,$Q_k$,$CM_s$,$R_k$)   /* Sec. VI-B */
8:     else SPVerify(map,$Q_k$,$CM_s$,$R_k$)   /* Sec. VI-A */
9:   for each j < |V($CM_s$)|,M($u_i$,$v_j$) = 1 ∧ used[$v_j$] = 0
       /* Eliminate redundant mappings by Lemma 5.2 */
10:      if ∃$v_{j'}$,$v_{j'}$ ≅ $v_j$,j' < j,used[$v_{j'}$] = 0   /* Lexi.Order */
11:        continue
12:      used[$v_j$] = 1,map[$u_i$] = $v_j$
13:      EnumMap ($u_{i+1}$,used,map,$Q_k$,$CM_s$,$R_k$)
14:      used[$v_j$] = map[$u_i$] = 0

---

Candidate Mapping Generation

For a new candidate matching $CM_s$ is generated, GenCandMatch (though its pseudo-code is omitted for brevity) invokes GenAllMap (Algo. 2, cf Page 71) to enumerate all possible mappings between $Q_k$ and $CM_s$.

Elimination of Redundant Mappings by NEC.

Recall that the number of mappings is exponential to the size of $CM_s$. However, in practice, many mappings are redundant. Hence, before generating the mappings, one utilizes neighborhood equivalent classes NECs of $CM_s$ (Def. 14) to eliminate those redundant mappings.

Definition 14:

Given an NC N=$\{v_1, v_2, \ldots, v_n\}$ of $CS_s$, where N is either an independent set or a clique of $CS_s$, N is a neighborhood equivalent class (NEC), denoted as $v_1 \cong v_2 \cong \ldots \cong v_n$, iff $\forall v_i, v_j \in N$, $v_i \sqsubseteq v_j$ and $v_j \sqsubseteq v_i$.

Example 16

Let's consider the example of $CM_{s4}$ in FIG. 14(a), $\{v_5,v_6\}$ is an NEC as L($v_5$)=L($v_6$) and nb($v_6$,$CM_{s4}$)=nb($v_5$,$CM_{s4}$)=$\{v_3\}$.

Suppose that $u_3$ and $u_4$ (in FIG. 14 (a)) have been mapped to $v_5$ and $v_6$, respectively. It is not necessary to map $u_3$ and $u_4$ onto $v_6$ and $v_5$, respectively. This can be formalized as the following lemma. Foremost, one often uses ($u_i$a?|$v_i$) to denote map[$u_i$]=$v_i$ for ease of exposition.

Lemma 7:

Suppose the following are true:
1. $u_i$,$u_j$∈V(Q), $v_i$,$v_j$∈V($CM_s$), L($u_i$)=L($u_j$)=L($v_{i'}$)=L($v_{j'}$);
2. $v_i$a??$v_j$;
($u_i$a?|$v_{i'}$, and ($u_j$a?|$v_{j'}$.

Let map' be the mapping map except that ($u_i$a?|$v_{i'}$) and ($u_j$a?|$v_{j'}$). Then, map is a candidate mapping between Q and $CM_s$ if and only if map' is also a candidate mapping.

The proof is omitted since it can be established by a simple proof by contradiction. Next, one presents the data structures and the mapping generation, that exploit the lemma.

Data Structures.

(i) A vertex label mapping M is a m×n binary matrix, m=|V($Q_k$)| and n=|V($CM_s$)|. Specifically, $\forall$u,v, M(u,v)=1 if L(u)=L(v), where u∈V($Q_k$) and v∈V($CM_s$); and otherwise 0. (ii) A vector map of the size |V($Q_k$)| is to record a mapping from $Q_k$ to $CM_s$, map[u]=v (i.e., ua?|v) represents that vertex u in $Q_k$ is mapped to vertex v in $CM_s$. map[u]=0 if u is not yet mapped. (iii) A vector used of the size |V($CM_s$)| is to denote whether the vertex v in $CM_s$ has been mapped to a vertex of $Q_k$ and recorded in map. used[v]=0 if v is not yet mapped. In other words, used[v]=1 if and only if map[u]=v for some u∈$Q_k$.

Algorithm for Mapping Generation.

The detailed algorithm GenAllMap is shown in Algo. 2, cf Page 71. It first initializes the data structures, including M, used and map in Lines 1-3. Line 4 constructs NEC of $CM_s$, which is similar to that of NC in Procedure 1.2. EnumMap (Lines 6-14) is then invoked to enumerate all possible mappings. A mapping map is constructed vertex by vertex iteratively. Line 9 checks if $v_j$ is a possible map of $u_i$ by M and used. One then exploits the equivalence class to further check if $v_j$ can be possibly mapped to $u_i$ (Lines 10-12). The vertices in a NEC are checked in a predefined order (e.g, lexicographical order). If ∃$v_{j'}$ s.t. $v_j$a??$v_{j'}$, j'<j and $v_{j'}$ is not used before, then $v_j$ is skipped (Line 10). If $v_j$ passes the check, EnumMap is called recursively (Line 13) until a full mapping is constructed (Line 6).

Example 17

FIG. 14(b) illustrates the possible candidate mapping generation for those $CM_s$s of Example 14. Since $v_5$a??$v_6$ in $CM_{s4}$, by Lemma 7, one only enumerates map$_5$, where $u_3$ a?|$v_5$ and $u_4$a?|$v_6$, but the one with $u_3$a?|$v_6$ and $u_4$ a?|$v_5$ is eliminated.

SP Mapping Verification

One embodiment of the present invention presented a series of optimizations that reduce the number of mappings to be generated. Then, for each mapping map, the SP verifies (in the encrypted domain) if there is no violation in map. The encrypted verification results are aggregated before they are transmitted to the client. In this section, one derives a basic verification (SPVerify) from for the problem setting. Next, one presents an enhanced one (SPVerify*) that aggregates many more messages but requires the query size to be smaller than a user-determined constant.

SPVerify

Given a mapping map between $Q_k$ and $CM_s$, one determines if $CM_s$ is a valid mapping or not. Specifically, one defines the violation w.r.t. the encoding of Q as follows: ∃$u_i,u_j$∈V(Q), $$M_Q(u_i, u_j) = 1 \wedge (v_{i'}, v_{j'}) \in E(CM_s) \quad (8)$$

where $v_{i'}, v_{j'}$∈V($CM_s$), $u_i$a?|$v_{i'}$ and $u_j$a?|$v_{j'}$. It states that there exists an edge between vertices $u_i$ and $u_j$ in Q, but there is no corresponding edge between the mapped vertices $v_{i'}$ and $v_{j'}$ in $CM_s$. One terms the case in Formula 8 as a violation of subgraph isomorphism (or simply violation). A mapping without violation(s) is called a valid mapping.

Example 18

Let's take the two mappings map1 and map2 of $CM_{s1}$ in FIG. 14(b) as an example. First, no violation is found in map1. Second, for map2, one finds that $M_Q(u_1, u_3)=1$ and (s,$v_4$)a??E($CM_{s1}$), where map2[$u_1$], s and map2[$i_3$]=$v_4$. Therefore, map2 is invalid.

Algorithm for SPVerify.

The intuitive idea of SPVerify is to transform the verification steps into mathematical operations on $M_{Qk}$ and $CM_s$, where (1) the violation (Formula 8) can be detected; (2) only matrix additions and multiplications are involved; and (3) the result can be aggregated with one message or multiple messages.

Algo. 3 (cf Page 78) shows the detailed algorithm. The inputs are a candidate mapping map, an encrypted query graph $Q_k$, a candidate matching $CM_s$ and an encrypted result $R_k$. One remarks that $R_k$ is to record the aggregated result for $CM_s$s, where $R_k$ is initialized to 1 in Line 1 Algo. 1.

We initialize an intermediate result $R_i$ with a value 0 (Line 1). For each pair of vertices ($u_i, u_j$) in V(Q) and the mapped vertex pair ($v_{i'}, v_{j'}$) in $CM_s$ (Lines 2-3), the following two steps are performed:

Additions (Lines 4-7): if ($v_{i'}, v_{j'}$)a??E($CM_s$), $R_i$ is set to ($M_{Qk}(u_i, u_j)+R_i$) (mod p). This indicates that if ($u_i, u_j$) is an edge in Q, $R_i$ must not contain a factor of q, and the decryption value of $R_i$ is non-zero (i.e., the current mapping map contains a violation (by Formula 8), which is not a valid mapping). Otherwise, no violation is caused by ($u_i, u_j$). This sets $R_i$ to the value I+$R_i$ (mod p), where I is an encrypted value with a factor q issued by the client, I=Enc(q); and Multiplications (Line 8): it aggregates $R_i$ into $R_k$ by $R_k=R_k \times R_i$ (mod p). If there is at least one valid mapping from Q to G, i.e., at least one $R_i$ whose decryption value is zero. The decryption value of $R_k$ must also be zero. Otherwise, it is non-zero. One remarks that CGBE leads to errors if the number of $R_i$s aggregated in $R_k$ is larger than a predetermined value M.

Example 19

FIG. 15(a) depicts an example of SPVerify between $Q_k$ and $CM_{s1}$. There are two mappings from $Q_k$ to $CM_{s1}$ in FIG. 14 (b). In map1, all the factors in $R_1$ contain q since map1 is a valid mapping. However, in map2, since there exists a violation between ($u_1, u_3$) and (s,$v_4$), there is a factor in $R_2$ that has no prime q. $R_k = R_1 \times R_2$ (mod p).

Decryption at the Client.

After receiving all the encrypted messages $R_k$, the client performs two main steps:

For each $R_k$, the client computes the plaintext of $R_k$ by $R_k' = Dec(R_k, x, g)^M$; and The client computes the final result by R=$R_k'$ (mod q). R equals zero if and only if there is at least one valid mapping from Q to G and thus, subIso(Q,G)=true.

Example 20

One shows the decryption at the client by using the example in FIG. 15 (a). Assume M=2. The encrypted message $R_k$ only aggregates two $R_i$s. The client generates the $g^{-2x}$, computes $R_k' = R_k \times g^{-2x}$ (mod p), and finally computes R=$R_k'$ (mod q). The result is zero, which indicates Q is a subgraph of G.

Decomposition Scheme.

One recalls that the decryption uses the arithmetic modulo p. The message m*r must not exceed p. When there are too many $R_i$s multiplied into $R_k$, the product (in the plaintext domain) may exceed p. Subsequently, the client will not obtain the correct plaintext under the arithmetic system. Therefore, one decomposes the product into smaller numbers and the client decrypts those numbers instead. Through Formula 5 below, one can determine the maximum number of $R_i$s to be aggregated in $R_k$ (M):

$$Len(p) \geq M(Len(q) + Len(r)) \quad (9)$$
$$\Leftrightarrow M \leq \frac{Len(p)}{(Len(q) + Len(r))};$$

where Len(p) is the size of p.

Let's say one sets M=10. From experiments, the number of mappings (after the minimizations) for the queries is around 500 on average. Each message is 2048 bits in size. Thus, the communication cost is around 12.8 KB, which is very small.

---
Algorithm 3 SPVerify(map,$Q_k$,$CM_s$,$R_k$)
---
1: Initialize $R_i$ = 0
2: for each $u_i$,$u_j$ ∈ V(Q),i < j
3:     $v_{i'}$ = map[$u_i$],$v_{j'}$ = map[$u_j$]
4:     if ($v_{i'}$,$v_{j'}$) ∉ E($CM_s$)
5:        $R_i$ += $M_{Q_k}$($u_i$,$u_j$) (mod p)   /* Aggregate violation */
6:     else
7:        $R_i$ += I (mod p)   /* No violation, I = Enc(q) */
8: $R_k$ ×= $R_i$ (mod p)   /* Decompose $R_k$ after aggregating M $R_i$ */
---

False Positives.

Due to CGBE, the two matrix operations in SPVerify introduce negligible false positives: (1) additions with computing $R_i$ (Lines 4-7); and (2) multiplications with computing $R_k$ in each decomposed number (Line 8). However, the probabilities of the above two false positives are negligible.

The probability of false positives from the aggregation (additions) while computing $R_i$ and the multiplication of $R_k$s in each decomposed number are respectively stated in PROPS 1 and 2.

Optimized SPVerify for Queries of Bounded Sizes

---
Algorithm 4 SPVerify* (map,$Q_k$,$CM_s$,$R_k$)
---
1: Initialize $R_i$ = 1
2: for each $u_i$,$u_j$ ∈ V(Q),i < j
3:     $v_{i'}$ = map[$u_i$],$v_{j'}$ = map[$u_j$]
         /* Multiplications */
4:     if ($v_{i'}$,$v_{j'}$) ∉ E($CM_s$)
5:        $R_i$ ×= $M_{Q_k}$($u_i$,$u_j$) (mod p)   /* Aggregate violation */
6:     else
7:        $R_i$ ×= I (mod p)   /* No violation, I = Enc(1) */
         /* Additions */
8: $R_k$ += $R_i$ (mod p)
---

Each encrypted message $R_k$ sent by SPVerify aggregates at most M messages $R_i$s. In this subsection, one presents SPVerify*, which significantly reduces the number of messages returned, and in turn reduces both the communication and computational costs at the client. The main idea behind SPVerify is to use multiplications to detect violations since queries are often small and use additions to aggregate $R_i$s. Hence, the value of $R_k$ may not exceed p even after many aggregations. However, a tradeoff of SPVerify is that the query size must be bounded by a pre-determined constant c.

Similar to SPVerify, SPVerify* also detects the violation by multiplications and additions. In order to achieve that, one first defines a complement encoding of the query (see Def. 15).

Definition 15:

The encoding of the entries of $M_Q$ are:

∀$u_i$,$u_j$ ∈ V(Q), $$\begin{cases} M_Q(u_i; u_j) = 1 & \text{if } M_Q(u_i; u_j) = 0 \\ M_Q(u_i; u_j) = q & \text{otherwise} \end{cases}$$

where q is a large prime number.

In relation to Def. 9, one adopts Formula 8 to state the violation: ∀$u_i$,$u_j$ ∈ V(Q), $$M_Q(u_i,u_j) = q \iff (v_i,v_j) \notin E(G) \tag{10}$$

where $v_i$,$v_j$ ∈ V(G), $u_i$ a?|$v_i$, and $u_j$ a?|$v_j$.

Algorithm for SPVerify*.

For ease of comparison, one presents the pseudo-code of SPVerify* (shown in Algo. 4) in the style of SPVerify. The inputs and the initialized data structures are the same as SPVerify, except that $R_k$ is initialized to 0. The two main steps of SPVerify* can be highlighted as follows:

Multiplications (Lines 4-7): according to the violation (by Formula 10), if ($v_i$, $v_j$)a??E($CM_s$), set $R_i$ as the value $M_{Q_k}$($u_i$,$u_j$) × $R_i$ (mod p). This indicates that as long as ($u_i$,$u_j$) is an edge in Q, $R_i$ must contain the factor q, and the decryption value is zero (i.e., the current mapping map contains a violation). Otherwise, $R_i$ is set to a value I × $R_i$ (mod p), where I is an encrypted value without factor q issued by the client, I=Enc(1); and Additions (Line 8): it aggregates $R_i$ to $R_k$, where $R_k$=$R_k$+$R_i$ (mod p). If there is at least one valid mapping from Q to G (i.e., at least one $R_i$ whose plain text is non-zero). The decrypted value of $R_k$ must also be non zero. Otherwise, it is zero.

Example 21

FIG. 15 (b) illustrates an example of SPVerify*. Similarly, since there is no violation in map1, all the factors in $R_1$ do not contain q. Regarding map2, since there is a violation, $R_2$ contains a factor q. $R_k$=$R_1$+$R_2$ (mod p).

Decryption at the Client.

The decryption is modified as:

The client computes the message encoded in $R_k$ as $R_k'$=Dec($R_k$,x,g)$^{m(m-1)/2}$, where m=|V(Q)|; and The client computes the final result by R=$R_k'$ (mod q). R equals non-zero if and only if there is at least one valid mapping from Q to G. Thus subIso(Q,G)=true.

Example 22

One shows the decryption in FIG. 15 (b). For simplicity, one assumes that $R_k$ only aggregates $R_1$ and $R_2$. The client generates $g^{-6x}$, computes $R_k'$=$R_k$×$g^{-6x}$ (mod p), and finally computes R=$R_k'$ (mod q). The result is non-zero which indicates that Q is a subgraph of G.

Determining the constant c to decide when to use SPVerify or SPVerify*.

In SPVerify*, multiplications are used to aggregate violations by edges in $CM_s$ (Line 4 in Algo. 4), instead of aggregating numerous mapping results ($R_i$ in Line 8 of Algo. 3). Similarly, when $R_i$ (Lines 4-7) in Algo. 4 exceeds p, the client cannot recover the plaintext. The number of multiplications for each $R_i$ is directly related to the size of the query (|V(Q)|). One can determine the maximum size of the query, denoted as c, using the following inequality.

$$Len(p) \geq \frac{c(c-1)}{2}(Len(q) + Len(r)) \tag{11}$$

$$\Leftrightarrow 0 \geq c^2 - c - \frac{2Len(p)}{Len(q) + Len(r)}$$

Putting these together, in Lines 7-8 of Algo. 2, once |V(Q)|≤c, the SP uses SPVerify*. Otherwise, it uses SPVerify.

False positives. Since both SPVerify and SPVerify* use CGBE, one can obtain that the probabilities of false positives of SPVerify are also negligible. Their proofs are almost identical to those of Props. 5 and 6, and hence, omitted.

Privacy Analysis

In one embodiment of the present invention, one proves the privacy of the encryption method and SPsubIso. The attackers or SPs are eavesdroppers and can adopt chosen plaintext attack (CPA).

Privacy of the encryption method. CGBE is adopted to encrypt the query graph in this paper. The privacy of CGBE and $M_{Qk}$ can be recalled from Lemma 4.

Thus, one has the following.

Proposition 8:

The structure of the query is preserved from the SP against the attack model under CGBE.

Proof:

(Sketch) The proof can be derived from Lemma 4. After receiving $Q_k$, the SP cannot break the $M_{Qk}$ since they are secure against CPA. V, ∈ and L do not contain structural information. Thus, the structure of query is preserved from the SP against the attack model.

Privacy of SPsubIso.

SPsubIso mainly consists of five steps: (1) GenCandSubGraph; (2) MinCandSubGraph; (3) GenCandMatch; (4) GenAllMap; and (5) SPVerify (or SPVerify*). One now analyzes the privacy of each step as follows. However, first, the analysis requires some notations. One denotes a function $P(m,h,\Sigma)$ that returns all possible graphs of m vertices with a minimum height h and the labels $\Sigma$. $|P(m,h,\Sigma)|$ is exponential to the value m and the size of $\Sigma$. Let $A(Q)$ is a function that returns 1 if SP is able to determine the exact structure of Q, and 0 otherwise. The probability that the SP can determine the structure of the query Q is denoted as $Pr[A(Q)=1]$. Given a query Q and $(m,h,\Sigma)$, the probability of determining its structure is $Pr[A(Q)=1]=1/|P(m,h,\Sigma)|$.

Proposition 9:

Under GenCandSubGraph, MinCandSubGraph, GenCandMatch and GenAllMap, $Pr[A(Q)=1]=1/|P(m,h,\Sigma)|$.

Proof:

(Sketch) The proof is established by one main fact: SP does not utilize any structural information of the query, except the value h in the algorithm.

GenCandSubGraph utilizes $l_s$, h, $Q_k$ and G to generate all the $CS_s$s;

MinCandSubGraph minimizes the size of each $CS_s$ by using only the structure of $CS_s$ itself;

GenCandMatch utilizes $Q_k$ and $CS_s$s to generate $CM_s$s;

GenAllMap enumerates all the possible mappings maps between $Q_k$ and $CM_s$.

The SP cannot learn the structure of Q by invoking them, and thus the probability of determining a structure remains $Pr[A(Q)=1]=1/|P(m,h,\Sigma)|$.

In SPVerify and SPVerify*, SP sends messages to the clients. The clients may terminate the algorithm when a mapping is found, which may leak information to the SP. Such a leak can be quantified in the following proposition.

Proposition 10:

Under SPVerify or SPVerify*, the following hold for:

If Q is a subgraph of G, $Pr[A(Q)=1]=1/|S|$, where $S=\{G|G\in P(m,h,\Sigma), G\subseteq CM_s,$ where $CM_s\in Cache\}$; and If Q is not a subgraph of G, $Pr[A(Q)=1]=1/|P(m,h,\Sigma)|$.

Proof:

(Sketch) Since the algorithm SPVerify* is similar to that of SPVerify, due to the space constraint, one proves it with SPVerify only. The proof involves two aspects: SP can never determine any structural information from the mathematical computations in each steps of SPVerify:

Recall that SPVerify comprises a fixed number of mathematical operations in the encrypted domain in Algo. 3.

Lines 4-7 invoke a constant number of additions of $M_{Qk}$ and $R_i$, and only structure of $CM_s$ is considered. More specifically, $\forall i,j$, $m^2$ additions are invoked for $M_{Qk}(i,j)$ and $R_i$; and Line 8 requires one multiplication on each $R_i$ and $R_k$.

Based on Lemma 4, all the intermediate computations results are securely protected against the attack model. Moreover, each step of SPVerify has a constant number of operations in the encrypted domain. SP cannot learn any information from them.

(2) SP May Only Infer Some Structural Information from the Message Communications:

Recall that once M $R_i$s are aggregated into $R_k$, $R_k$ is returned to the client, the client may decide to terminate SPVerify after receiving $R_k$s. There are two cases:

Suppose there is at least one valid $R_k$ such that Q is a subgraph of G. In this case, Q must be graph (or subgraph) isomorphic to one of $CM_s$ in Cache. Therefore, $Pr[A(Q)=1]=1/|S|$, where $S=\{G|G\in P(m,h,\Sigma), G\subseteq CM_s, CM_s \in Cache\}$; and If the client does not terminate the algorithm, SP does not know if there is a valid $R_k$ or not. Thus, the probability of determining the structure of Q is still $Pr[A(Q)=1]=1/|P(m,h,\Sigma)|$.

Based on Prop. 10, one notes that the client can make a tradeoff between privacy and response times by terminating the algorithm as late as acceptable.

Experimental Evaluation

Another embodiment of the present invention presents an experimental evaluation of the techniques with popular real datasets. The results show that the techniques are efficient and the optimizations are effective.

The Platform.

One conducted all the experiments on a machine with an Intel Core i7 3.4 GHz CPU and 16 GB memory running Windows 7 OS. All techniques were implemented on C++, and CGBE was implemented on the GMP library. One simulates the bandwidth as 10 Mbits/s.

TABLE 1

Statistics of the real-world datasets

| Graph G | |V(G)| | |E(G)| | Avg. Degree | |Σ(G)| |
|---|---|---|---|---|
| DBLP | 317,080 | 1,049,866 | 6.62 | 199 |
| LiveJournal | 3,997,962 | 34,681,189 | 17.34 | 1355 |

Data and Query Sets.

One benchmarked real-world datasets: DBLP, Amazon, Youtube, and LiveJournal (The datasets are available at http://snap.stanford.edu). Due to space limitations, one opts to report the performance of DBLP and LiveJournal, since others exhibit similar performance characteristics. Since the vertices do not have labels, one adopts the approach that uses the degree of the vertex as its label. (We tested to assign vertex labels by randomly choosing labels from predefined domains. One noted similar trends. Due to space limits, one skips reporting them.) Some statistics of the datasets are shown in Table 11.

For each dataset, one generated two types of queries: (1) BFS queries (BFS) and (2) DFS queries (DFS) by random BFS and DFS methods, respectively. Both BFS and DFS contain query sets Q3-Q8, wherein each Qn contains 1,000 query graphs, and n is the number of vertices of each query of the query set. h of the query sets are around 3-4 on average.

Default Values of the Parameters.

In CGBE, the prime p and q are 2048 bits and 32 bits, respectively. The random number r is 32 bits. The largest value c is 12 by Formula 11. However, to study the performance of both SPVerify* and SPVerify, one first set c to 6, by default. That is, if $|V(Q)|\leq 6$, one used SPVerify*. Otherwise, one used SPVerify. One finally investigated the effectiveness of SPVerify* with c=11. For SPVerify*, one sets M=100 by default (i.e., one aggregated 100 $R_i$s into each $R_k$). For SPVerify, one sets M=10 only. Unless specified otherwise, $\delta$=5. Under these settings, no false positives was detected from the entire experiments.

Performance at the Client Side

Preprocessing Time at the Client.

One reports the average preprocessing time of the query Q at the client side on all datasets in FIG. 16. Specifically, the preprocessing of Q includes (1) the computation for $l_s$ and h; and (2) the encryption of Q by CGBE. One observes that the average times for each query on all datasets are around 4 ms, which shows that the preprocessing is in cognitively negligible.

The Sizes of Messages Received by the Client.

One reports the sizes of the encrypted messages $R_k$s that the client received in FIG. 17. Due to the optimizations by SPsubIso, the largest sizes of $R_k$s (at Q6) are around 13 KB on LiveJournal, which can be efficiently transmitted via today's networks. For Q7-Q8, as one sets c to 6 (by default), SPsubIso uses SPVerify. The number of $R_i$s aggregated in each $R_k$ is 10. Thus, the message sizes for Q7-Q8 are larger. Since the maximum value of c is 11 in the current configuration, SPVerify* can be used to produce much smaller messages (to be discussed with FIG. 14).

The Decryption Time at the Client.

After receiving the encrypted messages $R_k$s, the client decrypts $R_k$s. The decryption time is shown in FIG. 18. Since the sizes of $R_k$s are small and the decryption method is simple, the average decryption times at the client are correspondingly fast at most 16 ms.

Performance at the SP Side

The Total Runtime at the SP.

FIG. 19 shows the average total runtime at the SP on all datasets, which is exactly the runtime of SPsubIso. For the simplicity of performance analysis, one terminated SPsubIso once the client found at least one valid mapping. (The client may postpone the termination to achieve higher privacy, although that introduces small but non-trivial overhead to SPsubIso.) It is not surprising that the runtimes increase exponentially with the query sizes. For Q8, the largest runtime is around 12s on LiveJournal. However, the running times for small queries (Q3-Q6) are well below 600 ms for all datasets.

We further report the breakdowns of the total runtimes of SPsubIso: (1) GenCandSubGraph and MinCandSubGraph; and (2) GenCandMatch and SPVerify. For the DBLP dataset, the breakdown percentages of both query sets are similar: 30% and 70%. For LiveJournal, they are 53% and 47%.

The Effectiveness of Minimization of $CS_s$.

In FIG. 20, one shows the average percentage of the reduced vertices of $CS_s$ by NC in MinCandSubGraph. One observes that MinCandSubGraph reduces around 40% of the vertices of $CS_s$s on DBLP. However, for LiveJournal, the percentage (on average) is around 20%.

In the experiment, one notes that a small fraction of queries have $CS_s$s that contain numerous candidate mappings. The reason is that SPsubIso cannot exploit query structures for optimizations. In this case, for each $CS_s$, one computes an upper bound of the number of candidate mappings of a query by simple calculations on $CS_s$. For those candidate subgraphs that may exceed 100,000 mappings, one transmits the candidate subgraphs to the client to do subIso The percentage of such queries is very small, at most 1% for Q3-Q7 on all datasets. For Q8, the percentage is only 10%. In other words, most subgraph queries are successfully outsourced to the SP.

The Effectiveness of the Elimination of Redundant $CM_s$.

FIG. 21 shows the average percentage of redundant $CM_s$s pruned by Cache in GenCandMatch. One notes that as the query size increases, the effectiveness of Cache increases. For Q3-Q4 of all datasets, the percentage of the elimination of redundant $CM_s$ increases to 80%. For Q5-Q8 on DBLP, the percentages are stable at around 80%. One notes the graph structures of LiveJournal are diverse and there are many distinct $CM_s$s. The effectiveness of Cache then decreases from 80% to 50% for Q5-Q8. This is also reflected by the fact that the sizes of the encrypted messages $R_k$s are the largest for LiveJournal (see FIG. 17).

The Memory Consumption of Cache.

One reports the memory consumption of Cache in FIG. 22. As one only stores the hash code of the canonical labeling of each distinct $CM_s$, the memory consumption is very small (at most 25 MB).

The Effectiveness of Pruning Redundant Mappings by NEC.

One reports the pruning of redundant mappings by using NEC in FIG. 23. One observes that, for most of the queries, One pruned approximately 20% of redundant mappings on average. This further saves on computations in SPVerify and SPVerify*0.2

The Number of Aggregated Messages by SPVerify*.

In FIG. 17, since c was set to 6 by default, One used SPVerify for Q7-Q8, where each $R_k$ is an aggregate of M messages and M=10. As discussed, the messages are small. To study SPVerify*, one then set c=11. One used Q8 with DFS and varied the values of M from 10 to 100. FIG. 24 shows the detailed performance of all datasets. One reports that for M=10, the message size is the same as those values of Q8 DFS in FIG. 17. Importantly, as M increases, the message size decreases accordingly.

Summary.

The experiments show that the computation times at the client were in the order of milliseconds. The messages transferred were small. Most computation was outsourced to the SP. Further, the present optimizations were effective.

INDUSTRIAL APPLICABILITY

If desired, the different functions discussed herein may be performed in a different order and/or concurrently with each other. Furthermore, if desired, one or more of the above-described functions may be optional or may be combined.

While the foregoing invention has been described with respect to various embodiments and examples, it is understood that other embodiments are within the scope of the present invention as expressed in the following claims and their equivalents. Moreover, the above specific examples are to be construed as merely illustrative, and not limitative of the reminder of the disclosure in any way whatsoever. Without further elaboration, it is believed that one skilled in the art can, based on the description herein, utilize the present invention to its fullest extend. All publications recited herein are hereby incorporated by reference in their entirety.

What is claimed is:

1. A method executed in a computer system that minimizes eavesdropping by a service provider (SP) on a query graph Q to a database from a client computer or graph data G in the database from a data owner in a structure-preserving subgraph query processing (SPQP), the method comprising:
   encrypting the graph data G, by the data owner, and delivering the encrypted graph data in the database to the SP that is accessible to the client computer with the query graph Q that execute through the SP;
   minimizing the eavesdropping on the query graph Q to the database from the client computer or the graph data G from the data owner by:
      delivering, by the data owner, private keys to the client computer for encryption of the query graph Q and decryption of an encrypted result;
      encrypting the query graph Q, by the client computer, using the private keys, and submitting the encrypted query to SP, wherein the encrypting of the query graph Q is based on a cyclic group based private key encryption and comprises:
         enumerating all possible subgraph isomorphism mappings $M_i$s from the query graph Q to the data graph G by matching for creating a structure-preserving structure;
         verifying if the mapping $M_i$ is valid or not;
         reducing search space of the $M_i$s by degree constraints and neighborhood constraints;
         performing query evaluation between the query graph Q and the graph data G using adjacency matrices; and
         using the cyclic group based private key encryption to encrypt $M_Q$ and $M_{\overline{G}}$ as encrypted matrices of query $M_{Q_k}$ and encrypted matrices of graph $M_{\overline{G}_k}$ respectively for verifying the validity of $M_i$;
      checking the validity of each mapping $M_i$ by the SP under the cyclic group based private key encryption;
      aggregating computational results under the cyclic group based private key encryption by the SP for reducing communication overheads between the client computer and the SP as the query graph Q has a bounded size; and
      determining, by the SP, subgraph structure with a number of possible mappings reduced.

2. The method according to claim 1, wherein the performing of the query evaluation comprises:
   transforming the structure-preserving structure into a series of mathematical computations via operations comprising:
      enumerating all possible subgraph isomorphism mappings $M_i$s;
      verifying validity of the $M_i$ by additions and multiplications using adjacency matrices of query $M_Q$ and $M_{\overline{G}}$, where the $M_{\overline{G}}$ is complement of adjacency matrices of graph $M_G$; and
      reducing search space of the $M_i$s by inner products using static indexes $SI_Q$ and $SI_G$ of the query graph Q and the data graph G respectively, wherein $SI_Q$ is an ensemble of h-hop information of each vertex of the query graph Q, and $SI_G$ is an ensemble of h-hop information of each vertex of the data graph G, both represented by a bit vector.

3. A computer system comprising:
   a computer device hosting graph data G operated by a data owner;
   a client computer executing a query graph Q; and
   a service provider (SP) with computing infrastructures for evaluating the query graph Q and returning to the client computer with an encrypted result, wherein the data owner owns and encrypts the graph data G and outsources the encrypted graph data G in a database to SP; and the client computer and the SP are configured to execute processes for minimizing eavesdropping in a structure-preserving subgraph query processing (SPQP) according to the method of claim 2.

4. A non-transitory computer-readable medium whose contents cause a computing system to perform the method of claim 2 for minimizing eavesdropping by a service provider (SP) on a query graph Q to a database from a client computer or graph data G in the database from a data owner in a structure-preserving subgraph query processing (SPQP).

5. The method according to claim 1, wherein the determining of the subgraph structure comprises:
   obtaining a feedback from the client computer on useless enumerations;
   exploiting private inner products on static indexes to derive a refinement that reduces the number of possible mappings;
   computing and encrypting the static indexes of graphs offline; and
   computing the static indexes of the query graph Q once by the client computer online.

6. The method according to claim 5, wherein the feedback from the client computer is a protocol between the SP and the client computer for pruning the useless partial mappings by the client computer.

7. A computer system comprising:
   a computer device hosting graph data G operated by a data owner;
   a client computer executing a query graph Q; and
   a service provider (SP) with computing infrastructures for evaluating the query graph Q and returning to the client computer with an encrypted result, wherein the data owner owns and encrypts the graph data G and outsources the encrypted graph data G in a database; and the client computer and the SP are configured to execute processes for minimizing eavesdropping in a structure-preserving subgraph query processing (SPQP) according to the method of claim 5.

8. A non-transitory computer-readable medium whose contents cause a computing system to perform the method of claim 5 for minimizing eavesdropping by a service provider (SP) on a query graph Q to a database from a client computer or graph data G in the database from a data owner in a structure-preserving subgraph query processing (SPQP).

9. A computer system comprising:
   a computer device hosting graph data G operated by a data owner;
   a client computer executing a query graph Q; and
   a service provider (SP) with computing infrastructures for evaluating the query graph Q and returning to the client computer with an encrypted result, wherein the data owner owns and encrypts the graph data G and outsources the encrypted graph data G in a database; and the client computer and the SP are configured to execute processes for minimizing eavesdropping in a structure-preserving subgraph query processing (SPQP) according to the method of claim 6.

10. A non-transitory computer-readable medium whose contents cause a computing system to perform the method of claim 6 for minimizing eavesdropping by a service provider (SP) on a query graph Q to a database from a client computer or graph data G in the database from a data owner in a structure-preserving subgraph query processing (SPQP).

11. The method according to claim 1, wherein the checking of the validity of each mapping $M_i$ by the SP under the cyclic group based private key encryption comprises applying SPMatch with additions and multiplications to the cyclic group based private key encryption for efficient encryption and decryption.

12. A computer system comprising:
    a computer device hosting graph data G operated by a data owner;
    a client computer executing a query graph Q; and
    a service provider (SP) with computing infrastructures for evaluating the query graph Q and returning to the client computer with an encrypted result, wherein the data owner owns and encrypts the graph data G and outsources the encrypted graph data G in a database; and the client computer and the SP are configured to execute processes for minimizing eavesdropping in a structure-preserving subgraph query processing (SPQP) according to the method of claim 11.

13. A non-transitory computer-readable medium whose contents cause a computing system to perform the method of claim 11 for minimizing eavesdropping by a service provider (SP) on a query graph Q to a database from a client computer or graph data G in the database from a data owner in a structure-preserving subgraph query processing (SPQP).

14. A computer system comprising:
    a computer device hosting graph data G operated by a data owner;
    a client computer executing a query graph Q; and
    a service provider (SP) with computing infrastructures for evaluating the query graph Q and returning to the client computer with an encrypted result, wherein the data owner owns and encrypts the graph data G and outsources the encrypted graph data G in a database to SP; and the client computer and the SP are configured to execute processes for minimizing eavesdropping in a structure-preserving subgraph query processing (SPQP) according to the method of claim 1.

15. A non-transitory computer-readable medium whose contents cause a computing system to perform the method of claim 1 for minimizing eavesdropping by a service provider (SP) on a query graph Q to a database from a client computer or graph data G in the database from a data owner in a structure-preserving subgraph query processing (SPQP).

16. A method executed in a computer system that minimizes eavesdropping by a service provider (SP) on a query graph Q to a database from a client computer in an asymmetric structure-preserving subgraph query processing (ASPQP), wherein the database hosts graph data G that is public known and accessible to the client computer with the query graph Q that execute through the SP, the method comprising:
    generating, by the client computer, private keys for encrypting the query graph Q and decrypting an encrypted result;
    encrypting the query graph Q, by the client computer, using the private keys, and submitting the encrypted query to SP, wherein the encrypting of the query graph Q comprises:
        determining a starting label and a minimum height of Q by neighborhood containment for reducing sizes of candidate subgraphs of G;
        pruning candidate matchings (CMs) by a subgraph cache that are enumerated;
        performing a structure-preserving verification by a series of private matrix operations; and
        determining a proper encoding model for the query graph Q; and
    minimizing an enumeration of candidate mappings between the query graph Q and graph data G by performing server-side algorithms, by the SP, wherein the performing of the server-side algorithms comprises:
        minimizing a number of candidate mappings by determining candidate subgraphs $CS_S$s based on the starting label and the minimum height of Q by neighborhood containment;
        enumerating all the CMs and the candidate mappings by a canonical labeling-based subgraph cache;
        applying neighborhood equivalent class (NEC) for avoiding the CMs and the candidate mappings that are redundant; and
        matching and verifying if the mapping between Q and CMs is valid or not by additions and multiplications.

17. A computer system comprising:
    a client computer executing a query graph Q; and
    a service provider (SP) hosting graph data G with computing infrastructures for evaluating the query graph Q and returning to the client computer with an encrypted result, wherein the client computer and the SP are configured to execute processes for minimizing eavesdropping in an asymmetric structure-preserving subgraph query processing (ASPQP) according to the method of claim 16.

18. A non-transitory computer-readable medium whose contents cause a computing system to perform the method of claim 16 for minimizing eavesdropping by a service provider (SP) on a query graph Q to a database from a client computer in an asymmetric structure-preserving subgraph query processing (ASPQP).

* * * * *